United States Patent
Ikeda et al.

(10) Patent No.: US 8,430,753 B2
(45) Date of Patent: Apr. 30, 2013

(54) VIDEO GAME SYSTEM WITH WIRELESS MODULAR HANDHELD CONTROLLER

(75) Inventors: Akio Ikeda, Kyoto (JP); Kuniaki Ito, Kyoto (JP); Ryoji Kuroda, Kyoto (JP); Genyo Takeda, Kyoto (JP); Masahiro Urata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/071,008

(22) Filed: Mar. 24, 2011

(65) Prior Publication Data

US 2011/0172015 A1    Jul. 14, 2011

Related U.S. Application Data

(63) Continuation of application No. 11/532,328, filed on Sep. 15, 2006, now Pat. No. 7,927,216.

(60) Provisional application No. 60/716,937, filed on Sep. 15, 2005.

(51) Int. Cl.
*A63F 13/00* (2006.01)

(52) U.S. Cl.
USPC .................. 463/37; 463/36; 463/38; 463/39

(58) Field of Classification Search .................. 463/36, 463/37, 38, 39
See application file for complete search history.

(56) References Cited

U.S. PATENT DOCUMENTS

| | | | |
|---|---|---|---|
| 3,454,920 A | 7/1969 | Mehr | |
| 3,474,241 A | 10/1969 | Kuipers | |
| D220,268 S | 3/1971 | Kliewer | |
| 3,660,648 A | 5/1972 | Kuipers | |
| 3,973,257 A | 8/1976 | Rowe | |
| 4,009,619 A | 3/1977 | Snyman | |
| 4,038,876 A | 8/1977 | Morris | |
| 4,166,406 A | 9/1979 | Maughmer | |
| 4,240,638 A | 12/1980 | Morrison et al. | |
| 4,287,765 A | 9/1981 | Kreft | |
| 4,303,978 A | 12/1981 | Shaw et al. | |
| 4,318,245 A | 3/1982 | Stowell et al. | |
| 4,321,678 A | 3/1982 | Krogmann | |
| 4,337,948 A | 7/1982 | Breslow | |
| 4,342,985 A | 8/1982 | Desjardins | |
| 4,402,250 A | 9/1983 | Baasch | |

(Continued)

FOREIGN PATENT DOCUMENTS

| CN | 1338961 | 3/2002 |
|---|---|---|
| CN | 1559644 | 1/2005 |

(Continued)

OTHER PUBLICATIONS

European Examination Report issued in EP Application No. 10176870.3 on Aug. 9, 2011.

(Continued)

*Primary Examiner* — James S McClellan
(74) *Attorney, Agent, or Firm* — Nixon & Vanderhye P.C.

(57) ABSTRACT

A home entertainment system for video games and other applications includes a main unit and handheld controllers. The handheld controllers sense their own motion by detecting illumination emitted by emitters positioned at either side of a display. The controllers can be plugged into expansion units that customize the overall control interface for particular applications including but not limited to legacy video games.

20 Claims, 27 Drawing Sheets

U.S. PATENT DOCUMENTS

| | | |
|---|---|---|
| 4,425,488 A | 1/1984 | Moskin |
| 4,443,866 A | 4/1984 | Burgiss, Sr. |
| 4,450,325 A | 5/1984 | Luque |
| 4,503,299 A | 3/1985 | Henrard |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,739,128 A | 4/1988 | Grisham |
| 4,761,540 A | 8/1988 | McGeorge |
| 4,787,051 A | 11/1988 | Olson |
| 4,816,810 A | 3/1989 | Moore |
| 4,839,838 A | 6/1989 | LaBiche et al. |
| 4,849,655 A | 7/1989 | Bennett |
| 4,851,685 A | 7/1989 | Dubgen |
| 4,862,165 A | 8/1989 | Gart |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 4,988,981 A | 1/1991 | Zimmerman et al. |
| 4,994,795 A | 2/1991 | MacKenzie |
| 5,045,843 A | 9/1991 | Hansen |
| D320,624 S | 10/1991 | Taylor |
| 5,059,958 A | 10/1991 | Jacobs et al. |
| 5,062,696 A | 11/1991 | Oshima et al. |
| 5,068,645 A | 11/1991 | Drumm |
| D322,242 S | 12/1991 | Cordell |
| D325,225 S | 4/1992 | Adhida |
| 5,124,938 A | 6/1992 | Algrain |
| 5,128,671 A | 7/1992 | Thomas, Jr. |
| D328,463 S | 8/1992 | King et al. |
| 5,136,222 A | 8/1992 | Yamamoto |
| 5,138,154 A | 8/1992 | Hotelling |
| D331,058 S | 11/1992 | Morales |
| 5,175,481 A | 12/1992 | Kanno |
| 5,178,477 A | 1/1993 | Gambaro |
| 5,181,181 A | 1/1993 | Glynn |
| 5,192,082 A | 3/1993 | Inoue et al. |
| 5,202,844 A | 4/1993 | Kamio et al. |
| 5,207,426 A | 5/1993 | Inoue et al. |
| D338,242 S | 8/1993 | Cordell |
| D340,042 S | 10/1993 | Copper et al. |
| 5,259,626 A | 11/1993 | Ho |
| 5,262,777 A | 11/1993 | Low et al. |
| D342,256 S | 12/1993 | Payne |
| 5,280,744 A | 1/1994 | DeCarlo et al. |
| D345,164 S | 3/1994 | Grae |
| 5,296,871 A | 3/1994 | Paley |
| 5,307,325 A | 4/1994 | Scheiber |
| 5,317,394 A | 5/1994 | Hale et al. |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| H1383 H | 12/1994 | Kaplan et al. |
| 5,369,889 A | 12/1994 | Callaghan |
| 5,373,857 A | 12/1994 | Hirabayashi et al. |
| 5,396,265 A | 3/1995 | Ulrich et al. |
| 5,421,590 A | 6/1995 | Robbins |
| 5,430,435 A | 7/1995 | Hoch et al. |
| D360,903 S | 8/1995 | Barr et al. |
| 5,440,326 A | 8/1995 | Quinn |
| 5,453,758 A | 9/1995 | Sato |
| D362,870 S | 10/1995 | Oikawa |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A | 4/1996 | Paley |
| 5,512,892 A | 4/1996 | Corballis et al. |
| 5,517,183 A | 5/1996 | Bozeman, Jr. |
| 5,523,800 A | 6/1996 | Dudek |
| 5,526,022 A | 6/1996 | Donahue et al. |
| 5,528,265 A | 6/1996 | Harrison |
| 5,531,443 A | 7/1996 | Cruz |
| 5,541,860 A | 7/1996 | Takei et al. |
| 5,551,701 A | 9/1996 | Bouton et al. |
| 5,554,033 A | 9/1996 | Bizzi |
| 5,554,980 A | 9/1996 | Hashimoto et al. |
| 5,561,543 A | 10/1996 | Ogawa |
| 5,563,628 A | 10/1996 | Stroop |
| 5,569,085 A | 10/1996 | Hashimoto et al. |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,621,459 A | 4/1997 | Ueda et al. |
| 5,624,117 A | 4/1997 | Ohkubo et al. |
| 5,627,565 A | 5/1997 | Morishita et al. |
| D379,832 S | 6/1997 | Ashida |
| 5,640,152 A | 6/1997 | Copper |
| 5,641,288 A | 6/1997 | Zaenglein, Jr. |
| 5,643,087 A | 7/1997 | Marcus et al. |
| 5,645,077 A | 7/1997 | Foxlin et al. |
| 5,645,277 A | 7/1997 | Cheng |
| 5,666,138 A | 9/1997 | Culver |
| 5,667,220 A | 9/1997 | Cheng |
| 5,670,845 A | 9/1997 | Grant et al. |
| 5,670,988 A | 9/1997 | Tickle |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,305 A | 12/1997 | Norman et al. |
| 5,703,623 A | 12/1997 | Hall et al. |
| 5,724,106 A | 3/1998 | Autry et al. |
| 5,726,675 A | 3/1998 | Inoue |
| 5,734,371 A | 3/1998 | Kaplan |
| 5,734,373 A | 3/1998 | Rosenberg et al. |
| 5,734,807 A | 3/1998 | Sumi |
| D393,884 S | 4/1998 | Hayami |
| 5,736,970 A | 4/1998 | Bozeman, Jr. |
| 5,739,811 A | 4/1998 | Rosenberg et al. |
| 5,741,182 A | 4/1998 | Lipps et al. |
| 5,742,331 A | 4/1998 | Uomori et al. |
| 5,745,226 A | 4/1998 | Gigioli, Jr. |
| D394,264 S | 5/1998 | Sakamoto et al. |
| 5,746,602 A | 5/1998 | Kikinis |
| 5,751,273 A | 5/1998 | Cohen |
| 5,752,880 A | 5/1998 | Gabai et al. |
| 5,757,354 A | 5/1998 | Kawamura |
| 5,757,360 A | 5/1998 | Nitta et al. |
| D395,464 S | 6/1998 | Shiibashi et al. |
| 5,764,224 A | 6/1998 | Lilja et al. |
| 5,769,719 A | 6/1998 | Hsu |
| 5,771,038 A | 6/1998 | Wang |
| D396,468 S | 7/1998 | Schindler et al. |
| 5,785,317 A | 7/1998 | Sasaki |
| D397,162 S | 8/1998 | Yokoi et al. |

| Patent No. | Date | Inventor |
|---|---|---|
| 5,794,081 A | 8/1998 | Itoh et al. |
| 5,796,354 A | 8/1998 | Cartabiano et al. |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| D400,885 S | 11/1998 | Goto |
| 5,831,553 A | 11/1998 | Lenssen et al. |
| 5,835,077 A | 11/1998 | Dao |
| 5,835,156 A | 11/1998 | Blonstein et al. |
| 5,841,409 A | 11/1998 | Ishibashi et al. |
| D402,328 S | 12/1998 | Ashida |
| 5,847,854 A | 12/1998 | Benson, Jr. |
| 5,850,624 A | 12/1998 | Gard et al. |
| 5,854,622 A | 12/1998 | Brannon |
| D405,071 S | 2/1999 | Gambaro |
| 5,867,146 A | 2/1999 | Kim et al. |
| 5,874,941 A | 2/1999 | Yamada |
| 5,875,257 A | 2/1999 | Marrin et al. |
| D407,071 S | 3/1999 | Keating |
| D407,761 S | 4/1999 | Barr |
| 5,897,437 A | 4/1999 | Nishiumi et al. |
| 5,898,421 A | 4/1999 | Quinn |
| 5,900,867 A | 5/1999 | Schindler et al. |
| 5,902,968 A | 5/1999 | Sato et al. |
| D410,909 S | 6/1999 | Tickle |
| 5,912,612 A | 6/1999 | DeVolpi |
| 5,919,149 A | 7/1999 | Allum |
| 5,923,317 A | 7/1999 | Sayler et al. |
| 5,926,780 A | 7/1999 | Fox et al. |
| 5,929,782 A | 7/1999 | Stark et al. |
| D412,940 S | 8/1999 | Kato |
| 5,947,868 A | 9/1999 | Dugan |
| 5,955,713 A | 9/1999 | Titus et al. |
| 5,955,988 A | 9/1999 | Blonstein et al. |
| 5,956,035 A | 9/1999 | Sciammarella et al. |
| 5,967,898 A | 10/1999 | Takasaka et al. |
| 5,973,757 A | 10/1999 | Aubuchon et al. |
| 5,982,352 A | 11/1999 | Pryor |
| 5,982,356 A | 11/1999 | Akiyama |
| 5,984,785 A | 11/1999 | Takeda |
| 5,986,644 A | 11/1999 | Herder et al. |
| 5,991,085 A | 11/1999 | Rallison et al. |
| 5,999,168 A | 12/1999 | Rosenberg et al. |
| 6,002,394 A | 12/1999 | Schein et al. |
| D419,199 S | 1/2000 | Cordell et al. |
| D419,200 S | 1/2000 | Ashida |
| 6,010,406 A | 1/2000 | Kajikawa et al. |
| 6,011,526 A | 1/2000 | Toyoshima et al. |
| 6,012,980 A | 1/2000 | Yoshida et al. |
| 6,013,007 A | 1/2000 | Root et al. |
| 6,016,144 A | 1/2000 | Blonstein et al. |
| 6,019,680 A | 2/2000 | Cheng |
| 6,020,876 A | 2/2000 | Rosenberg et al. |
| 6,037,882 A | 3/2000 | Levy |
| 6,044,297 A | 3/2000 | Sheldon et al. |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach et al. |
| 6,059,576 A | 5/2000 | Brann |
| 6,069,594 A | 5/2000 | Barnes et al. |
| 6,072,467 A | 6/2000 | Walker |
| 6,072,470 A | 6/2000 | Ishigaki |
| 6,075,575 A | 6/2000 | Schein et al. |
| 6,081,819 A | 6/2000 | Ogino |
| 6,084,315 A | 7/2000 | Schmitt |
| 6,084,577 A | 7/2000 | Sato et al. |
| 6,087,950 A | 7/2000 | Capan |
| D429,718 S | 8/2000 | Rudolph |
| 6,110,039 A | 8/2000 | Oh |
| 6,115,028 A | 9/2000 | Balakrishnan |
| 6,137,457 A | 10/2000 | Tokuhashi et al. |
| D433,381 S | 11/2000 | Talesfore |
| 6,146,278 A | 11/2000 | Kobayashi |
| 6,148,100 A | 11/2000 | Anderson et al. |
| 6,155,926 A | 12/2000 | Miyamoto et al. |
| 6,160,405 A | 12/2000 | Needle et al. |
| 6,160,540 A | 12/2000 | Fishkin et al. |
| 6,162,191 A | 12/2000 | Foxlin |
| 6,164,808 A | 12/2000 | Shibata et al. |
| 6,171,190 B1 | 1/2001 | Thanasack et al. |
| 6,176,837 B1 | 1/2001 | Foxlin |
| 6,181,329 B1 | 1/2001 | Stork et al. |
| 6,183,365 B1 | 2/2001 | Tonomura et al. |
| 6,184,862 B1 | 2/2001 | Leiper |
| 6,184,863 B1 | 2/2001 | Silbert et al. |
| 6,186,896 B1 | 2/2001 | Takeda et al. |
| 6,191,774 B1 | 2/2001 | Schena et al. |
| 6,198,295 B1 | 3/2001 | Hill |
| 6,198,470 B1 | 3/2001 | Agam et al. |
| 6,198,471 B1 | 3/2001 | Cook |
| 6,200,219 B1 | 3/2001 | Rudell et al. |
| 6,200,253 B1 | 3/2001 | Nishiumi et al. |
| 6,201,554 B1 | 3/2001 | Lands |
| 6,211,861 B1 | 4/2001 | Rosenberg et al. |
| 6,217,450 B1 | 4/2001 | Meredith |
| 6,217,478 B1 | 4/2001 | Vohmann et al. |
| D442,998 S | 5/2001 | Ashida |
| 6,225,987 B1 | 5/2001 | Matsuda |
| 6,226,534 B1 | 5/2001 | Aizawa |
| 6,238,291 B1 | 5/2001 | Fujimoto et al. |
| 6,239,806 B1 | 5/2001 | Nishiumi et al. |
| 6,241,611 B1 | 6/2001 | Takeda et al. |
| 6,243,658 B1 | 6/2001 | Raby |
| 6,244,987 B1 | 6/2001 | Oshuga et al. |
| 6,245,014 B1 | 6/2001 | Brainard, II |
| 6,264,558 B1 | 7/2001 | Nishiumi et al. |
| 6,273,819 B1 | 8/2001 | Strauss et al. |
| 6,280,327 B1 | 8/2001 | Leifer et al. |
| 6,287,198 B1 | 9/2001 | McCauley |
| 6,297,751 B1 | 10/2001 | Fadavi-Ardekani |
| 6,301,534 B1 | 10/2001 | McDermott, Jr. et al. |
| 6,304,250 B1 | 10/2001 | Yang et al. |
| 6,315,673 B1 | 11/2001 | Kopera et al. |
| 6,323,614 B1 | 11/2001 | Palazzolo et al. |
| 6,323,654 B1 | 11/2001 | Needle et al. |
| 6,325,718 B1 | 12/2001 | Nishiumi et al. |
| 6,331,841 B1 | 12/2001 | Tokuhashi et al. |
| 6,331,856 B1 | 12/2001 | Van Hook et al. |
| 6,337,954 B1 | 1/2002 | Soshi et al. |
| 6,346,046 B2 | 2/2002 | Miyamoto et al. |
| 6,347,998 B1 | 2/2002 | Yoshitomi et al. |
| 6,361,507 B1 | 3/2002 | Foxlin |
| D456,410 S | 4/2002 | Ashida |
| 6,369,794 B1 | 4/2002 | Sakurai et al. |
| 6,375,572 B1 | 4/2002 | Masuyama et al. |
| 6,377,793 B1 | 4/2002 | Jenkins |
| 6,377,906 B1 | 4/2002 | Rowe |
| D456,854 S | 5/2002 | Ashida |
| 6,383,079 B1 | 5/2002 | Takeda et al. |
| 6,392,613 B1 | 5/2002 | Goto |
| 6,394,904 B1 | 5/2002 | Stalker |
| D458,972 S | 6/2002 | Ashida |
| 6,400,480 B1 | 6/2002 | Thomas |
| 6,400,996 B1 | 6/2002 | Hoffberg et al. |
| 6,409,687 B1 | 6/2002 | Foxlin |
| D459,727 S | 7/2002 | Ashida |
| D460,787 S | 7/2002 | Nishikawa |
| 6,415,223 B1 | 7/2002 | Lin et al. |
| 6,421,056 B1 | 7/2002 | Nishiumi et al. |
| 6,424,333 B1 | 7/2002 | Tremblay |
| 6,426,719 B1 | 7/2002 | Nagareda et al. |
| 6,426,741 B1 | 7/2002 | Goldsmith et al. |
| D462,683 S | 9/2002 | Ashida |
| 6,452,494 B1 | 9/2002 | Harrison |
| 6,456,276 B1 | 9/2002 | Park |
| D464,053 S | 10/2002 | Zicolello |
| D464,950 S | 10/2002 | Fraquelli |
| 6,466,198 B1 | 10/2002 | Feinstein |
| 6,466,831 B1 | 10/2002 | Shibata et al. |
| 6,473,070 B2 | 10/2002 | Mishra et al. |
| 6,473,713 B1 | 10/2002 | McCall et al. |
| 6,474,159 B1 | 11/2002 | Foxlin et al. |
| 6,484,080 B2 | 11/2002 | Breed |
| 6,492,981 B1 | 12/2002 | Stork et al. |
| 6,496,122 B2 | 12/2002 | Sampsell |

| | | |
|---|---|---|
| 6,518,952 B1 | 2/2003 | Leiper |
| 6,530,838 B2 | 3/2003 | Ha |
| 6,538,675 B2 | 3/2003 | Aratani et al. |
| D473,942 S | 4/2003 | Motoki et al. |
| 6,540,607 B2 | 4/2003 | Mokris et al. |
| 6,540,611 B1 | 4/2003 | Nagata |
| 6,544,124 B2 | 4/2003 | Ireland et al. |
| 6,544,126 B2 | 4/2003 | Sawano et al. |
| 6,545,661 B1 | 4/2003 | Goschy et al. |
| 6,554,781 B1 | 4/2003 | Carter et al. |
| D474,763 S | 5/2003 | Tozaki et al. |
| 6,565,444 B2 | 5/2003 | Nagata et al. |
| 6,567,536 B2 | 5/2003 | McNitt et al. |
| 6,572,108 B1 | 6/2003 | Bristow |
| 6,577,350 B1 | 6/2003 | Proehl et al. |
| 6,582,299 B1 | 6/2003 | Matsuyama et al. |
| 6,582,380 B2 | 6/2003 | Kazlausky et al. |
| 6,585,596 B1 | 7/2003 | Liefer |
| 6,590,536 B1 | 7/2003 | Walton |
| 6,591,677 B2 | 7/2003 | Rothuff |
| 6,597,342 B1 | 7/2003 | Haruta |
| 6,597,443 B2 | 7/2003 | Boman |
| 6,599,194 B1 | 7/2003 | Smith et al. |
| 6,605,038 B1 | 8/2003 | Teller et al. |
| 6,608,563 B2 | 8/2003 | Weston et al. |
| 6,609,977 B1 | 8/2003 | Shimizu et al. |
| 6,616,607 B2 | 9/2003 | Hashimoto et al. |
| 6,628,257 B1 | 9/2003 | Oka et al. |
| 6,634,949 B1 | 10/2003 | Briggs et al. |
| 6,636,826 B1 | 10/2003 | Abe et al. |
| 6,650,029 B1 | 11/2003 | Johnston |
| 6,650,313 B2 | 11/2003 | Levine et al. |
| 6,650,345 B1 | 11/2003 | Saito et al. |
| 6,654,001 B1 | 11/2003 | Su |
| 6,672,962 B1 | 1/2004 | Ozaki et al. |
| 6,676,520 B2 | 1/2004 | Nishiumi |
| 6,677,990 B1 | 1/2004 | Kawahara |
| 6,681,629 B2 | 1/2004 | Foxlin et al. |
| 6,682,351 B1 | 1/2004 | Abraham-Fuchs et al. |
| 6,684,062 B1 | 1/2004 | Gosior et al. |
| D486,145 S | 2/2004 | Kaminski et al. |
| 6,686,954 B1 | 2/2004 | Kitaguchi et al. |
| 6,692,170 B2 | 2/2004 | Abir |
| 6,693,622 B1 | 2/2004 | Shahoian et al. |
| 6,712,692 B2 | 3/2004 | Basson et al. |
| 6,717,573 B1 | 4/2004 | Shahoian et al. |
| 6,718,280 B2 | 4/2004 | Hermann |
| 6,725,173 B2 | 4/2004 | An et al. |
| D489,361 S | 5/2004 | Mori et al. |
| 6,736,009 B1 | 5/2004 | Schwabe |
| D491,924 S | 6/2004 | Kaminski et al. |
| D492,285 S | 6/2004 | Ombao et al. |
| 6,743,104 B1 | 6/2004 | Ota et al. |
| 6,747,632 B2 | 6/2004 | Howard |
| 6,747,690 B2 | 6/2004 | Mølgaard |
| 6,749,432 B2 | 6/2004 | French et al. |
| 6,752,719 B2 | 6/2004 | Himoto et al. |
| 6,753,849 B1 | 6/2004 | Curran et al. |
| 6,753,888 B2 | 6/2004 | Kamiwada et al. |
| 6,757,068 B2 | 6/2004 | Foxlin |
| 6,757,446 B1 | 6/2004 | Li et al. |
| 6,761,637 B2 | 7/2004 | Weston et al. |
| 6,765,553 B1 | 7/2004 | Odamura |
| D495,336 S | 8/2004 | Andre et al. |
| 6,786,877 B2 | 9/2004 | Foxlin |
| 6,796,177 B2 | 9/2004 | Mori |
| 6,811,489 B1 | 11/2004 | Shimizu et al. |
| 6,811,491 B1 | 11/2004 | Levenberg et al. |
| 6,812,881 B1 | 11/2004 | Mullaly et al. |
| 6,813,525 B2 | 11/2004 | Reid et al. |
| 6,813,584 B2 | 11/2004 | Zhou et al. |
| 6,816,151 B2 | 11/2004 | Dellinger |
| 6,821,204 B2 | 11/2004 | Aonuma et al. |
| 6,821,206 B1 | 11/2004 | Ishida et al. |
| 6,836,705 B2 | 12/2004 | Hellmann et al. |
| 6,836,751 B2 | 12/2004 | Paxton et al. |
| 6,836,971 B1 | 1/2005 | Wan |
| 6,842,991 B2 | 1/2005 | Levi et al. |
| 6,850,221 B1 | 2/2005 | Tickle |
| 6,850,844 B1 | 2/2005 | Walters et al. |
| 6,852,032 B2 | 2/2005 | Ishino |
| 6,856,327 B2 | 2/2005 | Choi |
| D502,468 S | 3/2005 | Knight et al. |
| 6,868,738 B2 | 3/2005 | Moscrip et al. |
| 6,872,139 B2 | 3/2005 | Sato et al. |
| 6,873,406 B1 | 3/2005 | Hines et al. |
| D503,750 S | 4/2005 | Kit et al. |
| D504,677 S | 5/2005 | Kaminski et al. |
| D505,424 S | 5/2005 | Ashida et al. |
| 6,897,845 B2 | 5/2005 | Ozawa |
| 6,897,854 B2 | 5/2005 | Cho et al. |
| 6,906,700 B1 | 6/2005 | Armstrong |
| 6,908,388 B2 | 6/2005 | Shimizu et al. |
| 6,922,632 B2 | 7/2005 | Foxlin |
| 6,925,410 B2 | 8/2005 | Narayanan |
| 6,929,543 B1 | 8/2005 | Ueshima et al. |
| 6,929,548 B2 | 8/2005 | Wang |
| 6,933,861 B2 | 8/2005 | Wang |
| 6,933,923 B2 | 8/2005 | Feinstein |
| 6,954,980 B2 | 10/2005 | Song |
| 6,955,606 B2 | 10/2005 | Taho et al. |
| 6,956,564 B1 | 10/2005 | Williams |
| 6,967,566 B2 | 11/2005 | Weston et al. |
| 6,982,697 B2 | 1/2006 | Wilson et al. |
| 6,984,208 B2 | 1/2006 | Zheng |
| 6,990,639 B2 | 1/2006 | Wilson |
| 6,993,206 B2 | 1/2006 | Ishino |
| 6,993,451 B2 | 1/2006 | Chang et al. |
| 6,995,748 B2 | 2/2006 | Gordon et al. |
| 6,998,966 B2 | 2/2006 | Pederson et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| 7,066,781 B2 | 6/2006 | Weston |
| D524,298 S | 7/2006 | Hedderich et al. |
| 7,081,051 B2 | 7/2006 | Himoto et al. |
| 7,090,582 B2 | 8/2006 | Danieli et al. |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| D531,228 S | 10/2006 | Ashida et al. |
| 7,115,032 B2 | 10/2006 | Cantu et al. |
| 7,126,584 B1 | 10/2006 | Nishiumi et al. |
| 7,127,370 B2 | 10/2006 | Kelly et al. |
| D531,585 S | 11/2006 | Weitgasser et al. |
| 7,133,026 B2 | 11/2006 | Horie et al. |
| 7,136,674 B2 | 11/2006 | Yoshie et al. |
| 7,139,983 B2 | 11/2006 | Kelts |
| 7,140,962 B2 | 11/2006 | Okuda et al. |
| 7,142,191 B2 | 11/2006 | Idesawa et al. |
| 7,149,627 B2 | 12/2006 | Ockerse et al. |
| 7,154,475 B2 | 12/2006 | Crew |
| 7,155,604 B2 | 12/2006 | Kawai |
| 7,158,118 B2 | 1/2007 | Liberty |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |
| D543,246 S | 5/2007 | Ashida et al. |
| 7,220,220 B2 | 5/2007 | Stubbs et al. |
| 7,225,101 B2 | 5/2007 | Usuda et al. |
| 7,231,063 B2 | 6/2007 | Naimark et al. |
| 7,233,316 B2 | 6/2007 | Smith et al. |
| 7,236,156 B2 | 6/2007 | Liberty et al. |
| 7,239,301 B2 | 7/2007 | Liberty et al. |
| 7,261,690 B2 | 8/2007 | Teller et al. |
| 7,262,760 B2 | 8/2007 | Liberty |
| D556,201 S | 11/2007 | Ashida et al. |
| 7,292,151 B2 | 11/2007 | Ferguson et al. |
| 7,301,527 B2 | 11/2007 | Marvit |
| 7,301,648 B2 | 11/2007 | Foxlin |
| D556,760 S | 12/2007 | Ashida et al. |
| D559,847 S | 1/2008 | Ashida et al. |
| D561,178 S | 2/2008 | Azuma |
| 7,335,134 B1 | 2/2008 | LaVelle |
| D563,948 S | 3/2008 | d'Hore |

| | | |
|---|---|---|
| D567,243 S | 4/2008 | Ashida et al. |
| 7,359,121 B2 | 4/2008 | French et al. |
| RE40,324 E | 5/2008 | Crawford |
| 7,379,566 B2 | 5/2008 | Hildreth |
| 7,395,181 B2 | 7/2008 | Foxlin |
| 7,414,611 B2 | 8/2008 | Liberty |
| 7,445,550 B2 | 11/2008 | Barney et al. |
| 7,488,231 B2 | 2/2009 | Weston |
| 7,500,917 B2 | 3/2009 | Barney et al. |
| 7,568,289 B2 | 8/2009 | Burlingham et al. |
| 7,582,016 B2 | 9/2009 | Suzuki |
| 7,614,958 B2 | 11/2009 | Weston et al. |
| 7,663,509 B2 | 2/2010 | Shen |
| 7,774,155 B2 | 8/2010 | Sato et al. |
| 7,775,882 B2 | 8/2010 | Kawamura et al. |
| 7,796,116 B2 | 9/2010 | Salsman |
| 7,877,224 B2 | 1/2011 | Ohta |
| 7,905,782 B2 | 3/2011 | Sawano et al. |
| 7,927,216 B2 | 4/2011 | Ikeda et al. |
| 7,931,535 B2 | 4/2011 | Ikeda et al. |
| 7,942,245 B2 | 5/2011 | Shimizu et al. |
| 2001/0008847 A1 | 7/2001 | Miyamoto et al. |
| 2001/0010514 A1 | 8/2001 | Ishino |
| 2001/0015123 A1 | 8/2001 | Nishitani et al. |
| 2001/0024973 A1 | 9/2001 | Meredith |
| 2001/0031662 A1 | 10/2001 | Larian |
| 2001/0049302 A1 | 12/2001 | Hagiwara |
| 2002/0024500 A1 | 2/2002 | Howard |
| 2002/0024675 A1 | 2/2002 | Foxlin |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0098887 A1 | 7/2002 | Himoto et al. |
| 2002/0103026 A1 | 8/2002 | Himoto et al. |
| 2002/0107069 A1 | 8/2002 | Ishino |
| 2002/0126026 A1 | 9/2002 | Lee |
| 2002/0137567 A1 | 9/2002 | Cheng |
| 2002/0140745 A1 | 10/2002 | Ellenby et al. |
| 2002/0158843 A1 | 10/2002 | Levine et al. |
| 2002/0183961 A1 | 12/2002 | French et al. |
| 2003/0038778 A1 | 2/2003 | Noguera et al. |
| 2003/0052860 A1 | 3/2003 | Park et al. |
| 2003/0057808 A1 | 3/2003 | Lee et al. |
| 2003/0063068 A1 | 4/2003 | Anton et al. |
| 2003/0069077 A1 | 4/2003 | Korienek |
| 2003/0107551 A1 | 6/2003 | Dunker |
| 2003/0144056 A1 | 7/2003 | Leifer et al. |
| 2003/0193572 A1 | 10/2003 | Wilson et al. |
| 2003/0195041 A1 | 10/2003 | McCauley |
| 2003/0204361 A1 | 10/2003 | Townsend et al. |
| 2003/0216176 A1 | 11/2003 | Shimizu et al. |
| 2003/0222851 A1 | 12/2003 | Lai et al. |
| 2004/0028258 A1 | 2/2004 | Naimark et al. |
| 2004/0034289 A1 | 2/2004 | Teller et al. |
| 2004/0048666 A1 | 3/2004 | Bagley |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0147317 A1 | 7/2004 | Ito et al. |
| 2004/0152515 A1 | 8/2004 | Wegmuller et al. |
| 2004/0193413 A1 | 9/2004 | Wilson et al. |
| 2004/0203638 A1 | 10/2004 | Chan |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0227725 A1 | 11/2004 | Calarco et al. |
| 2004/0229693 A1 | 11/2004 | Lind et al. |
| 2004/0239626 A1 | 12/2004 | Noguera |
| 2004/0252109 A1 | 12/2004 | Trent et al. |
| 2004/0254020 A1 | 12/2004 | Dragusin |
| 2004/0259651 A1 | 12/2004 | Storek |
| 2004/0268393 A1 | 12/2004 | Hunleth et al. |
| 2005/0017454 A1 | 1/2005 | Endo et al. |
| 2005/0020369 A1 | 1/2005 | Davis et al. |
| 2005/0032582 A1 | 2/2005 | Mahajan |
| 2005/0047621 A1 | 3/2005 | Cranfill |
| 2005/0054457 A1 | 3/2005 | Eyestone et al. |
| 2005/0070359 A1 | 3/2005 | Rodriquez et al. |
| 2005/0076161 A1 | 4/2005 | Albanna et al. |
| 2005/0085298 A1 | 4/2005 | Woolston |
| 2005/0107160 A1 | 5/2005 | Cheng et al. |
| 2005/0125826 A1 | 6/2005 | Hunleth et al. |
| 2005/0130739 A1 | 6/2005 | Argentar |
| 2005/0134555 A1 | 6/2005 | Liao |
| 2005/0143173 A1 | 6/2005 | Barney et al. |
| 2005/0170889 A1 | 8/2005 | Lum et al. |
| 2005/0172734 A1 | 8/2005 | Alsio |
| 2005/0174324 A1 | 8/2005 | Liberty et al. |
| 2005/0176485 A1 | 8/2005 | Ueshima |
| 2005/0179644 A1 | 8/2005 | Alsio |
| 2005/0210419 A1 | 9/2005 | Kela |
| 2005/0212749 A1 | 9/2005 | Marvit |
| 2005/0212750 A1 | 9/2005 | Marvit |
| 2005/0212751 A1 | 9/2005 | Marvit |
| 2005/0212752 A1 | 9/2005 | Marvit |
| 2005/0212753 A1 | 9/2005 | Marvit |
| 2005/0212754 A1 | 9/2005 | Marvit |
| 2005/0212755 A1 | 9/2005 | Marvit |
| 2005/0212756 A1 | 9/2005 | Marvit |
| 2005/0212757 A1 | 9/2005 | Marvit |
| 2005/0212758 A1 | 9/2005 | Marvit |
| 2005/0212759 A1 | 9/2005 | Marvit |
| 2005/0212760 A1 | 9/2005 | Marvit |
| 2005/0212764 A1 | 9/2005 | Toba |
| 2005/0212767 A1 | 9/2005 | Marvit et al. |
| 2005/0215295 A1 | 9/2005 | Arneson |
| 2005/0215322 A1 | 9/2005 | Himoto et al. |
| 2005/0217525 A1 | 10/2005 | McClure |
| 2005/0233808 A1 | 10/2005 | Himoto et al. |
| 2005/0239548 A1 | 10/2005 | Ueshima et al. |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0256675 A1 | 11/2005 | Kurata |
| 2006/0028446 A1 | 2/2006 | Liberty et al. |
| 2006/0030385 A1 | 2/2006 | Barnet et al. |
| 2006/0046849 A1 | 3/2006 | Kovacs |
| 2006/0092133 A1 | 5/2006 | Touma et al. |
| 2006/0094502 A1 | 5/2006 | Katayama et al. |
| 2006/0122474 A1 | 6/2006 | Teller et al. |
| 2006/0123146 A1 | 6/2006 | Wu et al. |
| 2006/0146021 A1* | 7/2006 | Voto et al. .................. 345/161 |
| 2006/0148563 A1 | 7/2006 | Yang |
| 2006/0152487 A1 | 7/2006 | Grunnet-Jepsen et al. |
| 2006/0152488 A1 | 7/2006 | Salsman et al. |
| 2006/0152489 A1 | 7/2006 | Sweetser et al. |
| 2006/0154726 A1 | 7/2006 | Weston et al. |
| 2006/0178212 A1 | 8/2006 | Penzias |
| 2006/0205507 A1 | 9/2006 | Ho |
| 2006/0231794 A1 | 10/2006 | Sakaguchi et al. |
| 2006/0252477 A1 | 11/2006 | Zalewski et al. |
| 2006/0256081 A1 | 11/2006 | Zalewski et al. |
| 2006/0258452 A1 | 11/2006 | Hsu |
| 2006/0264258 A1 | 11/2006 | Zalewski et al. |
| 2006/0264260 A1 | 11/2006 | Zalewski et al. |
| 2006/0282873 A1 | 12/2006 | Zalewski et al. |
| 2006/0287086 A1 | 12/2006 | Zalewski et al. |
| 2006/0287087 A1 | 12/2006 | Zalewski et al. |
| 2007/0015588 A1 | 1/2007 | Matsumoto et al. |
| 2007/0021208 A1 | 1/2007 | Mao et al. |
| 2007/0049374 A1 | 3/2007 | Ikeda et al. |
| 2007/0050597 A1 | 3/2007 | Ikeda et al. |
| 2007/0052177 A1 | 3/2007 | Ikeda et al. |
| 2007/0060391 A1 | 3/2007 | Ikeda et al. |
| 2007/0066394 A1 | 3/2007 | Ikeda et al. |
| 2007/0066396 A1 | 3/2007 | Weston et al. |
| 2007/0072680 A1 | 3/2007 | Ikeda et al. |
| 2007/0091084 A1 | 4/2007 | Ueshima et al. |
| 2007/0093291 A1 | 4/2007 | Hulvey |
| 2007/0159362 A1 | 7/2007 | Shen |
| 2007/0173705 A1 | 7/2007 | Teller et al. |
| 2007/0252815 A1 | 11/2007 | Kuo et al. |
| 2007/0265075 A1 | 11/2007 | Zalewski |
| 2007/0265076 A1 | 11/2007 | Lin et al. |
| 2007/0265088 A1 | 11/2007 | Nakada et al. |

| | | | | | | |
|---|---|---|---|---|---|---|
| 2008/0014835 | A1 | 1/2008 | Weston et al. | JP | 83-35136 | 12/1996 |
| 2008/0015017 | A1 | 1/2008 | Ashida et al. | JP | 9-230997 | 9/1997 |
| 2008/0039202 | A1 | 2/2008 | Sawano et al. | JP | 9-274534 | 10/1997 |
| 2008/0121782 | A1 | 5/2008 | Hotelling et al. | JP | 09-319510 | 12/1997 |
| 2008/0273011 | A1 | 11/2008 | Lin | JP | 10-021000 | 1/1998 |
| 2008/0278445 | A1 | 11/2008 | Sweetser et al. | JP | 10-033831 | 2/1998 |
| 2008/0280660 | A1 | 11/2008 | Ueshima et al. | JP | 10-99542 | 4/1998 |
| 2009/0005166 | A1 | 1/2009 | Sato | JP | 10-154038 | 6/1998 |
| 2009/0051653 | A1 | 2/2009 | Barney et al. | JP | 10-254614 | 9/1998 |
| 2009/0124165 | A1 | 5/2009 | Weston | JP | 11-099284 | 4/1999 |
| 2009/0156309 | A1 | 6/2009 | Weston et al. | JP | 11-506857 | 6/1999 |

FOREIGN PATENT DOCUMENTS

| | | |
|---|---|---|
| DE | 3930581 | 3/1991 |
| DE | 19701344 | 7/1997 |
| DE | 19701374 | 7/1997 |
| DE | 19648487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 1 524 334 | 3/1977 |
| EP | 0 835 676 | 4/1998 |
| EP | 0 848 226 | 6/1998 |
| EP | 0 852 961 | 7/1998 |
| EP | 1 062 994 | 12/2000 |
| EP | 1 279 425 | 1/2003 |
| EP | 1 293 237 | 3/2003 |
| EP | 0993845 | 12/2005 |
| GB | 1524334 | 9/1978 |
| GB | 2 244 546 | 5/1990 |
| GB | 2244546 | 5/1990 |
| GB | 2284478 | 6/1995 |
| GB | 2307133 | 5/1997 |
| GB | 2316482 | 2/1998 |
| GB | 2319374 | 5/1998 |
| JP | 60-077231 | 5/1985 |
| JP | 62-14527 | 1/1987 |
| JP | 03-74434 | 7/1991 |
| JP | 03-08103 | 8/1991 |
| JP | 3-059619 | 11/1991 |
| JP | 04-287888 | 10/1992 |
| JP | 5-056191 | 7/1993 |
| JP | 2-901476 | 12/1993 |
| JP | 6-50758 | 2/1994 |
| JP | 3-262677 | 5/1994 |
| JP | 6-154422 | 6/1994 |
| JP | 03-000028 | 7/1994 |
| JP | 6-190144 | 7/1994 |
| JP | 6-198075 | 7/1994 |
| JP | 3-194841 | 10/1994 |
| JP | 06-77387 | 10/1994 |
| JP | 3-273531 | 11/1994 |
| JP | 6-308879 | 11/1994 |
| JP | 3-228845 | 1/1995 |
| JP | 7-28591 | 1/1995 |
| JP | 7-44315 | 2/1995 |
| JP | 7044315 | 2/1995 |
| JP | 7-107573 | 4/1995 |
| JP | 07-22312 | 5/1995 |
| JP | 7-115690 | 5/1995 |
| JP | 3-517482 | 6/1995 |
| JP | 7-146123 | 6/1995 |
| JP | 7-200142 | 8/1995 |
| JP | 07-262797 | 10/1995 |
| JP | 7-302148 | 11/1995 |
| JP | 07-318332 | 12/1995 |
| JP | 8-071252 | 3/1996 |
| JP | 8-095704 | 4/1996 |
| JP | 8-106352 | 4/1996 |
| JP | 08-111144 | 4/1996 |
| JP | 11-114223 | 4/1996 |
| JP | 8-114415 | 5/1996 |
| JP | 8-122070 | 5/1996 |
| JP | 8-152959 | 6/1996 |
| JP | 8-211993 | 8/1996 |
| JP | 08-221187 | 8/1996 |
| JP | 8-305355 | 11/1996 |
| JP | 2000-270237 | 9/2000 |
| JP | 2000-308756 | 11/2000 |
| JP | 2001-038052 | 2/2001 |
| JP | 30-78268 | 4/2001 |
| JP | 2001-104643 | 4/2001 |
| JP | 03-080103 | 6/2001 |
| JP | 2001-175412 | 6/2001 |
| JP | 2001-251324 | 9/2001 |
| JP | 2001-306245 | 11/2001 |
| JP | 2002-062981 | 2/2002 |
| JP | 2002-082751 | 3/2002 |
| JP | 2002-091692 | 3/2002 |
| JP | 2002-153673 | 5/2002 |
| JP | 2002-202843 | 7/2002 |
| JP | 2002-224444 | 8/2002 |
| JP | 2002-232549 | 8/2002 |
| JP | 2002-233665 | 8/2002 |
| JP | 2002-298145 | 10/2002 |
| JP | 2003-053038 | 2/2003 |
| JP | 34-22383 | 4/2003 |
| JP | 2003-208263 | 7/2003 |
| JP | 2003-236246 | 8/2003 |
| JP | 2003-325974 | 11/2003 |
| JP | 2004-062774 | 2/2004 |
| JP | 2004-313429 | 11/2004 |
| JP | 2004-313492 | 11/2004 |
| JP | 2005-21458 | 1/2005 |
| JP | 2005-040493 | 2/2005 |
| JP | 2005-063230 | 3/2005 |
| JP | 2003-140823 | 4/2006 |
| JP | 2006-113019 | 4/2006 |
| JP | 2002-136694 | 6/2006 |
| JP | 2006-136694 | 6/2006 |
| JP | 2006-216569 | 4/2007 |
| JP | 2007-083024 | 4/2007 |
| JP | 2007-283134 | 11/2007 |
| NL | 9300171 | 8/1994 |
| RU | 2125853 | 2/1999 |
| RU | 2126161 | 2/1999 |
| RU | 2141738 | 11/1999 |
| WO | 94/02931 | 2/1994 |
| WO | 96/05766 | 2/1996 |
| WO | 97/09101 | 3/1997 |
| WO | 97/12337 | 4/1997 |
| WO | 97/17598 | 5/1997 |
| WO | 97/28864 | 8/1997 |
| WO | 97/32641 | 9/1997 |
| WO | 98/11528 | 3/1998 |
| WO | 99/58214 | 11/1999 |
| WO | 00/33168 | 6/2000 |
| WO | 00/35345 | 6/2000 |
| WO | 00/47108 | 8/2000 |
| WO | 00/63874 | 10/2000 |
| WO | 01/87426 | 11/2001 |
| WO | 01/91042 | 11/2001 |
| WO | 02/17054 | 2/2002 |
| WO | 02/34345 | 5/2002 |
| WO | 03/015005 | 2/2003 |
| WO | 03/107260 | 6/2003 |
| WO | 03/088147 | 10/2003 |
| WO | 2004/039055 | 5/2004 |
| WO | 2004/051391 | 6/2004 |

OTHER PUBLICATIONS

You et al., Fusion of Vision and Gyro Tracking for Robust Augmented Reality Registration, Proceedings of the Virtual Reality 2001 Conference, 2001, 1-8.

Office Action issued in U.S. Appl. No. 12/285,812 on Nov. 9, 2011.
English Abstract for Japanese Patent No. JP10021000, published Jan. 23, 1998.
English Abstract for Japanese Patent No. JP11053994, published Feb. 26, 1999.
English Abstract for Japanese Patent No. JP11099284, published Apr. 13, 1999.
English Abstract for Japanese Patent No. JP2001038052, published Feb. 13, 2001.
English Abstract for Japanese Patent No. JP2002224444, published Aug. 13, 2002.
English Abstract for Japanese Patent No. JP2006136694, published Jun. 1, 2006.
English Abstract for Japanese Patent No. WO9732641, published Sep. 12, 1997.
Acar, "Robust Micromachined Vibratory Gyroscopes" Dissertation (Dec. 2004).
Acar, et al., "Experimental evaluation and comparative analysis of commercial variable-capacitance MEMS accelerometers," *Journal of Micromechanics and Microengineering*, vol. 13 (1), pp. 634-645 (May 2003).
Achenbach, "Golf's New Measuring Stick," Golfweek, Jun. 11, 2005, 1 page.
Act Labs: Miacomet Background, 1 page, May 1999, http://www.act-labs.com/realfeel_background/htm.
AirPad Controller Manual (AirPad Corp. 2000).
Airpad Motion Reflext Controller for Sony Playstation—Physical Product (AirPad Corp.2000).
Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).
Algrain, et al., "Accelerometer Based Line-of-Sight Stabilization Approach for Pointing and Tracking System," Second IEEE Conference on Control Applications, vol. 1 , Issue 13-16 pp. 159-163 (Sep. 1993).
Algrain, et al., "Interlaced Kalman Filtering of 3-D Angular Motion Based on Euler's Nonlinear Equations," vol. 30, No. 1 (Jan. 1994).
Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).
Allen, et al., "Tracking: Beyond 15 Minutes of Thought," SIGGRAPH 2001 Course 11 (Course Pack) from Computer Graphics (2001).
Alves, "Extended Kalman filtering applied to a full accelerometer strapdown inertial measurement unit," M.S. Thesis Massachusetts Institute of Technology. Dept. of Aeronautics and Astronautics, Santiago (1992).
Analog Devices Data Sheet, "MicroConverter®, Multichannel 12-Bit ADC with Embedded Flash MCU, ADuC812" (2003) (http://www.analog.com/static/imported-files/data_sheets/ADUC812.pdf) 60 pages.
Analog Devices "ADXL202E Low-Cost ±2 g Dual-Axis Accelerometer with Duty Cycle Output" (Data Sheet), Rev. A (2000).
Analog Devices "ADXL330 Small, Low Power, 3-Axis ±2 g iMEMS Accelerometer" (Data Sheet), Rev. PrA (2005).
Analog Devices "ADXL50 Single Axis Accelerometer" (Data Sheet), http://www.analog.com/en/obsolete/adx150/products/product.html (Mar. 1996).
Analog Devices "ADXL50 Monolithic Accelerometer with Signal Conditioning" Datasheet (1996).
Analog Devices "ADXRS150 ±150°/s Single Chip Yaw Rate Gyro with Signal Conditioning" (Data Sheet), Rev. B (2004).
Analog Devices "ADXRS401 ±75°/s Single Chip Yaw Rate Gyro with Signal Conditioning" (Data Sheet), Rev. O (2004).
Ang, et al., "Design and Implementation of Active Error Canceling in Hand-held Microsurgical Instrument," Proceedings of the 2001 IEEE/RSJ International Conference on Intelligent Robots and Systems, vol. 2, (Oct. 2001).
Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).
Apostolyuk, Vladislav, "Theory and design of micromechanical vibratory gyroscopes," MEMS/NEMS Handbook, Springer, 2006, vol. 1, pp. 173-195 (2006).
Arcanatech, "IMP User's Guide" (1994).
Arcanatech, IMP (Photos) (1994).
Ascension Technology, The Bird 6D Input Devices (specification) (1998).
"ASCII Grip One Handed Controller," *One Switch—ASCII Grip One Handed Playstation Controller*, http://www.oneswitch.org.uk/1/ascii/grip.htm , Jul. 11, 2008, pp. 1-2.
"ASCII Grip" One-Handed Controller The Ultimate One-Handed Controller Designed for the Playstation Game Console (ASCII Entertainment 1997).
"ASCII/Sammy Grip V2," *One Switch-Accessible Gaming Shop—ASCII Grip V2*, http://www.oneswitch.org.uk/1/AGS/AGS-onehand/ascii-grip-v2.html, Jul. 10, 2008, pp. 1-2.
ASCII, picture of one-handed controller, 2 pages (Feb. 6, 2006).
Ashida et al., entitled, "Game Controller," U.S. Appl. No. 11/790,780, filed Apr. 27, 2007, pending.
"At-home fishin!" 1 page, Dec. 1996-1999.
Ator, "Image-Velocity with Parallel-Slit Reticles," Journal of the Optical Society of America (Dec. 1963).
Azarbayejani, et al, "Real-Time 3-D Tracking of the Human Body," Proceedings of IMAGE'COM 96 (1996).
Azarbayejani, et al., "Visually Controlled Graphics," IEEE Transactions on Pattern Analysis and Machine Intelligence, vol. 15, No. 6, pp. 602-605 (Jun. 1993).
Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).
Azuma et al., "Making Augmented Reality Work Outdoors Requires Hybrid Tracking," Proceedings of the International Workshop on Augmented Reality, San Francisco, CA, Nov. 1, 1998, Bellevue, Washington, pp. 219-224 (1999).
Azuma, "Predictive Tracking for Augmented Reality," Ph.D. Dissertation, University of North Carolina at Chapel Hill (1995).
Azuma, et al., "A Frequency-Domain Analysis of Head-Motion Prediction," Proceedings of SIGGRAPH '94, pp. 401-408 (1995).
Azuma, et al., "A motion-stabilized outdoor augmented reality system," Proceedings of IEEE Virtual Reality '99, Houston, TX (Mar. 1999).
Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001).
Bachmann et al., "Orientation Tracking for Humans and Robots Using Inertial Sensors" (CIRA '99), Naval Postgraduate School, Monterey, CA (1999).
Bachmann, "Inertial and Magnetic Angle Tracking of Limb Segments for Inserting Humans into Synthetic Environments," Dissertation, Naval Postgraduate School, Monterey, CA (Dec. 2000).
Baker et al., "Active Multimodal Control of a Floppy Telescope Structure," Proc. SPIE, vol. 4825, 74 (Mar. 2003).
Balakrishnan, "The Rockin' Mouse: Integral 3D Manipulation on a Plane," CHI '97 , Univ. Toronto, (1997).
Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-44 (ACM) (Apr. 5-10, 2003).
Baraff, "An Introduction to Physically Based Modeling," SIGGRAPH 97 Course Notes (1997).
Bass Fishing "Legends of the Lake", Radica 2 pages, 2002.
Baudisch, et al., "Soap: a pointing device that works in mid-air" Proc. UIST (2006).
BBN Report, "Virtual Environment Technology for Training (VETT)," The Virtual Environment and Teleoperator Research Consortium (VETREC) (Mar. 1992).
Behringer, "Improving Registration Precision Through Visual Horizon Silhouette Matching," Proceedings of the international workshop on Augmented reality : placing artificial objects in real scenes: placing artificial objects in real scenes, Bellevue, Washington, United States pp. 225-232 (1999).

Behringer, "Registration for Outdoor Augmented Reality Applications Using Computer Vision Techniques and Hybrid Sensors," Virtual Reality, 1999 Proceedings., IEEE Comsuter Society, 244-261 (1999).

Bei, "BEI Gyrochip™ Model QRS11 Data Sheet," BEI Systron Donner Inertial Division, BEI Technologies, Inc., (Sep. 1998).

Benbasat, "An Inertial Measurement Unit for User Interfaces," Massachusetts Institute of Technology Dissertation, (Sep. 2000).

Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg (2001, 2002).

Beuter, A., Publications, University of Quebec at Montreal, http://www.er.uqam.ca/nobel/r11040/publicat.htm (Aug. 2007).

BGM-109 Tomahawk, http://en.wikipedia.org/wiki/BGM-109_Tomahawk, Wikipedia, Jan. 2009.

Bhatnagar, "Position trackers for Head Mounted Display systems: A survey" (Technical Report), University of North Carolina at Chapel Hill (Mar. 1993).

Bianchi, "A Tailless Mouse, New cordless Computer Mouse Invented by ArcanaTech." Inc. Article (Jun. 1992).

Bishop, "The Self-Tracker: A Smart Optical Sensor on Silicon," Ph.D. Dissertation, Univ. of North Carolina at Chapel Hill (1984).

Bishop, et al., "Grids Progress Meeting" (Slides), University of North Carolina at Chapel Hill, NC (1998).

Bishop, et al., Self-Tracker: Tracking for Hybrid Environments without Infrastructure (1996).

Bloomberg: Nintendo Announces Wireless GBA Link, Sep. 2003, 2 pages.

Bona, et al., "Optimum Reset of Ship's Inertial Navigation System," IEEE Transactions on Aerospace and Electronic Systems (1965).

Borenstein, et al., "Where am I? Sensors and Methods for Mobile Robot Positioning" (1996).

Boser, "3-Axis Accelerometer with Differential Sense Electronics," http://www.eecs.berkeley.edu/~boser/pdf/3axis.pdf (1997).

Boser, "Accelerometer Design Example: Analog Devices XL-05/5," http://www.eecs.berkeley.edu/~boser/pdf/x105.pdf (1996).

Bowman et al., *3D User Interfaces: Theory and Practice*, Addison-Wesley, Inc., (2005).

Bowman,. et al., "An Introduction to 3-D User Interface Design," MIT Presence, vol. 10, No. 1, pp. 96-108 (2001).

Briefs (New & Improved) (Brief Article), PC Magazine, Oct. 26, 1993.

Britton et al., "Making Nested rotations Convenient for the User," ACM SIGGRAPH Computer Graphics, vol. 12, Issue 3, pp. 222-227 (Aug. 1978).

Britton, "A Methodology for the Ergonomic Design of Interactive Computer Graphic Systems, and its Application to Crystallography" (UNC Thesis) (1977).

Brownell, Richard: Review of Peripheral-GameCube-G3 Wireless Controller, GAF, Jul. 17, 2003, 2 pages.

Buchanan, Levi: "Happy Birthday, Rumble Pak," IGN.com, Apr. 3, 2008, 2 pages.

Business Wire, "Feature/Virtual reality glasses that interface to Sega channel," Time Warner, TCI: project announced concourrent with COMDEX (Nov. 1994).

Business Wire, "Free-space 'Tilt' Game Controller for Sony Playstation Uses Scenix Chip; SX Series IC Processes Spatial Data in Real Time for On-Screen" (Dec. 1999).

Business Wire, "InterSense Inc. Launches InertiaCube2—The World's Smallest Precision Orientation Sensor With Serial Interface" (Aug. 14, 2001).

Business Wire, "Logitech Magellan 3D Controller," Logitech (Apr. 1997).

Business Wire, "Mind Path Introduces Gyropoint RF Wireless Remote" (Jan. 2000).

Business Wire, "Pegasus' Wireless PenCell Writes on Thin Air with ART' s Handwriting Recognition Solutions," Business Editors/High Tech Writers Telecom Israel 2000 Hall 29, Booth 19-20 (Nov. 2000).

Business Wire, "RPI ships low-cost pro HMD Plus 3D Mouse and VR PC graphics card system for CES" (Jan. 1995).

Buxton, Bill, "Human input/output devices," In M. Katz (ed.), Technology Forecast: 1995, Menlo Park, C.A.: Price Waterhouse World Firm Technology Center, 49-65 (1994).

Buxton, Bill, A Directory of Sources for Input Technologies, http://www.billbuxton.com/InputSources.html, Apr. 2001 (last update 2008).

Buxton et al., "A Study in Two-Handed Input," ACM CHI '86 Proceedings (1986).

Byte, "Imp Coexists With Your Mouse," What's New, ArcanaTec (Jan. 1994).

Canaday, R67-26 "The Lincoln Wand," IEEE Transactions on Electronic Computers, vol. EC-16, No. 2, p. 240 (Apr. 1967).

Caruso et al., "New Perspective on Magnetic Field Sensing," Sensors Magazine (Dec. 1998).

Caruso et al., "Vehicle Detection and Compass Applications using AMR Magnetic Sensors," Honeywell (May 1999).

Caruso, "Application of Magnetoresistive Sensors in Navigation Systems," Sensors and Actuators, SAE SP-1220, pp. 15-21 (Feb. 1997 ).

Caruso, "Applications of Magnetic Sensors for Low Cost Compass Systems," Honeywell, SSEC, http://www.ssec.honeywell.com/magnetic/datasheets/lowcost.pdf (May 1999 ).

Chatfield, "Fundamentals of High Accuracy Inertial Navigation," vol. 174 Progress in Astronautics and Aeronautics, American Institute of Aeronautics and Astronautics, Inc. (1997).

Cheng, "Direct interaction with large-scale display systems using infrared laser tracking devices," ACM International Conference Proceeding Series; vol. 142 (2003).

Cho, et al., "*Magic Wand*: A Hand-Drawn Gesture Input Device in 3-D Space with Inertial Sensors," Proceedings of the 9th Intl Workshop on Frontiers in Handwriting Recognition (IWFHR-9 2004), IEEE (2004).

CNET News.com, http://news.com.com/2300-1043_3-6070295-2.html?tag=ne.gall.pg, "Nintendo Wii Swings Into Action," May 25, 2006, 1pg.

"Coleco Vision: Super Action™ Controller Set," www.vintagecomputing.com/wp-content/images/retroscan/coleco_sac_1_large.jpg. (Sep. 2006).

Computer Mouse (Wikipedia) (Jul. 5, 2005).

"Controllers-Atari Space Age Joystick," *AtariAge: Have You Played Atari Today*? www.atariage.com/controller_page.html?SystemID-2600&ControllerID=12. (Sep. 2006).

"Controllers-Booster Grip," *AtariAge: Have You Played Atari Today*? www.atariage.com/controller_page.html?SystemID=2600&ControllerID=18. (Sep. 2006).

Computergram, "RPI Entertainment Pods Improve Virtual Experience" (1995).

Cooke, et al., "NPSNET: flight simulation dynamic modeling using quaternions," Presence, vol. 1, No. 4,pp. 404-420, MIT Press (1992/1994).

Crossan, A. et al.: A General Purpose Control-Based Trajectory Playback for Force-Feedback Systems, University of Glasgow, Dept. Computing Science, 4 pages (Feb. 2008).

CSIDC Winners—Tablet-PC Classroom System Wins Design Competition, IEEE Computer Society Press, vol. 36 , Issue 8, pp. 15-18 , IEEE Computer Society (Aug. 2003).

Cutrone, "Hot products: Gyration GyroPoint Desk, GyroPoint Pro gyroscope-controlled wired and wireless mice" (Computer Reseller News) (Dec. 1995).

Cutts, "A Hybrid Image/Inertial System for Wide-Area Tracking" (Internal to UNC-CH Computer Science) (Jun. 1999).

Cyberglove/Cyberforce, Immersion, Cyberforce CyberGlove Systems "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005.

Deruyck, et al., "An Electromagnetic Position Sensor," Polhemus Navigation Sciences, Inc., Burlington, VT (Nov. 1973.).

Dichtburn, "Camera in Direct3D" Toymaker, Mar. 5, 2005, 5 pages, http://web.arcbive.org/web/20050206032104/http://toymaker.info/games/html/camera.html.

Donelson, et al., "Spatial Management of Information" (1978).

Eiβele, "Orientation as an additional User Interface in Mixed-Reality Environments," 1. workshop Ervwiterte und Virtuelle Realität, pp. 79-90. GI-Fachgruppe AR/VR (2007).

Electro-Plankton Weblog, http://www.tranism.com/weblog/2005/09/, "This is the Revolution, Nintendo Style," Sep. 15, 2005, 2 pgs.

"Electronic Plastic: BANDAI—Power Fishing", "Power Fishing Company: BANDAIi", 1984, 1 page, http://www.handhelden.com/Bandai/PowerFishing.html.

Emura, et al., "Sensor Fusion Based Measurement of Human Head Motion," 3rd IEEE International Workshop on Robot and Human Communication (Jul. 1994).

Ewalt, David M., "Nintendo's Wii is a Revolution," Review, Forbes.com (Nov. 13, 2006).

Fielder, Lauren: "E3 2001: Nintendo unleashes GameCube software, a new Miyamoto game, and more," GameSpot, May 16, 2001, 2 pages, http://www.gamespot.com/downloads/2761390.

Ferrin, "Survey of Helmet Tracking Technologies," Proc. SPIE vol. 1456, p. 86-94 (Apr. 1991).

Fishing Games: The Evolution of Virtual Fishing Games and related Video Games/Computer Games, 15 pages, 2003.

Foley et al., "Computer Graphics: Principles and Practice," Second Edition, 1990.

Foremski, T. "Remote Control Mouse Aims at Interactive TV", Electronics Weekly, Mar. 9, 1994.

Foxlin et al., "An Inertial Head-Orientation Tracker with Automatic Drift Compensation for Use with HMD's," Proceedings of the conference on Virtual reality software and technology, Singapore, Singapore, pp. 159-173 (1994).

Foxlin et al., "Miniature 6-DOF Inertial System for Tracking HMDs," SPIE vol. 3362 (Apr. 1998).

Foxlin et al., "Miniaturization, Calibration & Accuracy Evaluation of a Hybrid Self-Tracker," The Second IEEE and ACM International Symposium on Mixed and Augmented Reality, pp. 151-160 (2003).

Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA.

Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).

Foxlin, "Generalized architecture for simultaneous localization, auto-calibration, and map-building," IEEE/RSJ Conf. on Intelligent Robots and Systems, Lausanne, Switzerland (Oct. 2002).

Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000.

Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).

Foxlin, "Inertial Head-Tracking," MS Thesis, Massachusetts Institute of Technology, Dept. of Electrical Engineering and Computer Science (Sep. 1993).

Foxlin, "Motion Tracking Requirements and Technologies," Chapter 7, from Handbook of Virtual Environment Technology, Stanney Kay, Ed. (2002).

Foxlin, "Pedestrian Tracking with Shoe-Mounted Inertial Sensors," IEEE Computer Graphics and Applications, vol. 25, No. 6, pp. 38-46 (Nov. 2005).

Foxlin, et al., "Constellation: A Wide-Range Wireless Motion-Tracking System for Augmented Reality and Virtual Set Applications," ACM SIGGRAPH, pp. 372-378 (1998).

Foxlin, et al., "VIS-Tracker: A Wearable Vision-Inertial Self-Tracker," IEEE Computer Society (2003).

Frankie, "E3 2002: Roll O Rama", IGN: Roll-o-Rama Preview, . 3 pages. E3 Demo of Kirby game ("Roll O Rama"), http://cube.ign.com/objects/482/482164.html, (May 23, 2002).

Freiburg Center for Data Analysis and Modeling—Publications, http://www.fdm.uni-freiburg.de/cms/puplications/publications/ (Aug. 2007).

Friedmann, et al., "Device Synchronization Using an Optimal Linear Filter," SI3D '92: Proceedings of the 1992 symposium on Interactive 3D graphics, pp. 57-62 (1992).

Friedmann, et al., "Synchronization in virtual realities," MIT Presence, vol. 1, No. 1, pp. 139-144 (1992).

Fröhlich, "The Yo Yo: An interaction device combining elastic and isotonic control," at http://www.uni-weimar.de/cms/medien/vr/research/hci/3d-handheld-interaction/the-yoyo-a-handheld-device-combining-elastic-and-isotonic-input.html (2003).

FrontSide Field Test, "Get This!", Golf Magazine, Jun. 2005, p. 36.

Fuchs, "Intertial Head-Tracking," Massachusetts Institute of Technology, Sep. 1993.

Furniss, Maureen, "Motion Capture," MoCap MIT (Dec. 1999) 12 pages.

"Game Controller" Wikipedia, Aug. 2010, 8 pages, http://en.wikipedia.org/w/index.php?title=Game_controller&oldid=21390758.

"Game Controller" Wikipedia, Jan. 5, 2005.

GameCubicle, Jim—New Contributor, Nintendo WaveBird Control, http://www.gamecubicle.com/news-nintendo_gamecube_wavebird_controller.htm, May 14, 2002.

Geen et al.: "MEMS Angular Rate-Sensing Gyroscope" pp. 1-3 (2003).

Gelmis, J.: "Ready to Play, The Future Way", Jul. 23, 1996, Buffalo News.

"Get Bass", Videogame by Sega, The International Arcade Museum and the KLOV, 1998, 4 pages.

"Glove-based input interfaces", Cyberglove/Cyberforce, Jun. 1991, 12 pages, http://www.angelfire.com/ca7/mellott124/glove1.htm.

Goschy, "Midway Velocity Controller" (youtube video http://www.youtube.com/watch?v=wjLhSrSxFNw) (Sep. 8, 2007).

Grewal et al., "Global Positioning Systems, Inertial Navigation and Integration," 2001.

Grimm et al., "Real-Time Hybrid Pose Estimation from Vision and Inertial Data," Proceedings, First Canadian Conference on Computer and Robot Vision, pp. 480-486 (2004).

Gyration, Inc., GyroRemote and Mobile RF Keyboard User Manual, Saratoga, CA 24 pages, www.theater.stevejenkins.com/docs/Gyration_Keyboard_Manual (Mar. 9, 2011).

Gyration, Inc., GyroRemote GP240-01 Professional Series, copyrighted 2003, www.gyration.com.

Gyration Ultra Cordless Optical Mouse, Setting Up Ultra Mouse, Gyration Quick Start Card part No. DL00071-0001 Rev. A. Gyration, Inc. (Jun. 2003).

Gyration Ultra Cordless Optical Mouse, User Manual, 1-15, Gyration, Inc., Saratoga, CA (2003).

Gyration, "Gyration GP110 Ultra Cordless Optical Mouse Data Sheet," http://www.gyration.com/descriptions/document/GP110-SPEC-EN.pdf (2002).

Gyration, "Gyration GP110 Ultra Cordless Optical Mouse User Manual," http://www.gyration.com/descriptions/document/GP110-MANUAL-EN.pdf (2002).

Gyration, "Gyration MicroGyro 100 Developer Kit Data Sheet," http://web.archive.org/web/19980708122611/www.gyration.com/html/devkit.html (Jul. 1998).

Gyration, "Gyration Ultra Cordless Optical Mouse," photos (2002).

Hamilton Institute, http://www.dcs.gla.ac.uk/.about.rod/, R. Murray-Smith (Aug. 2007).

Harada, et al., "Portable Absolute Orientation Estimation Device with Wireless Network under Accelerated Situation" Proceedings, 2004 IEEE International Conference on Robotics and Automation, vol. 2, Issue, Apr. 26-May 1, 2004 pp. 1412-1417 vol. 2 (Apr. 2004).

Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).

Hartley, Matt, "Why is the Nintendo Wii So Successful?", Smarthouse—The Lifestyle Technology Guide Website (Sep. 12, 2007).

Haykin, et al., "Adaptive Tracking of Linear Time-Variant Systems by Extended RLS Algorithms, IEEE Transactions on Signal Processing," vol. 45, No. 5 (May 1997).
Heath, "Virtual Reali Resource Guide AI Expert," v9 n5 p. 32(14) (May 1994).
Hinckley, Ken, "Haptic Issues for Virtual Manipulation," Thesis (Dec. 1996).
Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-58 (UIST '03 Vancouver BC Canada) (ACM) (Nov. 2003).
Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).
Hinckley, Ken, et al., "The VideoMouse: A Camera-Based Multi-Degree-of-Freedom Input Device," CHI Letters vol. 1, 1, UIST '99, Asheville, NC, pp. 103-112 (1999).
Hinckley. et al. , "A Survey of Design Issues in Spatial Input," Proceedings of the ACM Symposium on User Interface Software and Technology (1994).
Hinkley et al. Stitching: pen gestures that span multiple displays, 2004.
Hinkley et al.: Synchronomous gestures for multiple persons and computers, 2003.
Hogue, "MARVIN: A Mobile Automatic Realtime Visual and INertial tracking system," Master's Thesis, York University (2003).
Hogue, et al., "An optical-inertial tracking system for fully-enclosed VR displays," Proceedings of the 1st Canadian Conference on Computer and Robot Vision, pp. 22-29 (May 2004 ).
Holden, Maureen K., et al.: Use of Virtual Environments in Motor Learning and Rehabilitation Department of Brain and Cognitive Sciences, Handbook of Virtual Environments: Design, Implementation, and Applications, Chap. 49, pp. 999-1026, Stanney (ed), Lawrence Erlbaum Associates 2002.
Holloway, Richard Lee, "Registration Errors in Augmented Reality Systems," Ph.D. Dissertation, University of North Carolina at Chapel Hill (1995).
House, Matthew, Product Description: Hot Wheels Stunt Track Driver, Hot Wheels (Jan. 2000).
Hudson Soft, "Brochure of Toukon Road Brave Warrior, Brave Spirits" (1998).
Hudson Soft—Screen Shot of Brave Spirits (1998 ).
Immersion CyberGlove product, Immersion Corporation, 1990, http://www.cyberglovesystem.com.
Inman, "Cheap sensors could capture your every move," http://technology.newscientist.com/article/dn12963-cheap-sensors-could-capture-your-every-move.html (Nov. 2007 ).
InterSense, "InterSense InertiaCube2 Devices," (Specification) (image) (2001).
InterSense, "InterSense InertiaCube2 Manual for Serial Port Model" (2001).
InterSense, InterSense IS 900 Technical Overview—Motion Tracking System, 1999.
InterSense, "InterSense IS-1200 FlightTracker Prototype Demonstration" (Video) (Nov. 2004).
InterSense, "InterSense IS-1200 InertiaHawk Datasheet" (2009).
InterSense, "InterSense IS-1200 VisTracker Datasheet" (2007).
InterSense, "InterSense IS-1200 VisTracker Devices," (image) (2007).
InterSense, "InterSense IS-900 MicroTrax™ Datasheet" (2007).
InterSense, "InterSense IS-900 Systems Datasheet" (2007).
InterSense, "InterSense MicroTrax Demo Reel," http://www.youtube.com/watch?v=O2F4fu_CISo (2007).
InterSense, "IS-900 Precision Motion Trackers" www.isense.com May 16, 2003.
InterSense, "InterSense Motion Trackers" www.isense.com Mar. 12, 1998.
InterSense, "InterSence Inc., The New Standard in Motion Tracking" www.isense.com Mar. 27, 2004.
InterSense, "IS-900 Precision Motion Trackers" www.isense.com Sep. 10, 2002.
Intersense, "IS-900 Product Technology Brief," http://www.intersense.com/uploadedFiles/Products/White_Papers/IS900_Tech_Overview_Enhanced.pdf (1999).
InterSense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).
Izumori et al, High School Algebra: Geometry (1986) (高等学校の代数・幾何 改訂版) ).
Jacob, "Human-Computer Interaction—Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).
Jakubowsk, et al., "Increasing Effectiveness of Human Hand Tremor Separation Process by Using Higher-Order Statistics," Measurement Science Review, vol. 1 (2001).
Jakubowski, et al., "Higher Order Statistics and Neural Network for Tremor Recognition," IEEE Transactions on Biomedical Engineering, vol. 49, No. 2 (Feb. 2002).
Ji, H.: "Study on the Infrared Remote-Control Lamp-Gesture Device", Yingyong Jiguang/Applied Laser Technology, v. 17, n. 5, p. 225-227, Oct. 1997 Language: Chinese—Abstract only.
Jian, et al., "Adaptive Noise Cancellation," Rice University, http://www.ece.rice.edu/.about.klwang/elec434/elec434.htm, (Aug. 2007).
Jiang, "Capacitive position-sensing interface for micromachined inertial sensors," Dissertation at Univ. of Cal. Berkley (2003).
Ju, et al., "The Challenges of Designing a User Interface for Consumer Interactive Television Consumer Electronics Digest of Technical Papers.," IEEE 1994 International Conference on Volume , Issue , Jun. 21-23, 1994 pp. 114-115 (Jun. 1994).
Kalawsky, "The Science of Virtual Reality and Virtual Environments," 1993.
Keir, et al., "Gesture-recognition with Non-referenced Tracking," IEEE Symposium on 3D User Interfaces, pp. 151-158 (Mar. 25-26, 2006).
Kennedy, P.J., "Hand-Held Data Input Device," IBM Technical Disclosure Bulletin, vol. 26, No. 11, pp. 5826-5827 (Apr. 1984).
Kessler, et al., "The Simple Virtual Environment Library" (MIT Presence) (2000).
Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).
Klein et al.,"Tightly Integrated Sensor Fusion for Robust Visual Tracking," British Machine Vision Computing, vol. 22, No. 10, pp. 769-776 (2004).
Kohler, "Triumph of the Wii: How Fun Won Out in the Console Wars," www.wired.com/print/gaming/hardware/news/2007/06/wii. (Jun. 2007).
Kohlhase, "NASA Report, The Voyager Neptune travel guide," Jet Propulsion Laboratory Publication 89-24, excerpt (Jun. 1989).
Krumm, et al., "How a Smart Environment Can Use Perception," Ubicomp 2001 (Sep. 2001).
Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).
Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland (Sep. 10-13, 2000).
La Scala, et al., "Design of an Extended Kalman Filter Frequency Tracker," IEEE Transactions on Signal Processing, vol. 44, No. 3 (Mar. 1996).
Larimer et al., "VEWL: A Framework for building a Windowing Interface in a Virtual Environment," in Proc. of IFIP TC13 Int. Conf. on Human-Computer Interaction Interact'2003 (Zürich, http://people.cs.vt.edu/~bowman/papers/VEWL_final.pdf (2003).
Laughlin, et al., "Inertial Angular Rate Sensors: Theory and Applications," Sensors Magazine (Oct. 1992).
Lee et al., "Tilta-Pointer: the Free-Space Pointing Device," Princeton COS 436 Project, http://www.milyehuang.com/cos436/project/specs.html (2004).

Lee, et al., "Innovative Estimation Method with Measurement Likelihood for all-Accelerometer Type Inertial Navigation System," IEEE Transactions on Aerospace and Electronic Systems, vol. 38, No. 1 (Jan. 2002).

Lee, et al., "Two-Dimensional Position Detection System with MEMS Accelerometer for Mouse Applications" Design Automation Conference, 2001. Proceedings, 2001 pp. 852-857 (Jun. 2001).

Leganchuk et al., "Manual and Cognitive Benefits of Two-Handed Input: An Experimental Study," ACM Transactions on Computer-Human Interaction, vol. 5, No. 4, pp. 326-359 (Dec. 1998).

Leonard, "Computer Pointer Controls 3D Images in Free Space," Electronic Design, pp. 160, 162, 165 , (Nov. 1991).

Liang, et al., "On Temporal-Spatial Realism in the Virtual Reality Environment," ACM 1991 Symposium on User Interface Software and Technology (Nov. 1991).

Link, "Field-Qualified Silicon Accelerometers From 1 Milli g to 200,000 g," Sensors (Mar. 1993).

Liu, et al., "Enhanced Fisher Linear Discriminant Models for Face Recognition," Proc. 14.sup.th International Conference on Pattern Recognition, Queensland, Australia (Aug. 1998).

Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).

Logitech, Logitech 2D/6D Mouse Devices Specification (1991).

Logitech, "Logitech 2D/6D Mouse Technical Reference Manual" (1991).

Logitech, Inc., "3D Mouse & Head Tracker Technical Reference Manual" (1992).

Logitech WingMan Cordless Rumblepad, Logitech, Press Release Sep. 2, 2001, 2 pages.

Louderback, Jim, "Nintendo Wii," Reviews by PC Magazine, (Nov. 13, 2006).

"LPC2104/2105/2106, Single-chip 32-bit microcontrollers; 128 kB ISP/IAP Flash with 64 kB/32 kB/16 kB RAM", Phillips, Dec. 22, 2004; 32 pages.

Luinge, Inertial sensing of human movement, Thesis, University of Twente (2002).

Luinge, et al., "Estimation of orientation with gyroscopes and accelerometers," Proceedings of the First Joint BMES/EMBS Conference, 1999., vol. 2, p. 844 (Oct. 1999).

Luthi, P. et al., "Low Cost Inertial Navigation System," and translation (2000).

MacKenzie et al., "A two-ball mouse affords three degrees of freedom," Extended Abstracts of the CHI '97 Conference on Human Factors in Computing Systems, pp. 303-304. New York: ACM (1997).

MacKinlay, "Rapid Controlled Movement Through a Virtual 3D Workspace," ACM SIGGRAPH Computer Graphics archive, vol. 24 , No. 4, pp. 171-176 (Aug. 1990).

MacLean, "Designing with Haptic Feedback", Proceedings of IEEE Robotics and Automation (ICRA '2000), at 783-88 (Apr. 22-28, 2000).

MacLean, Karen, Publications and patents, bibliography (Nov. 2006).

Maggioni, C., "A novel gestural input device for virtual reality", IEEE Virtual Reality Annual International Symposium, 118-24, 1993.

Markey et al., "The Mechanics of Inertial Position and Heading Indication," Massachusetts Institute of Technology, 1961.

Marti et al., "Biopsy navigator: a smart haptic interface for interventional radiological gestures", International Congress Series, vol. 1256, Jun. 2003, 6 pages.

Marrin, "Possibilities for the Digital Baton as a General-Purpose Gestural Interface", Late-Breaking/Short Talks, CHI 97, Mar. 22-27, 1997 (pp. 311-312).

Marrin, Teresa et al.: "The Digital Baton: a Versatile Performance Instrument" (1997).

Marrin, Teresa: "Toward an Understanding of Musical Gesture: Mapping Expressive Intention with the Digital Baton" (1996).

Masliah, "Measuring the Allocation of Control in 6 Degree of Freedom Human-Computer Interaction Tasks," Proceedings of the SIGCHI conference on Human factors in computing systems, pp. 25-32 (2001 ).

Maybeck, "Stochastic Models, Estimation and Control," vol. 1, Mathematics in Science and Engineering, vol. 141 (1979).

"MEMS enable smart golf clubs" Small Times—MEMS enable smart golf clubs, Jan. 6, 2005, 2 pages.

Merians, Alma S. et al.: "Virtual Reality-Augmented Rehabilitation for Patients Following Stroke," Physical Therapy, vol. 82, No. 9 (Sep. 2002).

Merrill, "FlexiGesture: A sensor-rich real-time adaptive gesture and affordance learning platform for electronic music control," Thesis, Massachusetts Institute of Technology (Jun. 2004).

Meyer et al., "A Survey of Position Tracker," vol. 1, Issue 2, pp. 173-200, MIT Presence, (1992).

Microsoft Research Corp., "XWand Devices" (image) (Apr. 2009).

Miles, "New pads lack control," The Times, Dec. 6, 1999.

Mizell, "Using Gravity to Estimate Accelerometer Orientation," IEEE Computer Society (2003).

Morgan, C.; "Still chained to the overhead projector instead of the podium? (TV Interactive Corp's LaserMouse Remote Pro infrared mouse) (Clipboard)(Brief Article) (Product Announcement)", Government Computer News, Jun. 13, 1994.

Morris, "Accelerometry—a technique for the measurement of human body movements," J Biomechanics 6: 729-736 (1973).

Moser, "Low Budget Inertial Navigation Platform (2000)," www.tmoser.ch/typo3/11.0.html, Oct. 2008.

Mulder, "How to Build an Instrumental Glove Based on the Powerglove Flex Sensors," PCVR 16, pp. 10-14 (1994).

Mulder, "Human movement tracking technology," School of Kinesiology, Simon Fraser University (Jul. 1994).

Myers, et al., "Interacting at a Distance: Measuring the Performance of Laser Pointers and Other Devices," CHI 2002, (Apr. 2002).

N.I.C.E., "The N.I.C.E. Project" (video), (1997) http://www.niceproject.com/.

Naimark, et al., "Circular Data Matrix Fiducial System and Robust Image Processing for a Wearable Vision-Inertial Self-Tracker," Proceedings. International Symposium on Mixed and Augmented Reality, ISMAR (2002).

Naimark, et al., "Encoded LED System for Optical Trackers," Fourth IEEE and ACM International Symposium on Mixed and Augmented Reality, pp. 150-153 (2005).

Navarrete, et al., "Eigenspace-based Recognition of Faces: Comparisons and a new Approach," Image Analysis and Processing (2001).

Newswire PR, "Five New Retailers to Carry Gyration's Gyropoint Point and Gyropoint Pro" (1996).

Newswire PR, "Three-Axis MEMS-based Accelerometer From STMicroelectronics Targets Handheld Terminals," STMicro (Feb. 2003).

Nichols, "Geospatial Registration of Information for Dismounted Soldiers (GRIDS)," Contractor's Progress, Status, and Management Report (Milestone 3 Report to DARPA ETO) (Oct. 1998).

Nintendo, G3 Wireless Controller (Pelican) (2001).

Nintendo, Game Boy Advance SP System (2003).

Nintendo, GameBoy Color (1998).

Nintendo Game Boy, Consumer Information and Precautions Booklet, Nintendo, Jul. 31, 1969.

Nintendo, GameCube Controller (2001).

Nintendo, GameCube System and Controller (2001).

Nintendo, NES Controller (1984).

Nintendo, NES Duck Hunt Game (1984).

Nintendo, NES System and Controllers (1984).

Nintendo, NES Zapper Guns (1984).

Nintendo, Nintendo 64 Controller (1996).

Nintendo, Nintendo 64 System (N64) (1996).

Nintendo, Nintendo 64 System and Controllers (1996).

Nintendo, Nintendo Entertainment System (NES) (1984).

Nintendo, Nintendo Game Boy Advance (2001).

Nintendo, Nintendo Game Boy Advance System (2001).

Nintendo, Nintendo Game Boy Advance Wireless Adapter (Sep. 26, 2003).

Nintendo, Nintendo Game Boy Color Game Cartridge with Built-In Rumble (Jun. 28, 2009).

Nintendo, Nintendo GameBoy Color System (1998).

Nintendo, Nintendo GameBoy System (1989).

Nintendo, Nintendo GameCube System (2001).

Nintendo, Nintendo N64 Controller with Rumble Pack (1996-1997).
Nintendo, Nintendo N64 Rumble Packs (1996-1997).
Nintendo, Nintendo Super NES (SNES) (1991).
Nintendo, Nintendo: Kirby Tilt & Tumble game, packaging and user manual (Aug. 2000-2001).
Nintendo, Nintendo: WarioWare: Twisted tame, sackatint and user manual (2004-2005).
Nintendo, Pokemon Pinball (1998).
Nintendo, SNES Superscope (1991).
Nintendo, SNES System & Controllers (1991).
Nintendo, Wavebird Wireless Controllers (May 2002).
Nintendo Wavebird Controller, Nintendo, Jun. 2010 Wikipedia Article, http://en.wikipedia.org/wiki/WaveBird.
Nintendo, Nintendo Entertainment System Consumer Information and Precautions Booklet, Ninendo of America, Inc. 1992.
Nintendo, Nintendo Entertainment System Instruction Nintendo of America, Inc. 1992.
Nintendo, Nintendo Entertainment System Booth 2002.
Nintendo, Nintendo Entertainment System Layout, May 9, 2002.
Nintendo, Nintendo Feature: History of Pokeman Part 2, Official Nintendo Magazine May 17, 2009, http:///www.officialnintendomagazine.co.uk/article.php?id=8576.
Nishiyama, "A Nonlinear Filter for Estimating a Sinusoidal Signal and its Parameters in White Noise: On the Case of a Single Sinusoid," IEEE Transactions on Signal Processing, vol. 45, No. 4 (Apr. 1997).
Nishiyama, "Robust Estimation of a Single Complex Sinusoid in White Noise-H.infin. Filtering Approach," IEEE Transactions on Signal Processing, vol. 47, No. 10 (Oct. 1999).
Odell, "An Optical Pointer for Infrared Remote Controllers," Proceedings of International Conference on Consumer Electronics (1995).
Odell, Transcript of Testimony, Investigation No. 337-TA-658, Before the United States International Trade Commission, vol. IV, redacted (May 14, 2009).
Ogawa et al., "Wii are the Elite," GameSpot web site (Feb. 5, 2008).
Ojeda, et al., "No GPS? No Problem!" University of Michigan Develops Award-Winning Personal Dead-Reackoning (PDR) System for Walking Users, http://www.engin.umich.edu/research/mrl/urpr/In_Press/P135.pdf (post 2004).
OLPC, "One Laptop Per Child," wiki.laptop.org/go/One_Laptop_per_Child (May 2009).
Omelyan, "On the numerical integration of motion for rigid polyatomics: The modified quaternion approach" Computers in Physics, vol. 12 No. 1, pp. 97-103 (1998).
Ovaska, "Angular Acceleration Measurement: A Review," Instrumentation and Measurement Technology Conference, Conference Proceedings. IEEE, vol. 2 (Oct. 1998).
PAD-Controller and Memory I/F in Playstation (Apr. 17, 1995; Jan. 12, 2002).
Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).
Paley, W. Bradford, "Interaction in 3D Graphics," SIGGRAPH Computer Graphics Newsletter, Cricket input device (Nov. 1998).
Paradiso, et al., "Interactive Therapy with Instrumented Footwear," CHI 2004, Apr. 24-29, 2004, Vienna, Austria (2004).
Paradiso, Joseph A., "The Brain Opera Technology: New Instruments and Gestural Sensors for Musical Interaction and Performance" (Nov. 1998) ("Brain Opera Article").
Park, Adaptive control strategies for MEMS gyroscopes (Dissertation), Univ. Cal. Berkley (2000).
PC World, "The 20 Most Innovative Products of the Year" (Dec. 27, 2006).
Perry Simon: "Nintendo to Launch Wireless Game Boy Adaptor," Digital Lifestyles, Sep. 26, 2003 http://digital-lifestyles.info/2003/09/26/nintendo-to-launch-wireless-game-boy-adaptor/.
Pham, Hubert "Pointing in Intelligent Environments with WorldCursor," Proceedings of Internet 2003, Andrew Wilson (2003).
Phillips, "Forward/Up Directional Incompatibilities During Cursor Placement Within Graphical User Interfaces," Ergonomics, informaworld.com (May 2005).
Phillips, "On the Right Track: A unique optical tracking system gives users greater freedom to explore virtual worlds" (Apr. 2000).
Photographs of prior art ASCII Grip V2 Controller, (ASCII/Sammy Grip V2 One Switch-Accessible Gaming Shop-ASCII Grip V2, http://www.oneswitch.org.uk/1/AGS/AGS-onehand/ascii-grip-v2.html, Jul. 10, 2008, pp. 1-2.).
Pierce et al., "Image Plane Interaction Techniques in 3D Immersive Environments," Proceedings of the 1997 symposium on Interactive 3D graphics, portal.acm.org (1997).
Pilcher, "AirMouse Remote Controls," IEEE Conference on Consumer Electronics (1992).
Pique, "Semantics of Interactive Rotations," Interactive 3D Graphics, Proceedings of the 1986 workshop on Interactive 3D graphics, pp. 259-269 (Oct. 1986).
Piyabongkarn, "Development of a MEMS Gyroscope for Absolute Angle Measurement," IEEE Transactions on Control Systems Technology, vol. 13, Issue 2, pp. 185-195 (Mar. 2005).
Piyabongkarn, "Development of a MEMS Gyroscope for Absolute Angle Measurement," Dissertation, Univ. Minnesota (Nov. 2004).
Pokeman Pinball Game, 1999, Wikipedia Article, http://en.wikipedia.org/wiki/Pok?C3?A9mon_Pinball.
Polhemus, "Polhemus 3Space FASTRAK devices" (image) (2000).
Polhemus: "FASTRAK, The Fast and Easy Digital Tracker" copyrighted 2001, Coldiester, Vermont 2 pages.
PowerGlove product Program Guide, Mattel, 1989.
PowerGlove product, Mattel, 1989 Wikipedia Article.
PowerGlove product, Instructions, Mattel, 1989.
Pryor et al., "A Reusable Software Architecture for Manual Controller Integration," IEEE Conf. on Robotics and Automation, Univ of Texas (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Raethjen, et al., "Tremor Analysis in Two Normal Cohorts," Clinical Neurophysiology 115 (2004).
Rebo, "Helmet-mounted virtual environment display system," Thesis, Air Force Institute of Technology, Defense Technical Information Center (Dec. 1988).
Rebo, et al., "Helmet-Mounted Virtual Environment Display System," Proc. SPIE vol. 1116, pp. 80-84 (Sep. 1989).
Regan, "Smart Golf Clubs", The Baltimore Sun, Jun. 17, 2005, 1 page.
Rekimoto, "Tilting Operations for Small Screen Interfaces," Proceedings of the 9th Annual ACM Symposium on User Interface Software and Technology, pp. 167-168 (1996).
Reunert, "Fiber-Optic Gyroscopes: Principles and Applications," Sensors, (Aug. 1993).
Ribo, et al., "Hybrid Tracking for Outdoor Augmented Reality Applications," IEEE Computer Graphics and Applications, vol. 22, No. 6, pp. 54-63 (Nov./Dec. 2002).
Riviere, Cameron, Testimony, Trial Day 5, In the Matter of Certain Video Game Machines and Related Three-Dimensional Pointing Devices, ITC Investigation No. 337-TA-658 (May 15, 2009).
Riviere, C., Robotics Institute, http://www.ri.cmu.edu/people/riviere.sub.--cameron.html http://www.ri.cmu.edu/person.html?type=publications&person_id=248 (Aug. 2007).
Riviere, et al., "Adaptive Canceling of Physiological Tremor for Improved Precision in Microsurgery," IEEE Transactions on Biomedical Engineering, vol. 45, No. 7 (Jul. 1998).
Riviere, et al., "Toward Active Tremor Canceling in Handheld Microsurgical Instruments," IEEE Transactions on Robotics and Automation, vol. 19, No. 5 (Oct. 2003).
Roberts, "The Lincoln Wand," AFIPS Conference Proceedings, MIT Lincoln Laboratory (1966).
Robinett et al., "Implementation of Flying, Scaling, and Grabbing in Virtual Worlds," ACM Symposium (1992).
Robinett et al., "The Visual Display Transformation for Virtual Reality," University of North Carolina at Chapel Hill (1994).
Robotics Research Group, "Robot Design: Robot Manual Controller Design," The University of Texas of Austin, May 2009.
Roetenberg, "Inertial and magnetic sensing of human motion," Thesis (2006).

Roetenberg, et al., "Inertial and Magnetic Sensing of Human Movement Near Ferromagnetic Materials," Proceedings. The Second IEEE and ACM International Symposium on Mixed and Augmented Reality (Mar. 2003).

Rolland, et al., "A Survey of Tracking Technology for Virtual Environments," University of Central Florida, Center for Research and Education in Optics Lasers (CREOL) (2001).

Sakai, et al., "Optical Spatial Filter Sensor for Ground Speed," Optical Review, vol. 2, No. 1 pp. 65-67 (1994).

Satterfield, Shane, E3 2002: Nintendo announces new GameCube games, GameSpot, May 21, 2002, http://wwwgamespot.com/gamecube/action/rollarama/new.html?sid=2866974&com_act-convert&om_clk=nesfeatures&tag=newsfeatures%Btitle%3B.

Savage, Paul G., "Advances in Strapdown Inertial Systems," Lecture Series Advisory Group for Aerospace Research and Development Neuilly-Sur-Seine (France) (1984).

Sawada et al., "A Wearable Attitude-Measurement System Using a Fiberoptic Gyroscope" Massachusetts Institute of Technology, vol. 11, No., Apr. 2002, pp. 109-118.

Saxena et al., "In Use Parameter Estimation of Inertial Sensors by Detecting Multilevel Quasi-Static States," Lecture Notes in Computer Science, 2005—Berlin: Springer-Verlag, (Apr. 2004).

Sayed, "A Framework for State-Space Estimation with Uncertain Models," IEEE Transactions on Automatic Control, vol. 46, No. 7 (Jul. 2001).

Sayed, UCLA Adaptive Systems Laboratory—Home Page, UCLA, http://asl.ee.ucla.edu/index.php?option=com.sub.--frontpage&Itemid=1 (Aug. 2007).

Schmorrow et al., "The PSI Handbook of Virtual Environments for Training and Education," vol. 1, 2009.

Schofield, Jack et al., Coming up for airpad, The Guardian (Feb. 2000).

Sega/Sports Sciences, Inc., "Batter Up, It's a Hit," Instruction Manual, Optional Equipment Manual (1994).

Sega/Sports Sciences, Inc., "Batter Up, It's a Hit," Photos of baseball ball (1994).

Selectech, "Airmouse Remote Control System Model AM-1 User's Guide," Colchester, VT (Sep. 24, 1991).

Selectech, "AirMouse Remote Controls, AirMouse Remote Control Warranty" (1991).

Selectech, "Changing Driver Versions on CDTV/AMIGA" (Oct. 17, 1991).

Selectech, "Selectech AirMouse Remote Controls, Model # AM-R1," photographs (1991).

Selectech, Facsimile Transmission from Rossner to Monastiero, Airmouse Remote Controls, Colchester, VT (Mar. 25, 1992).

Selectech, Selectech AirMouse Devices (image) (1991).

Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).

"Self-Contained, Free Standing "Fishing Rod" Fishing Games," Miacomet and Interact Announce Agreement to Launch Line of Reel Feel™ Sport Controllers, Press Release, May 13, 1999, 4 pages.

Seoul National Univ., "EMMU System"—Seoul National Univ Power Point Presentation, www.computer.org/portal/cms_docs_ieeecs/ieeecs/education/csidc/CSIDC03Presentations/SNU.ppt (2003).

Serial Communication (Wikipedia) (Jul. 2, 2005).

Shoemake, Ken, Quaternions, UPenn, Online (Oct. 2006).

Simon, et al. "The YoYo: A Handheld Combining Elastic and Isotonic Input," http://www.uni-weimar.de/cms/fileadmin/medien/vr/documents/publications/TheYoYo-Interact2003-Talk.pdf (2003).

Simon, et al., "The YoYo: A Handheld Device Combining Elastic and Isotonic Input," Human-Computer Interaction—INTERACT'03, pp. 303-310 (2003).

Smartswing internal drawing, 1 page (2004).

Smartswing, Training Aid, Apr. 2005, Austin, Texas.

SmartSwing: "Register to be notified when Smartswing products are available for purchase," 3 pages, May 2004, retrieved May 19, 2009, http://web.archive.org/web/20040426182437/www.smartswing-golf.com/.

SmartSwing: "SmartSwing: Intellegent Golf Clubs that Build a Better Swing," 2 pages, 2004 retrieved May 19, 2009, http://web.archive.org/web/20040728221951/http://www.smartswinggolf . . . .

SmartSwing: "The SmartSwing Learning System Overview," 3 pages, 2004, retrieved May 19, 2009, http://web.archive.org/web/20040810142134/http://www.smartswinggolf.com/t . . . .

SmartSwing: "The SmartSwing Product, 3 pages, 2004, retrieved May 19, 2009, http://web.archive.org/web/200400403204628/http://www.smartswinggolf.com/ . . . "

SmartSwing: The SmartSwing Product Technical Product: Technical Information, 1 page, 2004, retrieved May 19, 2009, http://web.archive.org/web/200400403205906/http://www.smartswinggolf.com/ . . . .

SmartSwing, Letter from the CEO—pp. 1-3, May 2009.

SmartSwing: The SmartSwing Learning System: How it Works, 3 pages, 2004, retrieved May 19, 2009, http://web.archive.org/web/20040403213108/http://www.smartswinggolf.com/.

Smith, "Gyrevolution: Orienting the Digital Era," http://www.gyration.com/images/pdfs/Gyration_White_Paper.pdf (2007).

Sorenson, et al., "The Minnesota Scanner: A Prototype Sensor for Three-Dimensional Tracking of Moving Body Segments," IEEE Transactions on Robotics and Animation (Aug. 1989).

SOURCEFORGE.COM, "ARToolkit API Documentation" (SourceForge web pages) (2004-2006).

Stovall, "Basic Inertial Navigation," NAWCWPNS TM 8128, Navigation and Data Link Section, Systems Integration Branch (Sep. 1997).

Sulic, "Logitech Wingman Cordless Rumblepad Review", Review at IGN, 4 pages, Jan. 14, 2002.

"Superfamicom Grip controller by ASCII," http://superfami.com/sfc_grip.html, Jul. 10, 2008, pp. 1-2.

Sutherland, "A Head-Mounted Three Dimensional Display," AFIPS '68 (Fall, part I): Proceedings of the Dec. 9-11, 1968, fall joint computer conference, part I, pp. 757-764 (Dec. 1968).

Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).

Sweetster, "A Quaternion Algebra Tool Set," http://world.std.com/%7Esweetser/quaternions/intro/tools/tools.html (Jun. 2005).

Swisher "How Science Can Improve Your Golf Game, Your Club is Watching" The Wall Street Journal, Apr. 18, 2005, 1 page.

Templeman, James N., "Virtual Locomotion: Walking in Place through Virtual Environments," Presence, vol. 8 No. 6, pp. 598-617, Dec. 1999.

Thinkoptics, Thinkoptics Wavit devices (image) (2007).

Timmer, "Data Analysis and Modeling Dynamic Processes in the Life Sciences," Freiburg Center for Data Analysis and Modeling, http://webber.physik.uni-freiburg.de/.about.jeti/ (Aug. 2007).

Timmer, "Modeling Noisy Time Series: Physiological Tremor," International Journal of Bifurcation and Chaos, vol. 8, No. 7 (1998).

Timmer, et al, "Pathological Tremors: Deterministic Chaos or Nonlinear Stochastic Oscillators?" Chaos, vol. 10, No. 1 (Mar. 2000).

Timmer, et al., "Characteristics of Hand Tremor Time Series," Biological Cybernetics, vol. 70 (1993).

Timmer, et al., Cross-Spectral Analysis of Physiological Tremor and Muscle Activity: I Theory and Application to unsynchronized electromyogram, vol. 78 (1998).

Timmer, et al., Cross-Spectral Analysis of Physiological Tremor and Muscle Activity: II Application to Synchronized Electromyogram, Biological Cybernetics, vol. 78 (1998).

Timmer, et al., "Cross-Spectral Analysis of Tremor Time Series," International Journal of Bifurcation and Chaos, vol. 10, No. 11 (2000).

Titterton et al., "Strapdown Inertial Navigation Technology," pp. 1-56 and pp. 292-321 (May 1997).

Traq 3D (Trazer) Product, http://www.exergamefitness.com/traq_3d.htm, http://www.trazer.com/, http://www.traq3d.com/ (1997).

Traq 3D, "Healthcare" 1 pages, //www.traq3d.com/Healthcare/Healthcare.aspx, 1997.
Translation of the brief of BigBen of Oct. 27, 2010 and original German text (Nov. 3, 2010).
Translation of the brief of System Com 99 of Oct. 27, 2010 and original German text.
Translation of Exhibit B-B01: Cancellation Request of BigBen of Oct. 15, 2010 against German utility model 20 2006 020 818 (UM1) (Oct. 15, 2010) and original German text.
Translation of Exhibit B-C01: Cancellation Request of BigBen of Oct. 15, 2010 against German utility model 20 2006 020 819 (UM2) (Oct. 15, 2010) and original German text.
Translation of Exhibit B-D01: Cancellation Request of BigBen of Oct. 15, 2010 against German utility model 20 2006 020 820 (UM3) (Oct. 15, 2010) and original German text.
Translation of Opposition Brief of BigBen of Sep. 2, 2010 Against European Patent No. EP 1854518.
Transmission Mode (Apr. 22, 1999).
Ulanoff, Lance, "Nintendo's Wii is the Best Product Ever," PC Magazine (Jun. 21, 2007).
UNC Computer Science Department, "News & Notes from Sitterson Hall," UNC Computer Science, Department Newsletter, Issue 24, Spring 1999 (Apr. 1999).
Univ. Illinois at Chicago, "CAVE—A Virtual Reality Theater," http://www.youtube.com/watch?v=-Sf6bJjwSCE 1993.
Univ. Wash., "ARToolkit" (U. Wash. web pages) (1999).
Urban, "BAA 96-37 Proposer Information," DARPA/ETO (1996).
US Dynamics Corp, "Spinning Mass Mechanical Gyroscopes" (Aug. 2006).
US Dynamics Corp, "The Concept of 'Rate' (more particularly, angular rate pertaining to rate gyroscopes) (rate gyro explaination)," (Aug. 2006).
US Dynamics Corp, "US Dynamics Model 475 Series Rate Gyroscope Technical Brief—brief discussion on rate gyroscope basics, operation, and uses, and a dissection of the model by major component" (Dec. 2005).
US Dynamics Corp, "US Dynamics Rate Gyroscope Interface Brief (rate gyro IO)" (Aug. 2006).
VTi, Mindflux-VTi CyberTouch, 1996, http://www.mindflux.com.au/products/vti/cybertouch.html.
Van Den Bogaard, "Using linear filters for real-time smoothing of rotational data in virtual reality application," http://www.science.uva.nl/research/ias/alumni/m.sc.theses/theses/RobvandenBogaard.pdf (Aug. 2004).
Van Laerhoven, et al., "Using an Autonomous Cube for Basic Navigation and Input," Proceedings of the 5th International Conference on Multimodal interfaces, Vancouver, British Columbia, Canada, pp. 203-210 (2003).
Van Rheeden, et al., "Noise Effects on Centroid Tracker Aim Point Estimation," IEEE Trans. on Aerospace and Electronic Systems, vol. 24, No. 2, pp. 177-185 (Mar. 1988).
Vaz, et al., "An Adaptive Estimation of Periodic Signals Using a Fourier Linear Combiner," IEEE Transactions on Signal Processing, vol. 42, Issue 1, pp. 1-10 (Jan. 1994).
Verplaetse, "Inertial Proprioceptive Devices: Self-Motion Sensing Toys and Tools," IBM Systems Journal (Sep. 1996).
Verplaetse, "Inertial-Optical Motion-Estimating Camera for Electronic Cinematography," Masters of Science Thesis, MIT, (1997).
Villoria, Gerald, Hands on Roll-O-Rama Game Cube, Game Spot, May 29, 2002, http://www.gamespot.com/gamecube/action/rollorama/news.html?sid=2868421&com_act=convert&om_clk=newsfeatures&tag=newsfeatures;title;1&m.
Virtual Fishing, Operational Manual, 2 pages, Tiger Electronics, Inc., 1998.
Virtual Technologies, Inc., Cyberglove brochure, Palo Alto, CA, www.virtex.com. (1999).
Vorozcovs, et al.,"The Hedgehog: A Novel Optical Tracking Method for Spatially Immersive Displays," MIT Presence, vol. 15, No. 1, pp. 108-121 (2006).
VR Solutions, "IS-1200", www.vrs.com.au/motion-tracking/intersense/is-1200.html 2 pages (May 2009).
Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).
Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).
Watt, *3D Computer Graphics*, "Three-Dimensional Geometry in Computer Graphics,", pp. 1-22 Addison-Wesley (1999).
Welch et al., HiBall Devices (image) (2002-2006).
Welch et al., Motion Tracking: No Silver Bullet, but a Respectable Arsenal IEEE Computer Graphics and Applications, vol. 22, No. 6, pp. 24-38 (Nov. 2002).
Welch, "Hybrid Self-Tracker: An Inertial/Optical Hybrid Three-Dimensional Tracking System," Tech. Report TR95-048, Dissertation Proposal, Univ. of North Carolina at Chapel Hill, Dept. Computer Science, Chapel Hill, N.C. (1995).
Welch, "Hawkeye Zooms in on Mac Screens with Wireless Infrared Penlight Pointer," MacWeek (May 1993).
Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).
Welch, et al., "High-Performance Wide-Area Optical Tracking: The HiBall Tracking System," MIT Presence: Teleoperators & Virtual Environments (2001).
Welch, et al., "SCAAT: Incremental Tracking with Incomplete Information," Computer Graphics, SIGGRAPH 97 Conference Proceedings, pp. 333-344 (Aug. 1997).
Welch, et al., "Source Code for HiBall+Inerital device," UNC-CH Computer Science (Jun. 1998).
Welch, et al., "The HiBall Tracker: High-Performance Wide-Area Tracking for Virtual and Augmented Environments," ACM SIGGRAPH, Addison-Wesley (1999).
Welch, et al., "The High-Performance Wide-Area Optical Tracking : The HiBall Tracking System," MIT Presence, Presence, vol. 10 , No. 1 (Feb. 2001).
Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap.1, pp. 23-47] (2008).
Widrow, et al., "Fundamental Relations Between the LMS Algorithm and the DFT," IEEE Transactions on Circuits and Systems, vol. 34, No. CAS-7, (Jul. 1987).
Wiley, M.: "Nintendo Wavebird Review," US, Jun. 11, 2002, 21 pages.
Williams, et al., "Physical Presence: Palettes in Virtual Spaces," Society of Photo-Optical Instrumentation Engineers (SPIE) Conference Series, vol. 3639, No. 374-384 (May 1999).
Williams, Robert L. et al., "Implementation and Evaluation of a Haptic Playback System," vol. 3 No. 3, Haptics-e (2004).
Williams, Robert L. et al., "The Virtual Haptic Back Project," Presented at the Image 2003 Conference, Scottsdale, Arizong (Jul. 14-18, 2003).
Wilson, "Wireless User Interface Devices for Connected Intelligent Environments," Ubicomp 2003 Workshop (2003).
Wilson, "WorldCursor: Pointing in Intelligent Environments with the World Cursor," UIST '03 Companion (Nov. 2003).
Wilson, "XWand: UI for Intelligent Environments," http://research.microsoft.com/en-us/um/people/awilson/wand/default.htm (Apr. 2004).
Wilson, et al., "Demonstration of the XWand Interface for Intelligent Spaces," UIST '02 Companion, pp. 37-38 (Oct. 2002).
Wilson, et al., "Gesture Recognition Using the Xwand," ri.cmu.edu (2004).
Wilson, et al., "Xwand: UI for Intelligent Spaces," CHI 2003, Proceedings of the SIGCHI conference on Human factors in computing systems, pp. 545-552 (Apr. 2003).
Wilson, Research page, biography available at http://research.microsoft.com/en-us/um/people/awilson/?0sr=a, Microsoft Corp. (2009).

Wilson, Transcript of Testimony, Investigation No. 337-TA-658, Before the United States International Trade Commission, vol. V (May 15, 2009).

Wilson, XWand video, http://research.microsoft.com/~awilson/wand/wand%20video%20768k.WMV (Mar. 2002).

Wired Glove, Wikipedia Article, 4 pages, http://en.wiikipedia.org/wiki/Wired_glove, (Nov. 18, 2010).

Wireless (Wikipedia) (Aug. 12, 2005).

Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000.

Wormell, et al., "Advancements in 3D Interactive Devices for Virtual Environments," ACM International Conference Proceeding Series; vol. 39 (2003).

Office Action issued in Taiwanese Patent Appl No. 1002112610 on Dec. 14, 2011.

Office Action/Search Report issued in Taiwanese Patent Appl No. 10021121610 on Dec. 14, 2011.

Worringham, et al., "Directional Stimulus-Response Compatibility: A Test of Three Alternative Principles," Ergonomics, vol. 41, Issue 6, pp. 864-880 (Jun. 1998).

www.3rdtech.com (2000-2006).

Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).

You, et al., "Hybrid Inertial and Vision Tracking for Augmented Reality Registration," http://graphics.usc.edu/cgit/pdf/papers/Vr1999.PDF (1999).

You, et al., "Orientation Tracking for Outdoor Augmented Reality Registration," IEEE Computer Graphics and Applications, IEEE, vol. 19, No. 6, pp. 36-42 (Nov. 1999).

Youngblut, et al., "Review of Virtual Environment Interface Technology," Institute for Defense Analyses (Jul. 1996).

Yun, et al., "Recent Developments in Silicon Microaccelerometers," Sensors, University of California at Berkeley (Oct. 1992).

Zhai, "Human Performance in Six Degree of Freedom Input Control," Thesis, University of Toronto (1995).

Zhai, "User Performance in Relation to 3D Input Device Design", Computer Graphics 32(4), Nov. 1998, 15 pages.

Zhou, et al., "A survey—Human Movement Tracking and Stroke Rehabilitation," Technical Report: CSM-420, ISSN 1744-8050, Dept. of Computer Sciences, Universi of Essex, UK (Dec. 8, 2004).

Zhu, et al., "A Real-Time Articulated Human Motion Tracking Using Tri-Axis Inertial/Magnetic Sensors Package," IEEE Transactions on Neural Systems and Rehabilitation Engineering, vol. 12, No. 2 (Jun. 2004).

Eurosean Search Resort for Application No. EP 07 11 2880, Oct. 18, 2007.

European Search Report for Application No. EP 10178309.0, Apr. 2, 2011.

Office Action issued in related Chinese patent application 200610111559.7 (Sep. 18, 2009).

Office Action issued in related Japanese patent application 2006-216569 (Oct. 20, 2009).

Office Action issued in corresponding Japanese patent application 2007-203785 (Oct. 27, 2008).

Office Action issued in corresponding Japanese patent application 2008-256858 (Sep. 9, 2010).

Office Action issued in corressonding Japanese patent application 2005-249265 (Apr. 21, 2011).

U.S. Appl. No. 11/745,842, filed May 8, 2007.
U.S. Appl. No. 11/404,871, filed Apr. 17, 2006.
U.S. Appl. No. 11/404,844, filed Apr. 17, 2006.
U.S. Appl. No. 11/790,780, filed Apr. 27, 2007.
U.S. Appl. No. 12/889,863, filed Sep. 24, 2010.
U.S. Appl. No. 13/028,648, filed Feb. 16, 2011.
U.S. Appl. No. 13/071,008, filed Mar. 24, 2011.
U.S. Appl. No. 13/071,028, filed Mar. 24, 2011.

* cited by examiner

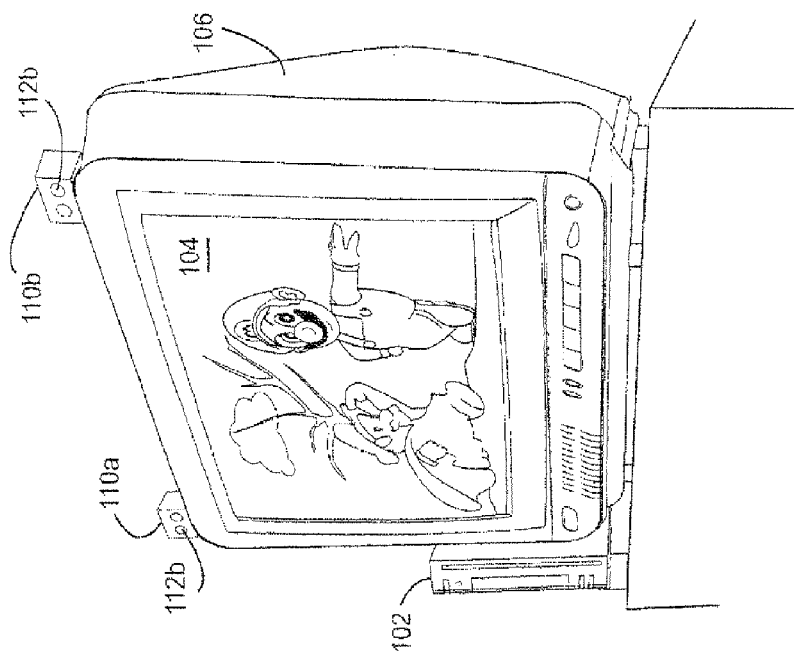
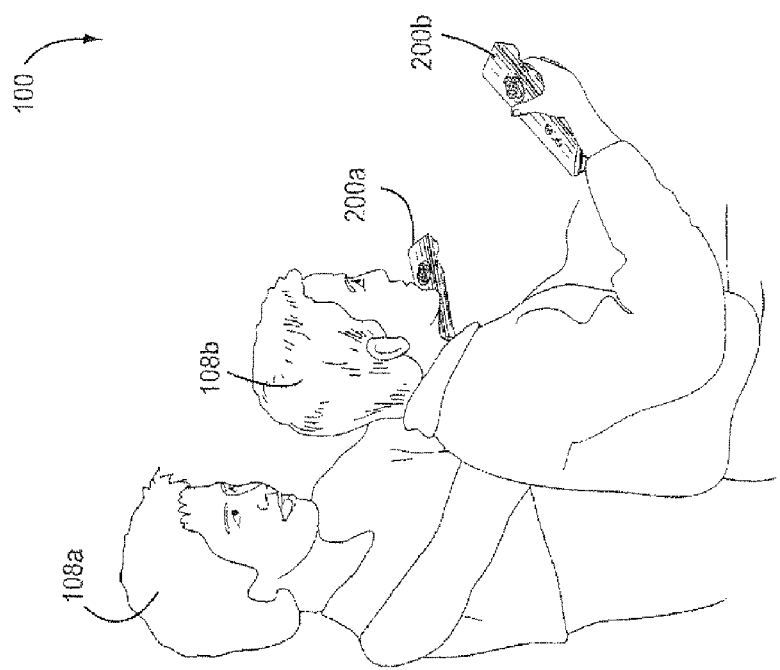
Fig. 1

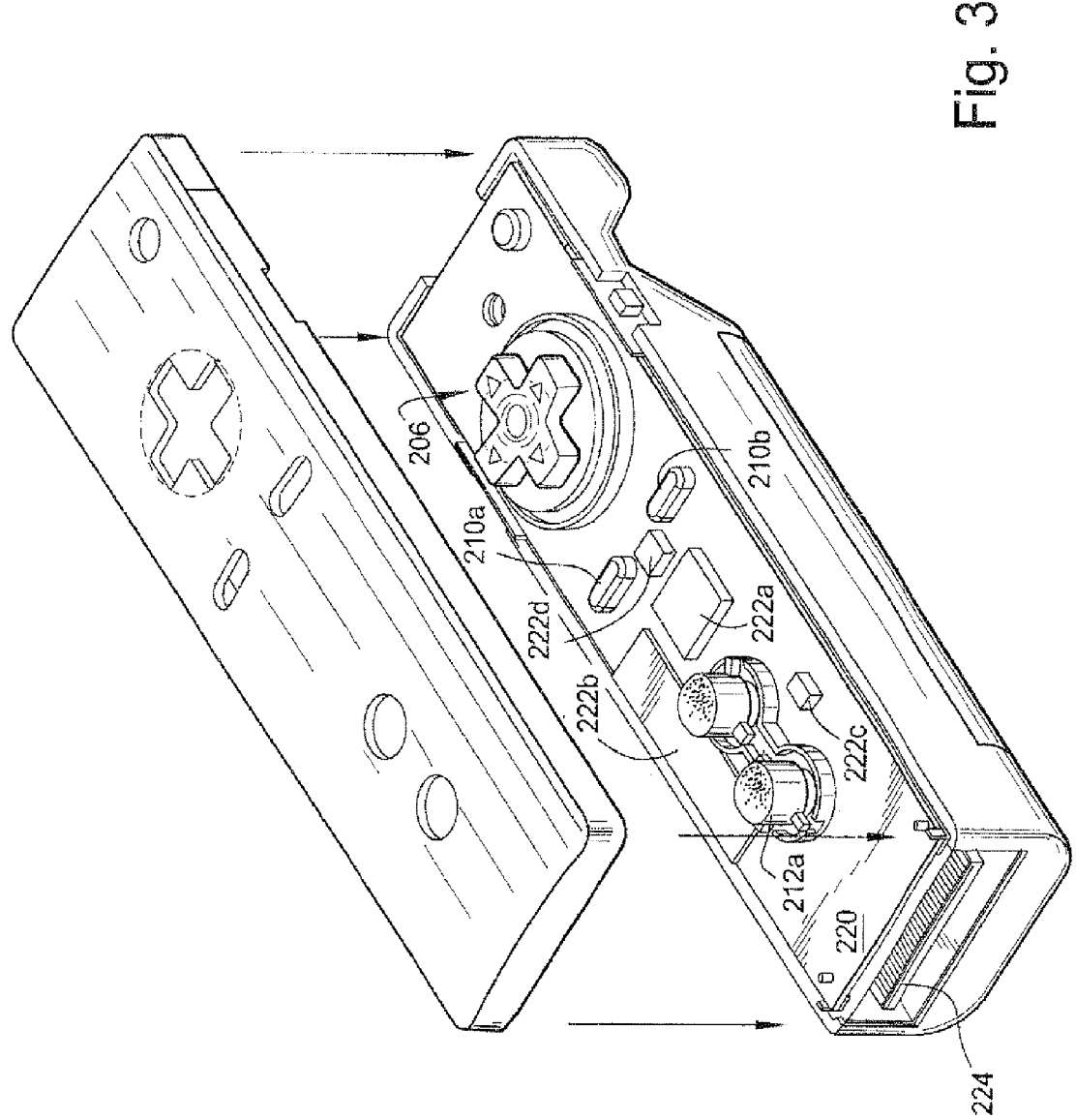

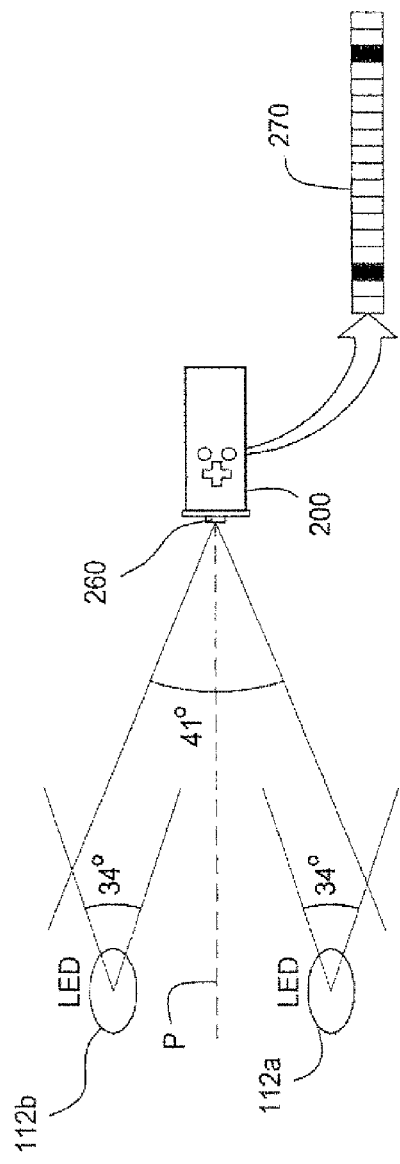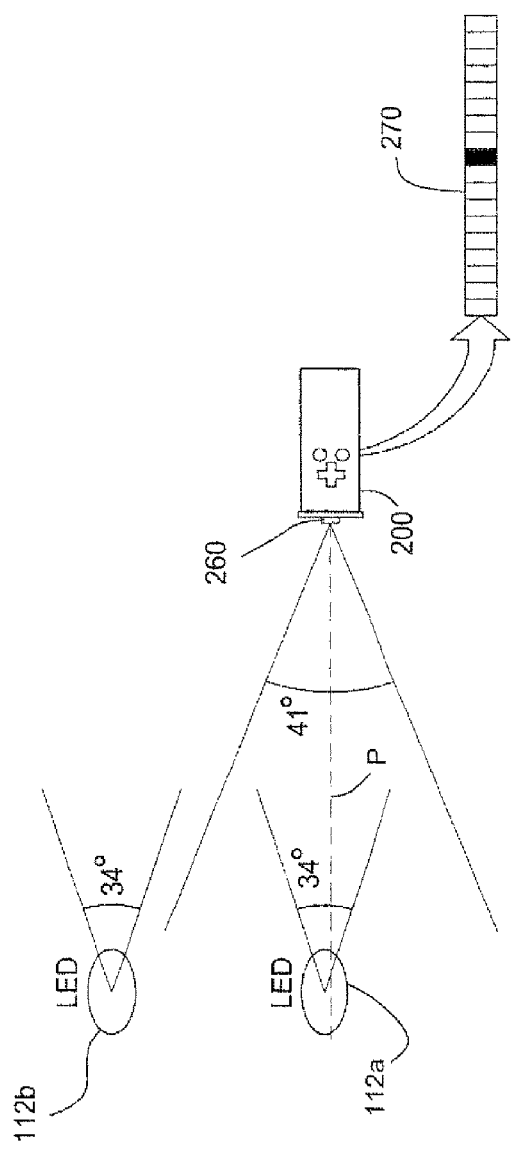

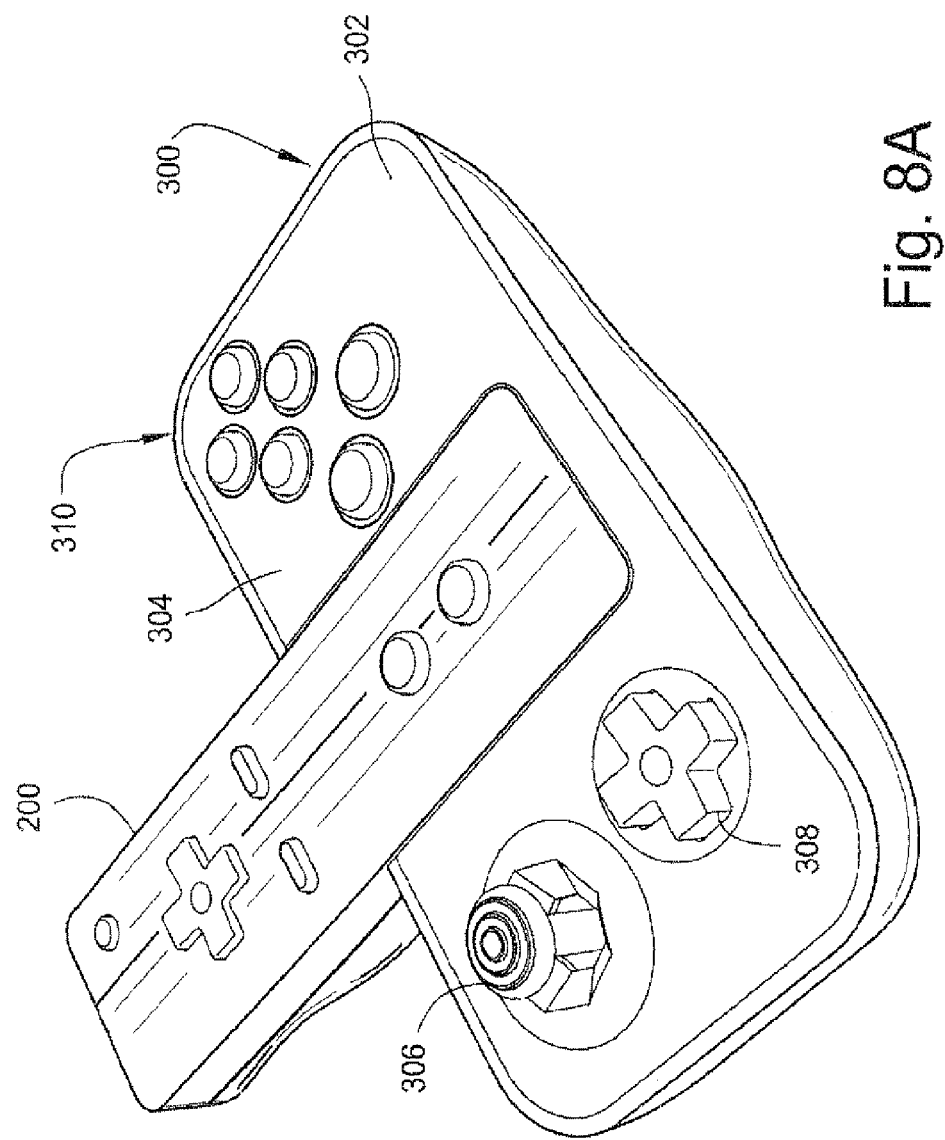

EXAMPLE SYSTEM BLOCK DIAGRAM

EXAMPLE CONTROLLER BLOCK DIAGRAM

EXAMPLE SYSTEM
DETAILED BLOCK DIAGRAM

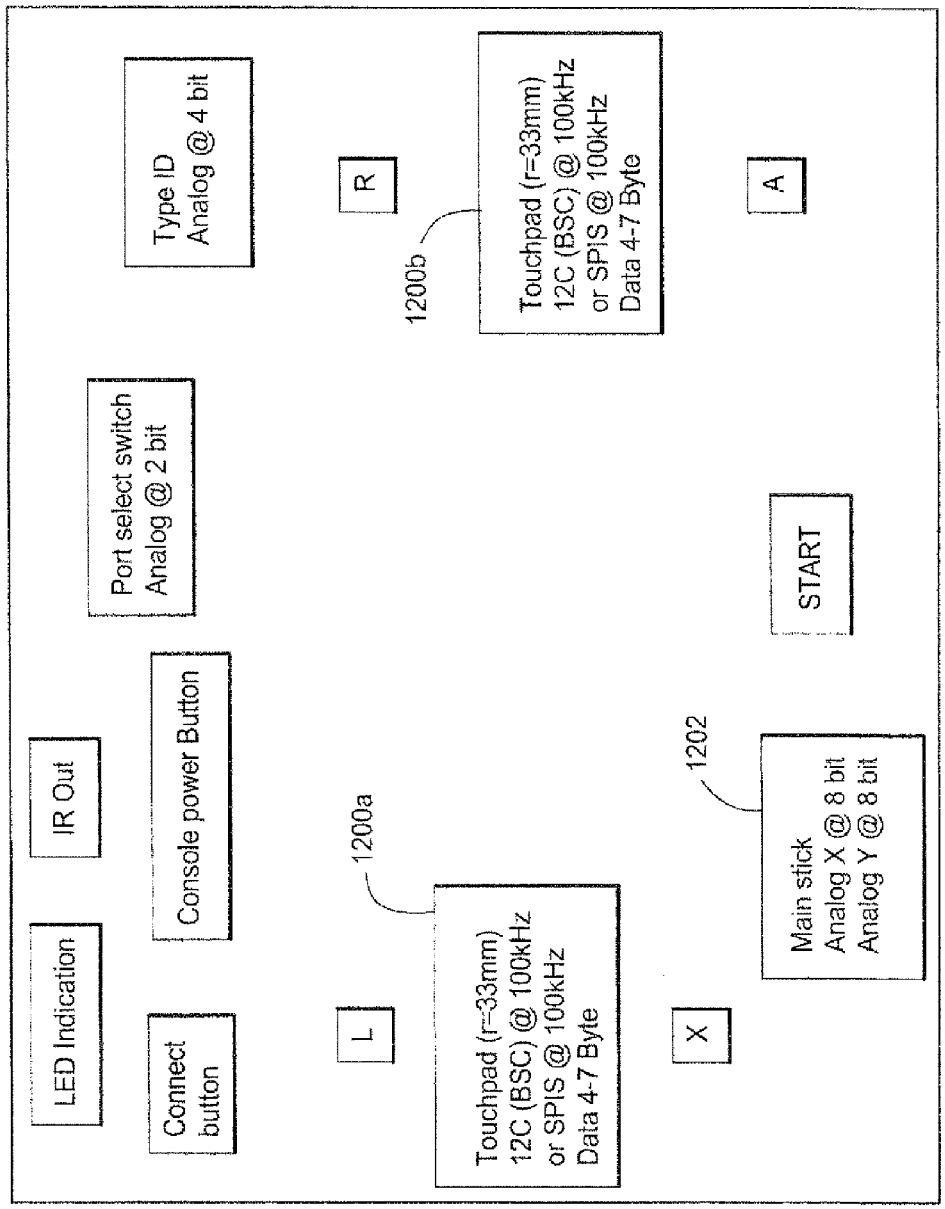

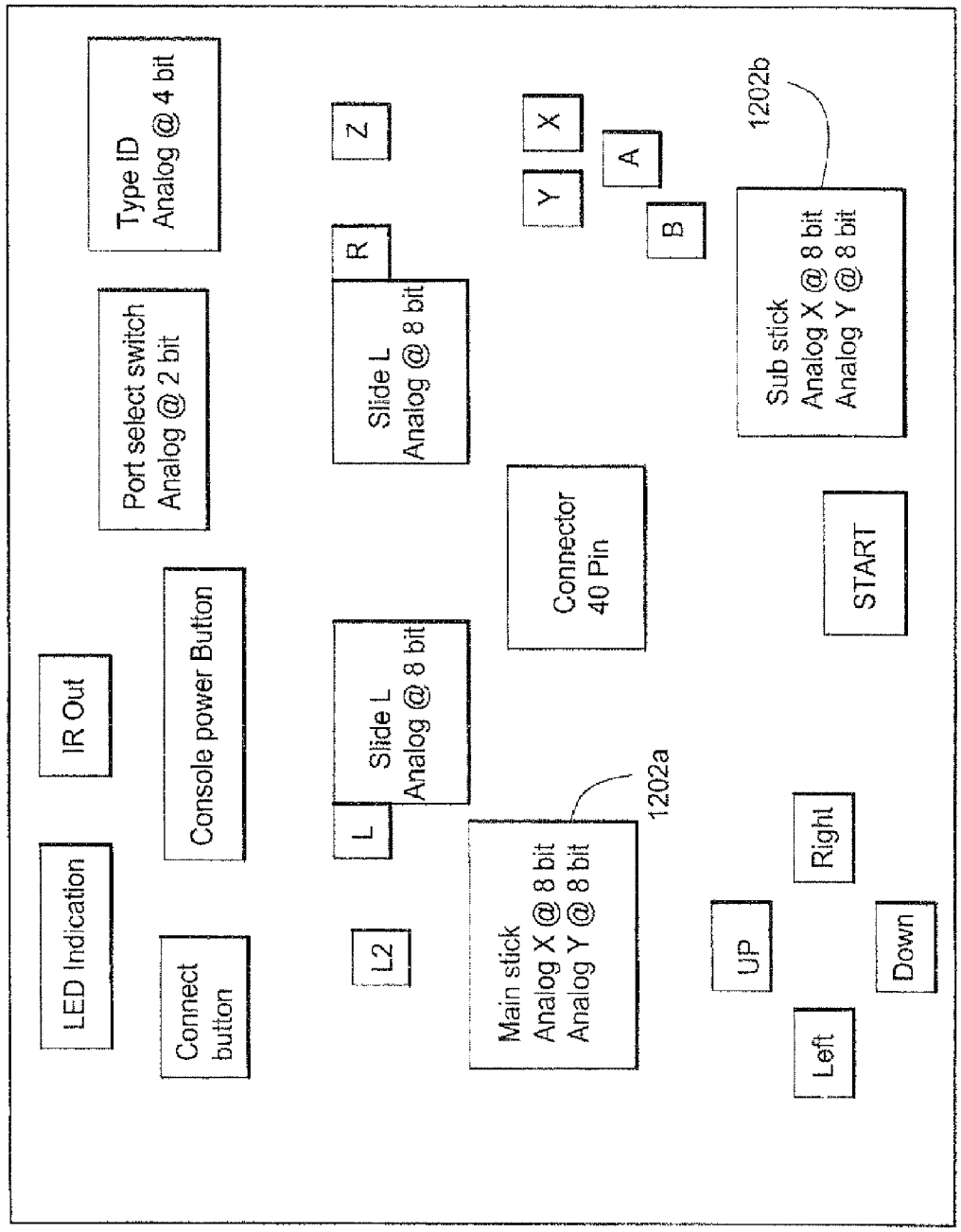
Fig. 12B  EXAMPLE EXPANSION UNIT

EXAMPLE EXPANSION UNIT

VIDEO GAME SYSTEM WITH WIRELESS MODULAR HANDHELD CONTROLLER

CROSS-REFERENCES TO RELATED APPLICATIONS

This application is a continuation of U.S. application Ser. No. 11/532,328, filed Sep. 15, 2006, which claims priority from provisional application No. 60/716,937, filed on Sep. 15, 2005. This application is also related to U.S. application Ser. No. 11/446,187, filed on Jun. 5, 2006; and U.S. application Ser. No. 11/446,188, filed on Jun. 5, 2006, the disclosures of which are incorporated herein by reference.

FIELD

The technology herein relates to consumer electronics, and more particularly to video game and entertainment systems. In still more detail, the technology herein relates to a home video game system including a modular remote wireless handheld control device with capabilities including position sensing.

BACKGROUND AND SUMMARY

Computer graphics technology has come a long way since video games were first developed. Relatively inexpensive 3D graphics engines now provide nearly photo-realistic interactive game play on home video game and personal computer hardware platforms costing only a few hundred dollars.

Most game players demand great graphics, but the core of video game play is the man-machine interface—the interaction between the (human) game player and the gaming platform. Video games are fun and exciting to play because the game player can interact with the game and affect or control the gaming events and outcome. Since the essence of an enjoyable video game play experience relates to the way the user interacts with the game and the game playing system, user input details tend to be important to the success and marketability of home video game play systems.

One aspect of the video game user interface relates to how the user controls the position of one or more objects on the display. Much work has been done on this user interface aspect in the past. For example, the first Magnavox Odyssey home video game systems provided detachable handheld controllers with knobs that allowed the game player to control the horizontal and vertical positioning of objects on the screen. Pong®, another early home video game system, had a very simple user interface providing controls the players manipulated to control the positioning of paddles on the screen. Nintendo's Game and Watch® early handheld video game systems used a "cross-switch" as described in Nintendo's U.S. Pat. No. 4,687,200 to control the position of objects on the screen. These were relatively simple yet effective user interfaces.

In recent years, video game system handheld controllers have tended to become increasingly more complicated and more capable. Video game platforms offered by Nintendo and others have provided joysticks, cross-switches or other user-manipulable controls as a means for allowing the user to control game play in a variety of simple and sophisticated ways. Many handheld controllers provide multiple joysticks as well an array of trigger buttons, additional control buttons, memory ports, and other features. Rumble or vibration effects are now common, as are wireless capabilities. Home video game manufacturers supply a variety of user input devices, and game accessory manufacturers often provide an even wider array of input device options. For example, some in the past have also tried to develop a video game handheld controller that senses the orientation of the handheld controller itself to control object position on the display. See U.S. Pat. No. 5,059,958 assigned to the present assignee.

One challenge that some have confronted in the past relates to cross-platform video game play. Generally, most video game system manufacturers differentiate new gaming systems from other or previous ones by providing unique user interface features including for example handheld controller configurations. Video games for play on different home video game platforms may therefore use different handheld controller configurations. While it may be possible in some cases to "remap" the user controls from one interface configuration to another so a game for one platform can be controlled using a different input control interface, such remapping may be less than optimal and/or change the game play experience in significant ways. For example, playing a game using a four-active-position cross-switch to control the movement of the main character on the screen may be quite a different experience for the user as compared with using an analog or digital joystick offering many different directional positions.

Furthermore, most video game platforms in the past have provided a single basic user interface that is used for all games playable on the platform. Even though different video games may provide quite different game play, video game developers have become skilled at using the common set of user input controls provided by the platform to control various different games. For example, most games developed to run on the Nintendo GameCube home video game system make use of the same handheld controller inputs comprising two joysticks, trigger switches and additional miscellaneous controls. Some games allocate different controls to different functions. For example, in one game, the left-hand joystick might navigate a 2D map view of a battlefield whereas in another game that same control might be used to allow the user to adjust virtual camera position or direction within a three-dimensional world.

The technology herein advances home video game user interfaces in ways not previously envisioned, to provide a more flexible and satisfying user experience across an ever increasing and divergent range of video games and other applications.

One illustrative non-limiting exemplary aspect of the technology herein provides for positioning video game objects on the screen in response to the position of a handheld controller relative to the display. Rather than moving a joystick or cross-switch, the user simply moves the entire handheld controller. The motion of the controller is sensed and used to control the position of objects or other parameters in connection with video game play.

Another exemplary non-limiting illustrative aspect of the technology herein provides a handheld controller with a modular design. The basic controller functionality including wireless connectivity, vibration generation, position sensing, orientation sensing and other features are provided within a core or basic handheld controller unit. This core unit can control many or most videogame input functions and play most games. However, for enhanced input functionality, the core unit can be plugged into an expansion controller assembly providing additional controls, inputs and other functionality. As one example, the core unit can be plugged into a first accessory expansion unit providing touch pads when it is desired to play videogames requiring touch pad input. The same core unit can be plugged into a different expansion unit providing joysticks and other input devices to play videogames designed for joystick inputs. The same core controller can be plugged into a still additional expansion unit when the player wishes to interact with a videogame system using a simpler control interface providing a cross-switch and additional input buttons. In one exemplary illustrative non-limiting implementation, some of the accessory units are designed to mimic earlier or different videogame platforms to allow the videogame system to match user interactivity experiences provided by such other systems.

BRIEF DESCRIPTION OF THE DRAWINGS

These and other features and advantages will be better and more completely understood by referring to the following detailed description of exemplary illustrative non-limiting implementations in conjunction with the drawings, of which:

FIG. 1 shows an exemplary illustrative videogame system being operated in a typical home game playing environment;

FIGS. 3 and 3A show exemplary illustrative variations of the FIG. 2 controller with a top plate removed;

FIGS. 7A and 7B show different views of the FIG. 2 controller when used to detect position relative to light emitters;

FIGS. 8A, 8B, 8B-1, 8C and 8D show exemplary illustrative non-limiting expansion controller units into which the FIG. 2 core unit may be removably disposed and interconnected;

FIGS. 12A-12C show exemplary illustrative non-limiting block diagrams of different expansion unit controller configurations.

DETAILED DESCRIPTION

Example Overall Exemplary Illustrative Non-Limiting System

Figure 8B:
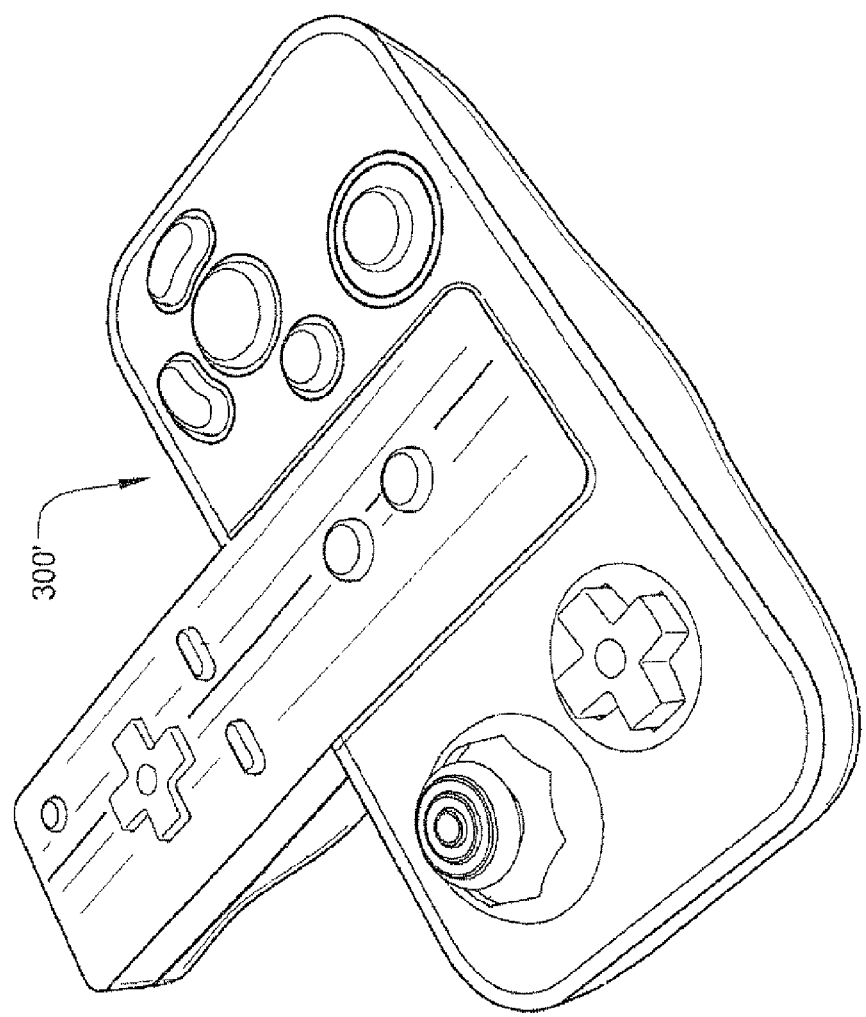
Figures 1, 8B:
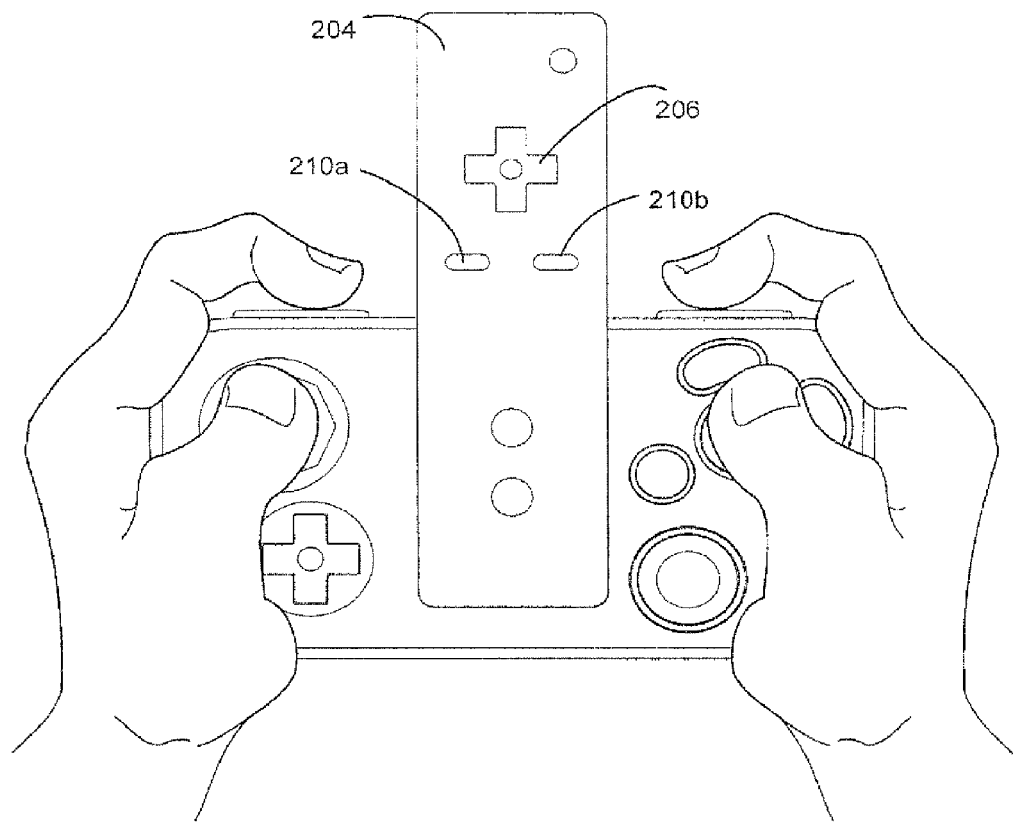

FIG. 1 shows an illustrative, exemplary non-limiting implementation of a video game system 100. System 100 includes a main unit 102 sometimes also called a "console." Main unit 102 executes applications including video game software, and generates images for display on the display 104 of a conventional home color television set or other display device 106. Main unit 102 also generates sound for reproduction by TV set 106. People 108 can interact with the video game play to control or affect the images and the progression of the game or other application.

Main unit 102 in the exemplary illustrative non-limiting implementation can be used to play a variety of different games including driving games, adventure games, flying games, fighting games, and almost any other type of game one might think of. The video game software that main unit 102 executes may be delivered on bulk storage devices such as optical disks, semiconductor memory devices or the like, it may be downloaded into the main unit over a network, or it may be provided to the main unit in any other desired manner. Main unit 102 may also be capable of performing applications in addition to video games (e.g., movie playback, email, web browsing, or any other application one can imagine). A security system built into main unit 102 may ensure that only authorized or authentic applications are executed.

FIG. 1 shows people ("video game players") 108a, 108b interacting with main unit 102 to play a video game. While two players 108 are shown, any number of players may interact with the main unit 102 at any given time. In the exemplary illustrative non-limiting implementation shown, each video game player 108 holds and operates a wireless handheld control unit ("controller") 200. The players 108 operate these controllers 200 to generate input signals. The controllers 200 communicate their input signals wirelessly to main unit 102. Such wireless communications can be by any convenient wireless method such as radio transmission, infrared, ultraviolet, ultrasonic or any other desired technique. Wireless peripherals could include Bluetooth, 802.11 (WiFi), Hiper-LAN/1, HiperLAN/2, HomeRF, VWB, WiMax or other. In other implementations, cords or cables could be used to connect controllers 200 to main unit 102.

In the exemplary illustrative non-limiting implementation of system 100 shown, players 108 operate handheld controllers 200 in various ways to provide input signals to main unit 102. For example, players 108 may depress buttons or otherwise manipulate other controls on controllers 200 to generate certain input signals. The effect of such control manipulations in the exemplary illustrative non-limiting implementation depends, at least in part, on the particular software that main unit 102 is executing. For example, depressing a certain button may provide a "start game" or "pause game" in some contexts, and may provide different functions (e.g., "jump character") in other contexts.

In the illustrative exemplary non-limiting implementation shown, controllers 200 have internal capabilities for detecting position and/or orientation. In the exemplary illustrative non-limiting implementation, players may change the orientation or position of controllers 200 to generate input signals. Controllers 200 may sense position and/or orientation and report that information to main unit 102. Main unit 102 may use that information to control or affect video game play or other functionality.

In one exemplary illustrative non-limiting implementation, each handhold controller 200 may include an internal position, attitude or orientation sensor that can sense the position, attitude and/or orientation of the controller relative to the earth's gravitational force. Such a sensor may for example comprise a 3-axis accelerometer that can sense orientation (or changes in orientation) of the controller 200 relative to the direction of earth's gravitational pull. The output of such a sensor may be reported to main unit 102 and used for example to control motion of a character displayed on display 104.

In addition, the exemplary illustrative non-limiting implementation of system 100 shown in FIG. 1 includes wireless emitters 110a, 110b. These wireless emitters 110 may be placed on each side of display 104 in alignment with the edges of the screen. The wireless emitters 110 may for example each comprise one or more light emitting diodes or other devices 112 that emit infrared or other electromagnetic or other radiation.

In one exemplary illustrative non-limiting implementation, the energy that emitters 110 emit has a wavelength or other characteristic that allows the radiation to be readily distinguished from ambient radiation. In the exemplary illustrative non-limiting implementation, handheld controllers 200 each detect the radiation emitted by emitters 110 and generate signals indicative of the controller's relative position and/or movement. Multiple controllers 200 can sense the same emitted radiation and generate different signals depending on the position or movement of that particular controller. Controllers 200 report the relative position and/or movement signal to main unit 102. Main unit 102 may take any appropriate action in response to such signals such as, for example, moving, rotating or otherwise changing a game character or other object or background on the display 104, scrolling a screen, selecting a different game function, or taking other actions.

In the exemplary illustrative implementation shown, the emitters 110 are added or retro-fitted onto a conventional color television set 106 by for example using an adhesive to attach the emitters onto the top housing of the television set on the extreme left and right of the housing in alignment with the edges of display 104. In this exemplary illustrative non-limiting implementation, emitters 110 can be connected to main unit 102 by cables or wires run behind the television set 106. In other implementations, emitters 110 could be built-in to television set 106 or mounted separately (e.g., on a set top box or otherwise). In still other implementations, emitters 110 could possibly be replaced with small reflective surfaces attached by adhesive to corners of display 104, and controllers 200 could emit electromagnetic radiation and receive reflections from the reflective surfaces (e.g., whose angle of incidence is equal to angle of reflectance). In still other implementations, controllers 200 could emit electromagnetic radiations and units 110 could include sensors that sense the emitted radiation. Other implementations are possible.

Example Illustrative Non-Limiting Handheld Controller Design

Figure 2:
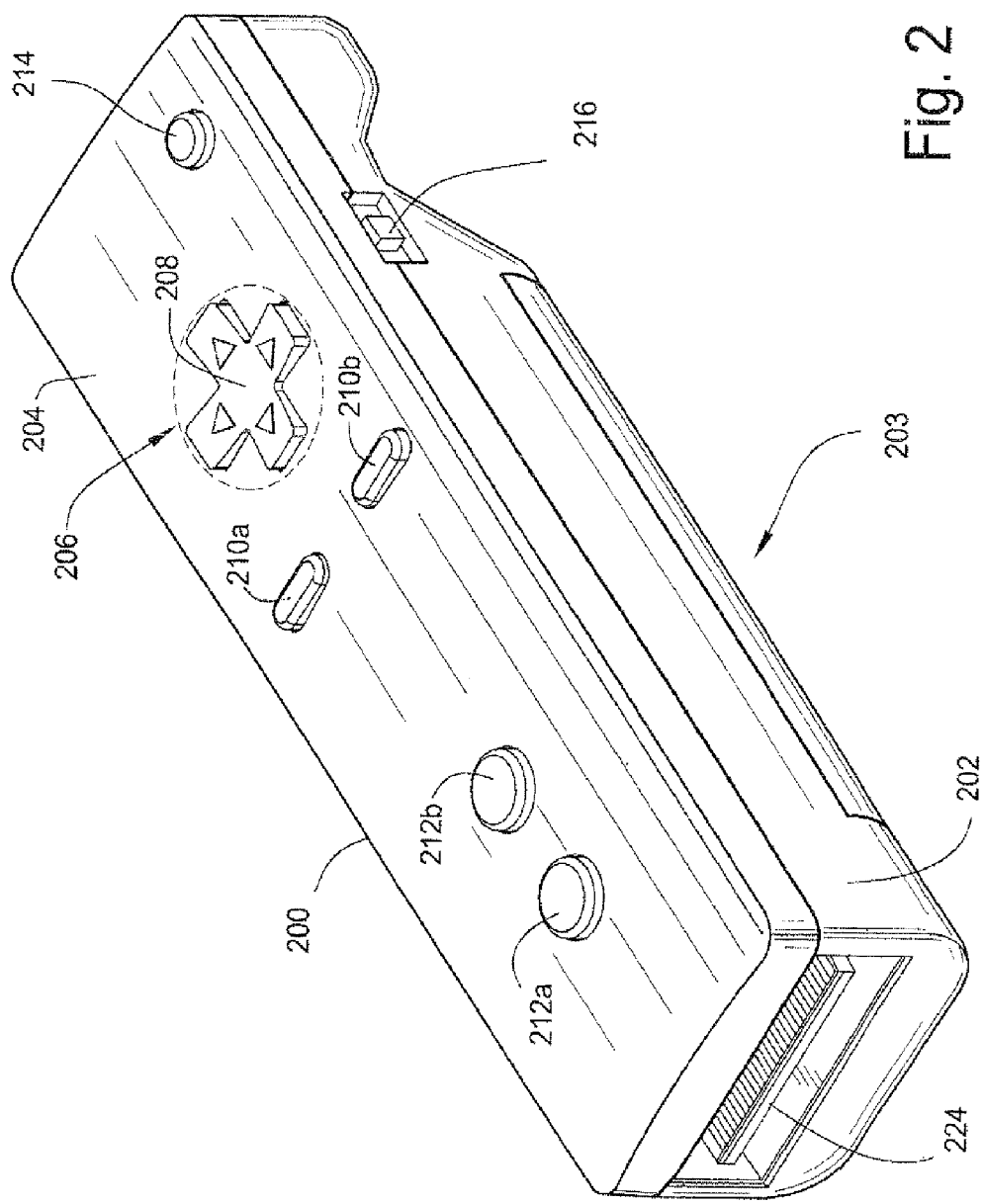
FIG. 2 shows an exemplary illustrative non-limiting implementation of a handheld videogame controller.

FIG. 2 shows a perspective view of an exemplary illustrative non-limiting implementation of controller 200. Controller 200 provides a housing 202 that is graspable by one hand (see FIGS. 2A, 2B, 2C). Controller 200 in the exemplary illustrative non-limiting implementation is compact and has a solid rugged feel to it. It can be dropped onto a hard surface without breaking. Portions of its housing 202 are curved to fit comfortably into the hand (see FIGS. 2A, 2B, 2C).

Figure 2A:
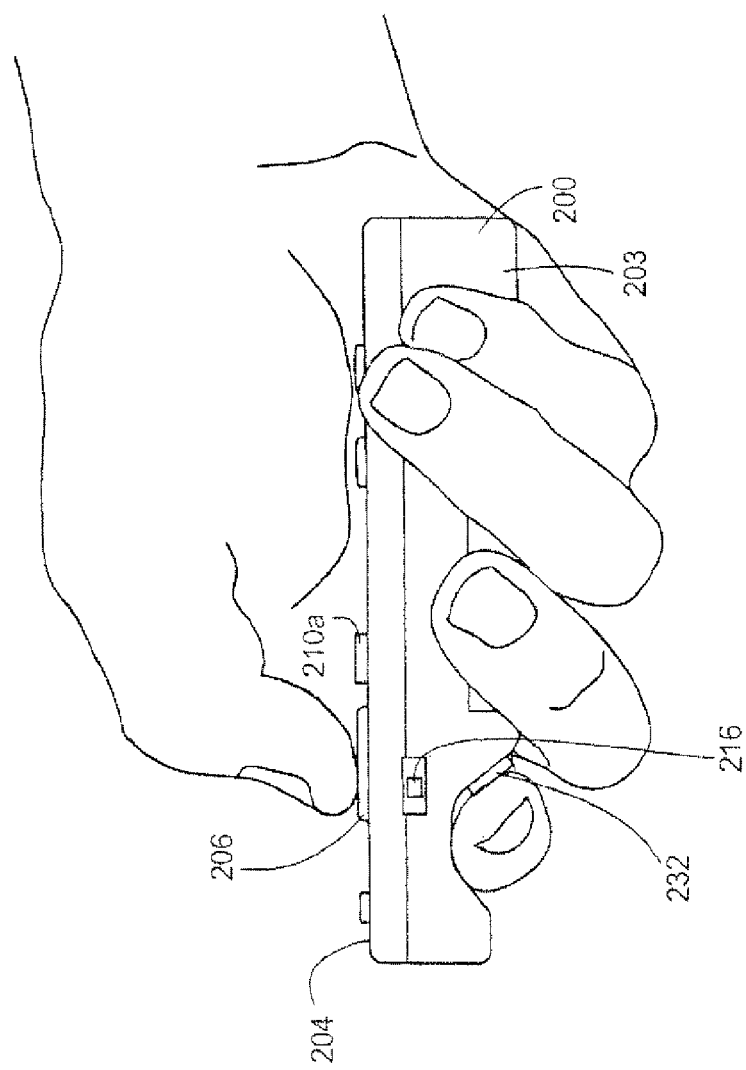
FIGS. 2A-2E show different views of the FIG. 2 implementation being grasped by the hand.
Figure 2C:
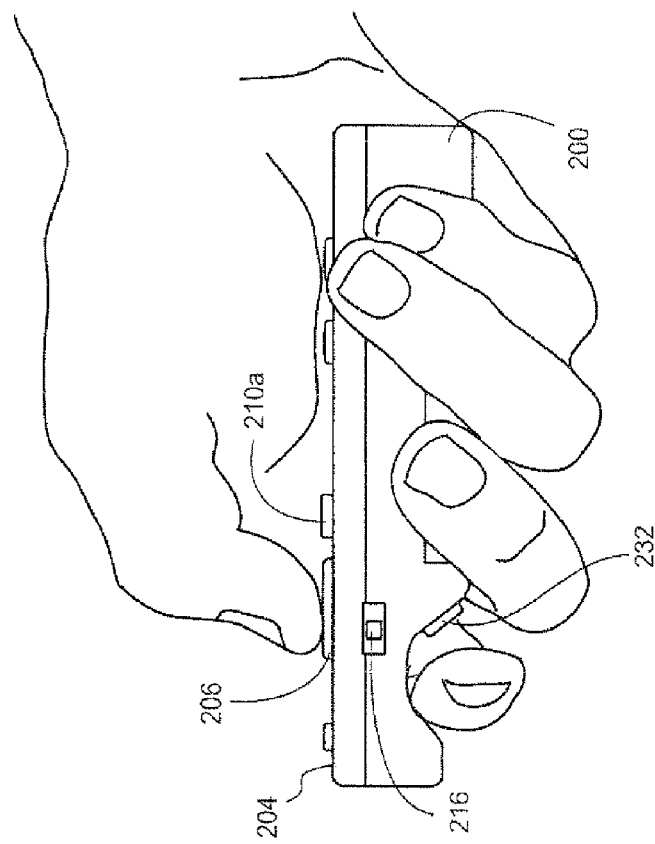
Figure 2B:
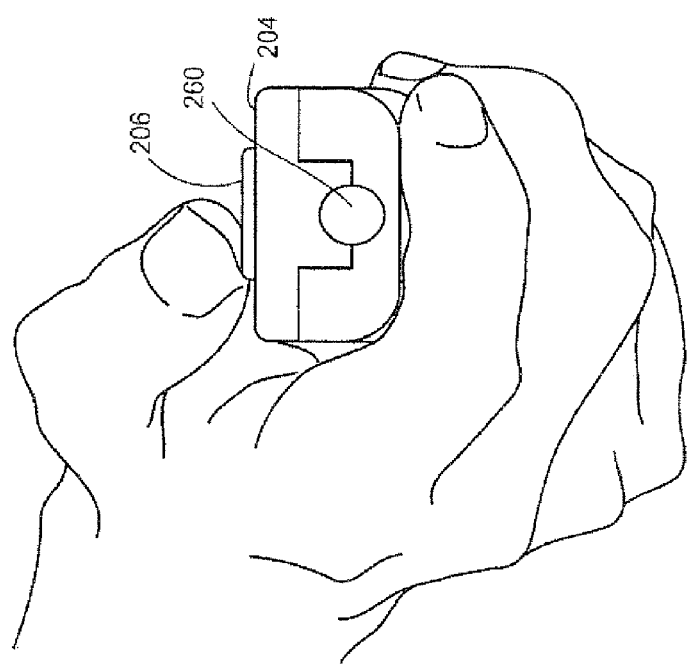

As shown in FIG. 2A, the thumb can be positioned to operate controls on a top control surface 204 while the fingers are comfortably wrapped around the controller's bottom surface 203. The digits of the hand (including the thumb) can operate the different controls arrayed on a top control surface 204 and elsewhere on the controller without fatigue and without wasted or undue motion. The controller 200 is small and lightweight enough to be comfortably held and supported for long periods of time without fatigue. Controller 200 is dimensioned to exactly and comfortably fit the average hand—not too small, not too big. The controls are arranged such that the controller 200 can be operated equally easily by the right hand or the left hand.

The controller housing 202 provides a top control surface 204 providing an array of controls depressible with the digits (fingers and/or thumbs) of the user's hand. In one illustrative non-limiting implementation, the user may operate a direction switch 206 with a thumb or forefinger to indicate a direction in two dimensions. In the illustrative non-limiting exemplary implementation shown, the directional switch 206 may comprise a switch surface 208 that can be rocked in different directions to provide different direction signals. The simplest form of such a directional switch 206 may comprise a so-called "cross switch" (a switch in the shape of a cross) that can be rocked in four different directions to provide four different, mutually exclusive direction signals (i.e., up, down, left, right). A somewhat more flexible form of a directional switch 208 may comprise a circular switch surface 208 that can be rocked in any of a number of different directions to provide corresponding different control signals indicating for example twelve, sixteen or more different directions. Other directional switch configurations could be used to provide a much higher number of directional inputs approaching, equaling or exceeding the number of signals from an analog or digital joystick. A touch or "joy" pad, a pointing stick, a trackball, or other input device could be used instead of or in addition to a switch. If a joypad were used, it could likely be operated in a direction-indicating mode as opposed to a "drag displacement" mode. Other arrangements could include touch sensitive display(s) or other types of displays.

Top control surface 204 in the exemplary illustrative non-limiting implementation also provides a pair of thumb-operated control switches 210a, 210b. These control switches 210a, 210b can be oriented as shown, or they could each be rotated say 45 degrees so as to be angularly displayed from one another in order to expose more surface area to a thumb positioned to operate either control switches 210 or directional switch 206. Control switches 210a, 210b could be used to actuate a variety of game or other functions including for example "start" and "select" functions.

Top control surface 204 may also provide an additional push button 214 operated by the thumb for other functionality selection. A slide switch 216 on the side of housing 202 may be operated to provide on/off or other functionality. Depending on requirements, a slide switch 216 could be located on either or both side surfaces of the exemplary controller 200.

Figure 2D:
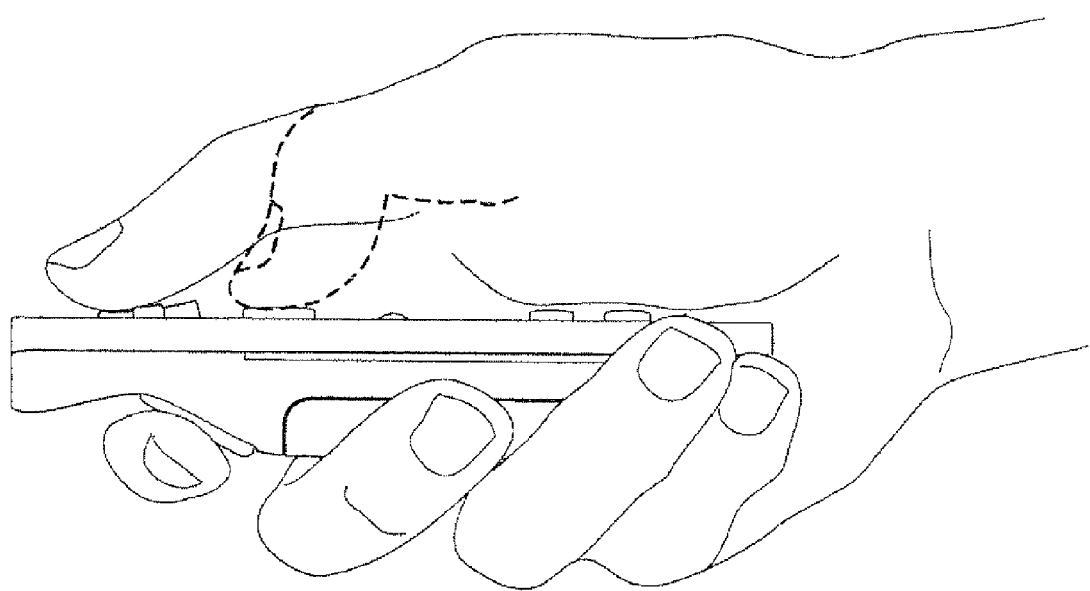
Figure 2E:
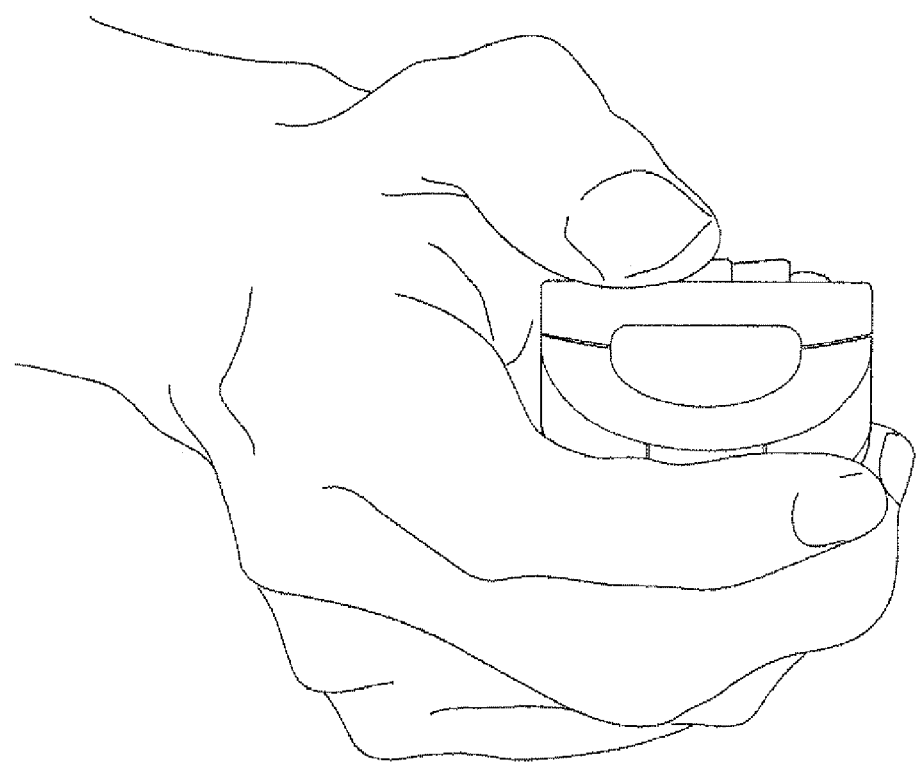
Figure 2F:
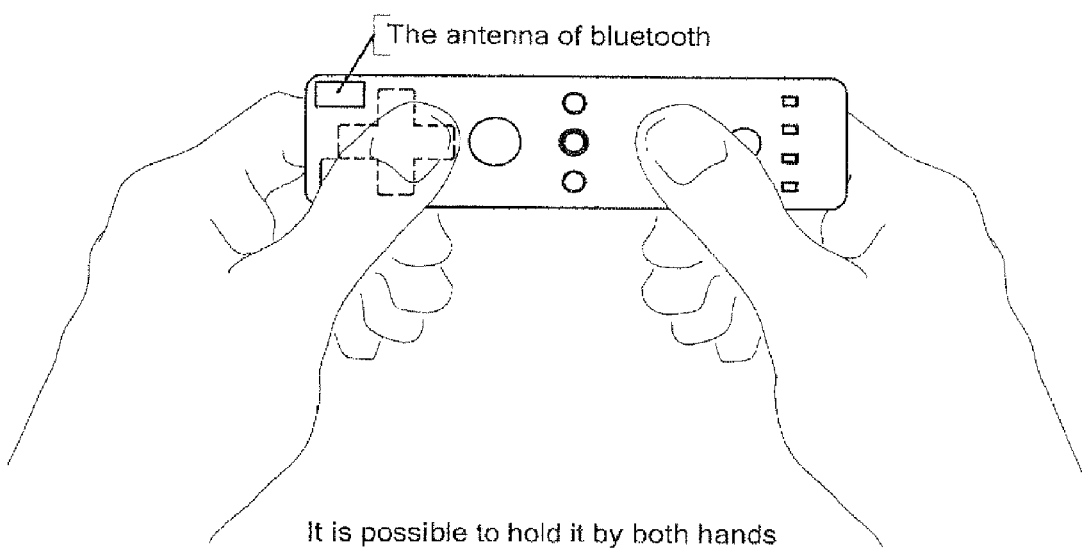
FIG. 2F shows exemplary two-handed operation.

Top control surface 204 in the exemplary illustrative non-limiting implementation further provides two additional controls 212a, 212b that may comprise indicator lamps or lights. Alternatively, such controls 212 could comprise additional operable controls such as push button switches, so-called "pointing stick" type input devices, or other input devices. These controls 212 may be relatively dormant or little used (while not being subject to accidental operation) when the controller 200 is operated in the hand positions shown in FIGS. 2A, 2B, 2C, 2D, 2E, 2F. However, another way of using controller 200 is to hold the controller in one hand (or place it on a flat surface such a table) and operate its controls with the forefinger and other fingers of the other hand. In such an alternate operating mode, the forefinger could be used to operate controls 212a, 212b if they are activatable input devices as opposed to indicators. FIG. 2D for example shows that in one exemplary illustrative implementation, the user may move his or her thumb forward or backward to access different controls. FIG. 2D shows the ability to move the thumb side to side to provide different control actuations. FIG. 2F shows an exemplary illustrative non-limiting implementation whereby the user can hold the handheld controller in both hands and operate it with both left thumb and right thumb simultaneously.

Figure 3A:
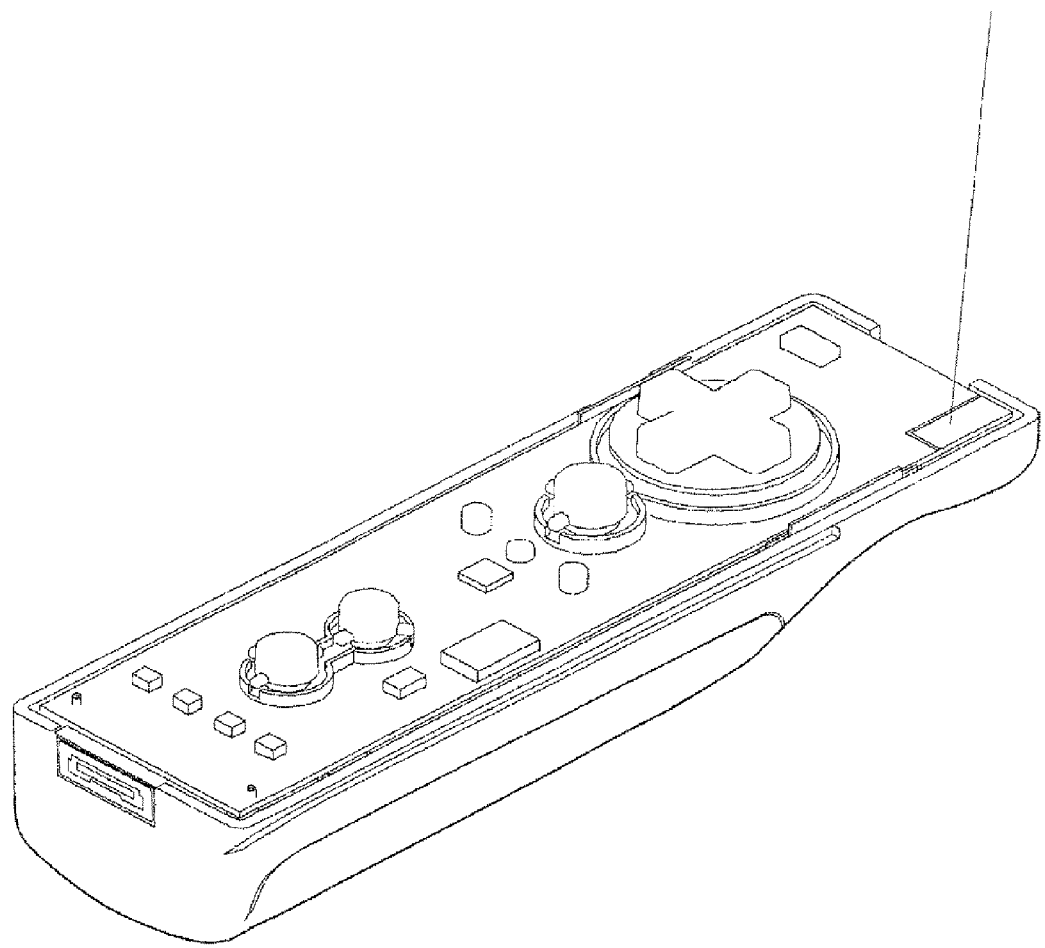

FIG. 3 shows an exploded view of controller 200 with a top plate 204 removed to reveal a printed circuit board 220. Metallic pathways (not shown) and associated solder or other electrical interconnections may be used to electrically interconnect components via PC board 220. Various components including integrated circuit chips 222 (e.g., a wireless RF "Bluetooth" or other communications device, an accelerometer and other components) may be mounted to the printed circuit board 220. The printed circuit board 220 may also serve as a mounting surface for the directional switch 206, controls 210, 212, etc. The printed circuit board 220 in one exemplary illustrative non-limiting implementation provides a rugged fiberglass structure used to both mount and electrically interconnect components of controller 200. The same or different printed circuit board 220 may provide an edge or other connector 224 for use in electrically connecting controller 200 to other devices (to be described below). FIG. 3A shows a different exemplary illustrative non-limiting implementation with a different exemplary non-limiting control layout. Further configurations are also possible.

Figure 4:
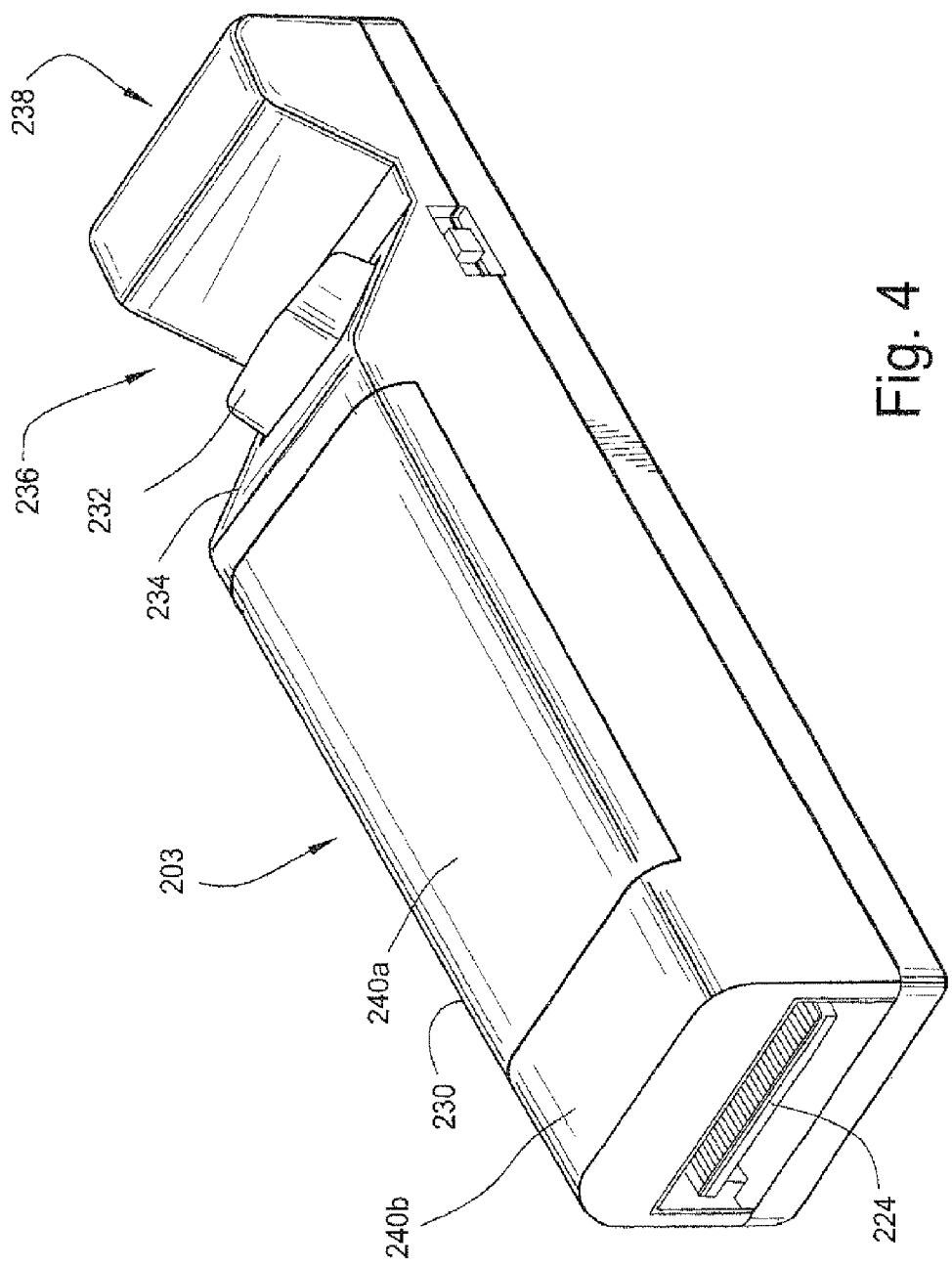
FIG. 4 shows a bottom view of the FIG. 2 controller.

FIG. 4 shows a bottom view of an exemplary illustrative non-limiting implementation of controller 200. The bottom view reveals an access plate 230 for installing one or more small conventional removable/replaceable battery cells (see FIG. 5). FIG. 4 also shows an additional "trigger" type switch 232 operable by the forefinger when the controller is held in the hand (see FIG. 2A, 2C). "Trigger" switch 232 may for example sense pressure to provide a variable input signal that depends on how much pressure the user's forefinger is exerting on the switch. Such a variable-pressure "trigger" switch 232 can be used in a video game to fire weapons, control the speed of a vehicle in a driving or space game, or provide other functionality.

In the exemplary illustrative non-limiting exemplary implementation shown, the trigger switch 232 is disposed on an angular surface 234 of the bottom surface 240 of controller 200 within a V-shaped depression 236 located near the front distal end 238. This V-shaped depression 236 is dimensioned to comfortably provide a resting and grasping slot for the forefinger (see FIG. 2C) which may be slightly rotated and pulled toward the user between a resting position (see FIG. 2C) and an actuation position (see FIG. 2A). With the middle, ring and pinkie fingers wrapped around and grasping the curved center 240c and rear 240r portions of the controller's bottom surface 203 and the forefinger comfortably engaged within the v-shaped depression 236, the user feels quite comfortable holding and operating controller 200 with one hand and positioning and aiming it precisely in desired directions.

Figure 5:
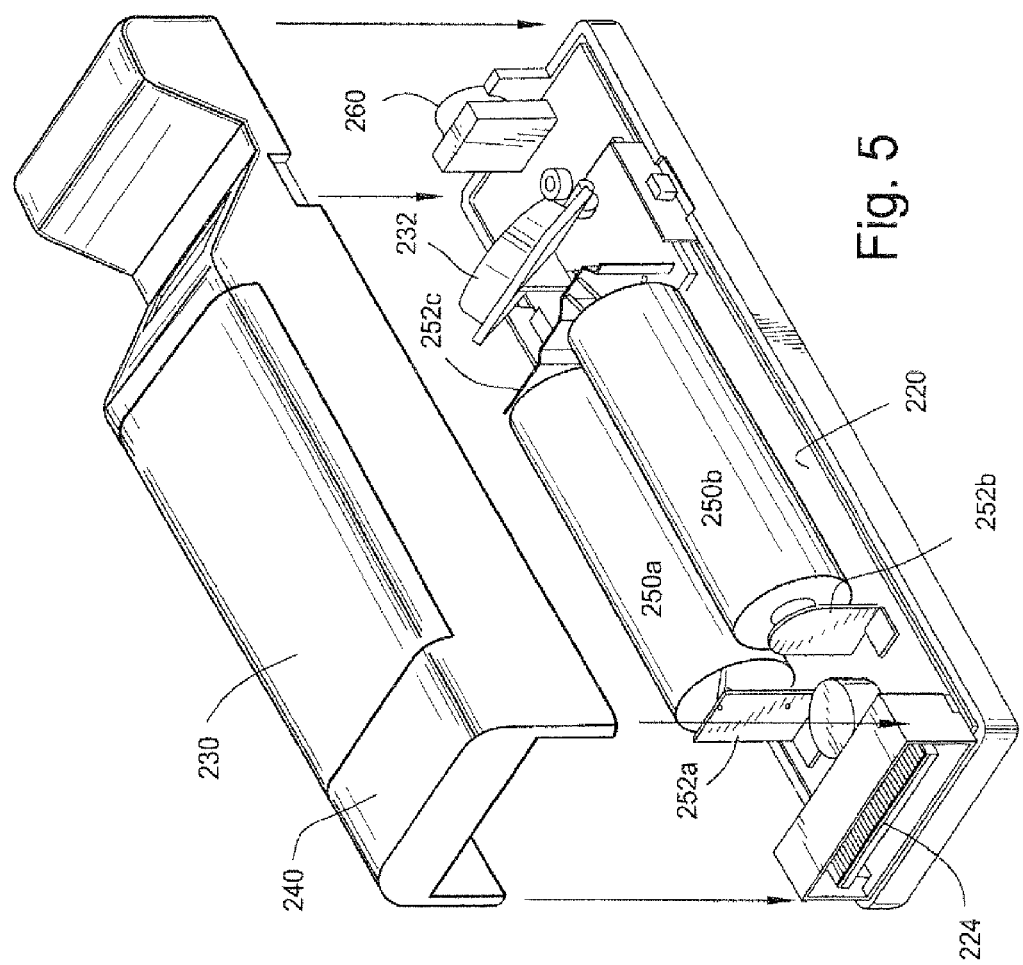
FIG. 5 shows a bottom view of the FIG. 2 controller with bottom cover removed.

FIG. 5 shows an exploded view of controller 200 with the lower housing portion 240 removed to expose internal components such as removably replaceable batteries 250 and associated holders/contacts 252, and trigger switch 232. While two batteries 250 are shown in FIG. 5, any number of batteries (e.g., one, three, etc.) can be used depending on weight, power and other requirements. Note that to replace batteries 250, the user would not usually remove the lower housing 240 but rather would simply remove the access plate 230. In other configurations, the controller 200 might be rechargeable and batteries 250 could be of the nickel-cadmium or other type that do not require routine replacement. In such exemplary configuration, the controller 200 could be placed into a charging station to recharge the batteries 250 instead of expecting the user to replace the batteries. While FIG. 5 shows a separate edge connector 224, it is possible that the edge connector could be formed by a distal edge of the printed circuit board 220.

Figure 6:
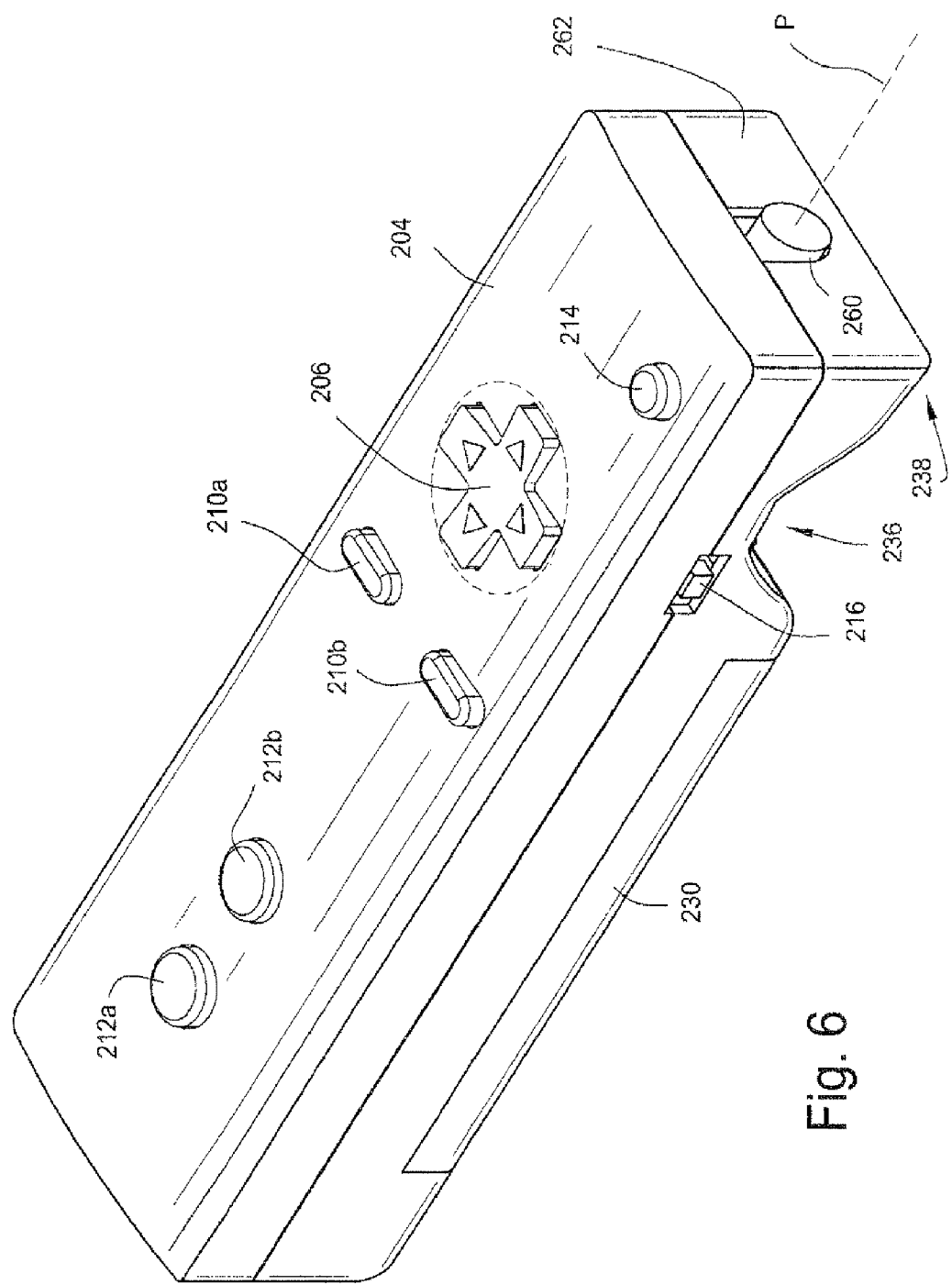
FIG. 6 shows a side and front perspective view of the exemplary FIG. 2 controller.
Figure 6A:
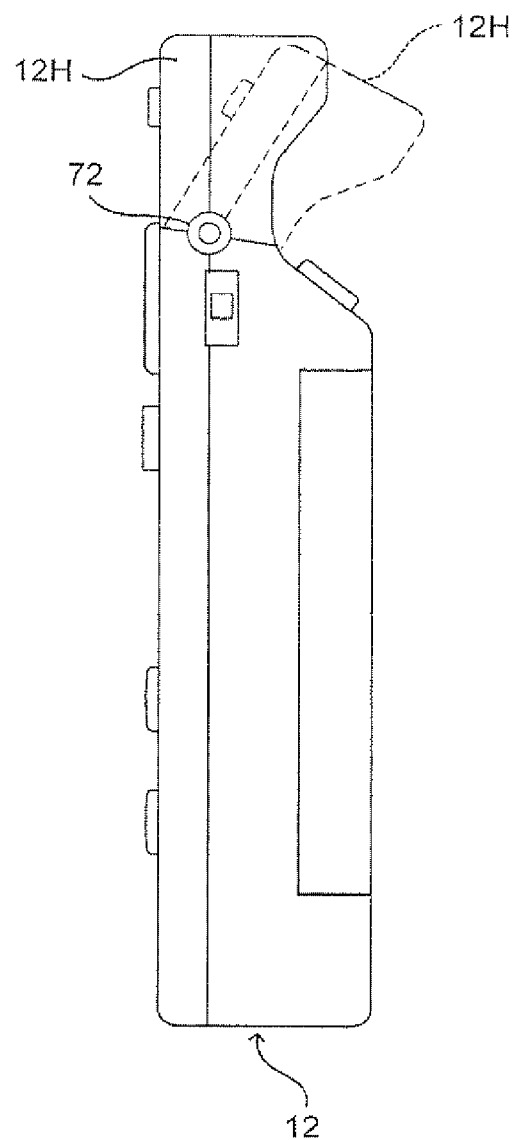
FIG. 6A shows an additional exemplary view of the FIG. 2 controller including a head pivot or tilt feature.
Figure 6B:
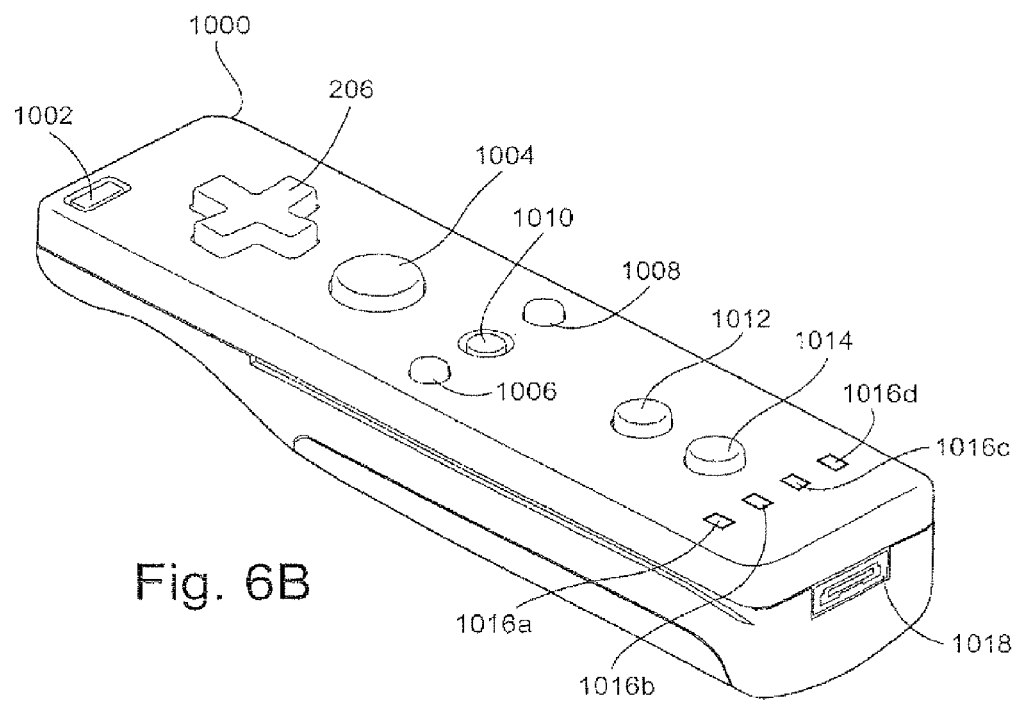
FIGS. 6B-6H show different views of an alternative exemplary illustrative non-limiting handheld controller implementation.
Figure 6C:
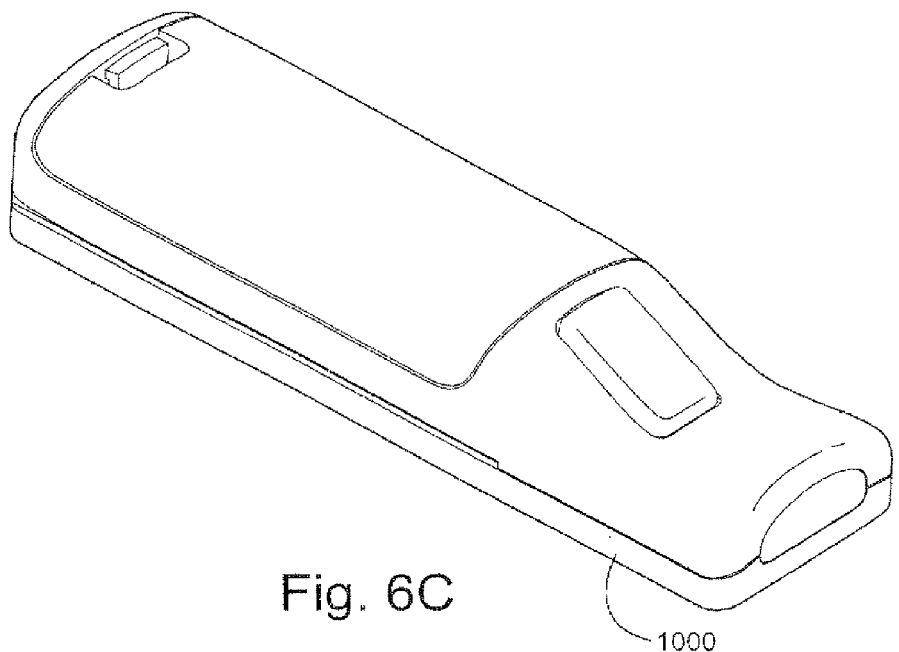
Figure 6G:
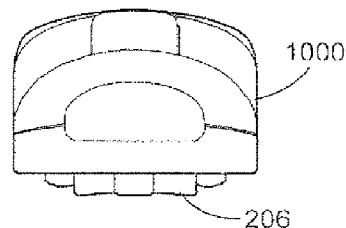
Figure 6D:
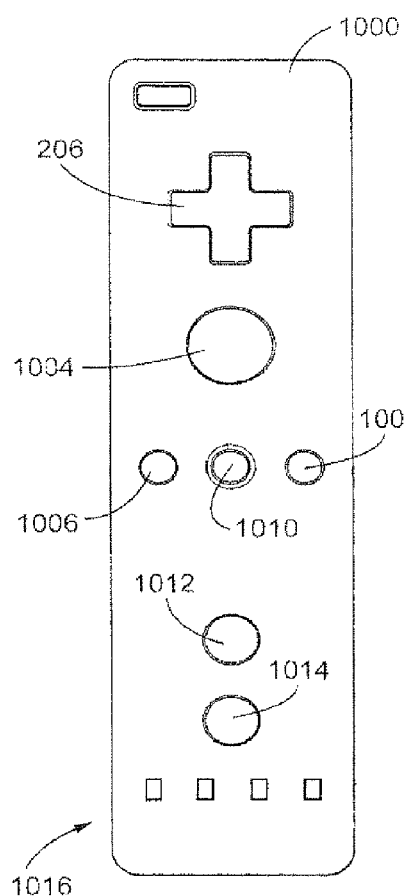
Figure 6E:
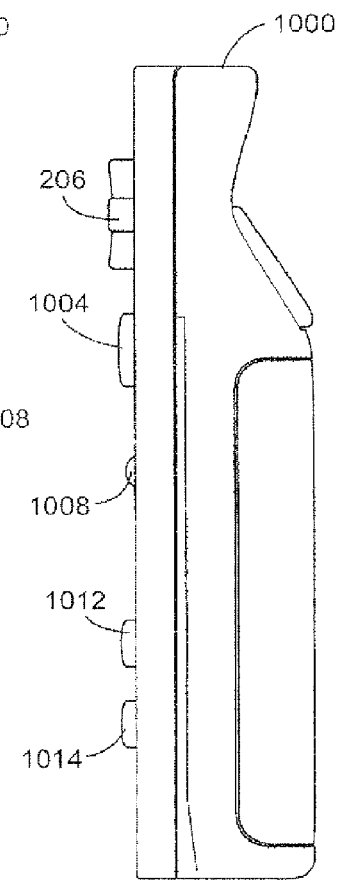
Figure 6F:
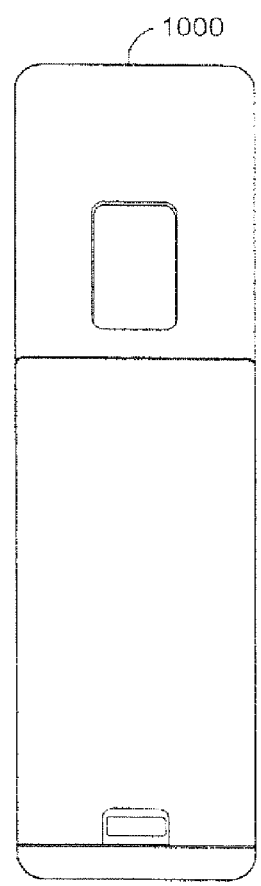
Figure 6H:
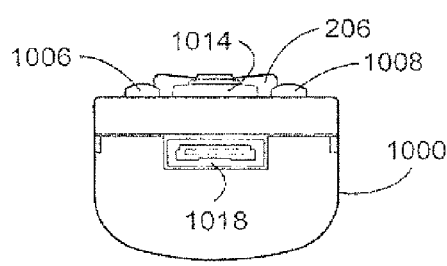

FIGS. 6B-6H show an additional exemplary non-limiting illustrative implementation of a handheld controller with a different control configuration. A power button 1002 may be used to activate power on the main unit 102. A control pad 206 provides directional input. An A button 1004 can be operated by the thumb instead of the control pad 206 to provide a momentary on-off control (e.g., to make a character jump, etc.). Select and start buttons 1006, 1008 may be provided for example to start game play, select menu options, etc. A menu button 1010 (which may be recessed to avoid accidental depression) may be provided to display or select menu/home functions. X and Y buttons may be used to provide additional directional or other control. Light emitting diodes or other indicators 1016a-d may be used to indicate various states of operation (e.g., for example to designate which controller number in a multi-controller environment the current controller is assigned). A connector 1018 is provided to connect the controller to external devices. FIG. 6C shows an underneath side perspective view, FIG. 6D shows a top plan view, FIG. 6E shows a side plan view, FIG. 6F shows a bottom plan view, FIG. 6G shows a front plan view, and FIG. 6H shows a rear plan view.

Example Illustrative Non-Limiting Optical Pointing Device Motion Detection

FIG. 6 shows a front perspective view of controller 200 illustrating an additional sensing component 260 also shown in FIG. 5. Sensor 260 in the exemplary illustrative non-limiting implementation is disposed on the "nose" or front surface 262 of controller 200 so that it points forward, looking down a pointing axis P. The direction of pointing axis P changes as the user changes the orientation of controller 200. It is possible to provide a pivot mechanism (see FIG. 6A) to allow the user to pivot the nose portion up and down to provide better ergonomics (e.g., the user could be sitting on the floor below the level of the emitters 112 and still be able to point directly forward, with the sensor 260 axis P being aimed upwardly).

Sensing component 260 in the exemplary illustrative non-limiting implementation comprises an infrared-sensitive CCD type image sensor. Sensor 260 may comprise a one-dimensional line sensor or it could comprise a 2D sensor such as for example a low resolution monochrome CCD or other camera. Motion tracking sensor 260 may include a lens and a closely coupled digital signal processor to process incoming images and reduce the amount of information that needs to be conveyed to main unit 102. In one exemplary non-limiting implementation, motion tracking sensor 260 may include a 128 pixel by 96 pixel relatively low resolution monochrome camera, a digital signal processor and a focusing lens. More than one such sensor could be used if desired.

In the exemplary illustrative non-limiting implementation, sensor 260 gives controller 200 optical pointing capabilities. For example, movement of the controller 200 can be detected (e.g., by the controller itself) and used to control what is being displayed on display 104. Such control could include for example scrolling of the screen, rotation or other reorientation of display objects in response to rotation/reorientation of controller 200, and other responsive interactive displays. Such control may provide a better moment arm as compared to a joystick.

In the exemplary illustrative non-limiting implementation, sensor 260 is designed and configured to sense the emitters 110 shown in FIG. 1. FIGS. 7A, 7B show that sensor 260 has a certain well defined field of view (FOV) symmetrical with the sensor pointing axis P. For example, the sensor 260 may have a field of view of about 20.5 degrees on each or every side of pointing axis P (this particular field of view angle is a design choice; other choices are possible in other configurations). Such well defined field of view provides an acute triangularly shaped (or cone-shaped for 2D sensor configurations) viewing area that sensor 260 can "see"—with the base of the triangle increasing in length as distance from the controller 200 increases. Sensor 260 also has a well defined sensitivity such that it can only "see" IR emissions above a certain range of intensity. Emitters 112 are designed in the exemplary illustrative non-limiting to provide sufficient output power and beam spreading consistent with the sensitivity of sensor 260 such that sensor can "see" the emitters at ranges consistent with how video game players arrange themselves in a room relative to a television set 106 (taking into account that a player may sometimes sit close to the television when playing by himself, that players may be sitting on the floor, standing, sitting on chairs or couches or other furniture, etc.).

In more detail, FIG. 7A shows that in the exemplary illustrative non-limiting implementation, the overall field of view of sensor 260 is wider than the typical separation of emitters 112 and is also wider than beam width of each emitter 112. In one exemplary illustrative non-limiting implementation, the ratio of the beam spreading angle (e.g., 34 degrees) of the beams emitted by emitters 112 to the field of view (e.g., 41 degrees) of sensor 260 may be approximately 0.82 (other ratios are possible). Plural emitters 112 can be used at each emission point to provide a wider beam (horizontal field of view) than might otherwise be available from only a single emitter, or a lens or other optics can be used to achieve desired beam width.

At an average distance from controller 200 to television set 106 and associated emitters 112 and assuming a maximum television screen size (and thus a maximum physical separation between the emitters), such a ratio may maximize the displacement of two radiation "dots" or points appearing on the CCD sensor array 270 that sensor 260 comprises. Referring to FIG. 7A for example, when the central axis of sensor 260 is directed centrally between displaced emitters 112 (note that in one exemplary illustrative non-limiting implementation, the emitters are disposed on either side of the television display and are therefore relatively far apart relative to the resolution of the image being generated), the CCD array 270 that sensor 260 defines will register maximal illumination at two points near the ends of the sensor array. This provides a higher degree of resolution when the sensor 260's central axis P is displaced relative to the center of separation of the emitters 112 (see FIG. 7B) even when using a relatively low resolution CCD imaging array (e.g., a 128-cell long sensor array). Note that while a linear array 270 is illustrated in FIGS. 7A, 7B for sake of convenience, a rectangular array could be used instead.

In the illustrative, exemplary non-limiting implementation shown, it is unnecessary to modulate or synchronize emitters 112 in the exemplary illustrative non-limiting implementation, although it may be desirable to power down the emitters when not in use to conserve power usage. In other arrangements, however, synchronous detection, modulation and other techniques could be used.

The exemplary illustrative non-limiting implementation of controller 200 and/or main unit 102 includes software or hardware functionality to determine the position of controller 200 relative to emitters 112, in response to the illumination maxima sensed by sensor 260. In one example illustrative non-limiting implementation, controller 200 includes an on-board processor coupled to the sensor 260 that interprets the currently detected illumination pattern, correlates it with previous sensed illumination patterns, and derives a current position. In another example illustrative non-limiting implementation, controller 200 may simply report the sensed pattern to main unit 102 which then performs the needed processing to detect motion of controller 200. The sensor could be affixed to the human operating the system to provide additional control.

Since it may not be desirable to require end users of system 100 to measure and program in the precise distance between the emitters 112 and since television sets vary in dimension from small screens to very large screens, controller 200 does not attempt to calculate or derive exact positional or distance information. Rather, controller 200 may determine movement changes in relative position or distance by analyzing changes in the illumination pattern "seen" by CCD array 270.

It may be possible to ask the user to initially point the controller 200 at the center of the television screen 104 and press a button, so as to establish a calibration point (e.g., see FIG. 7A)—or the game player may be encouraged to point to the center of the screen by displaying an object at the center of the screen and asking the user to "aim" at the object and depress the trigger switch. Alternatively, to maximize user friendliness, the system can be self-calibrating or require no calibration at all.

Differences in the illumination pattern that CCD array 270 observes relative to previously sensed patterns (see e.g., FIG. 7B) can be used to determine or estimate movement (change in position) relative to previous position in three dimensions. Even though the CCD array 270 illumination shown in the FIG. 7B scenario is ambiguous (it could be obtained by aiming directly at emitter 112a or at emitter 112b), recording and analyzing illumination patterns on a relatively frequent periodic or other basis (e.g., 200 times per second) allows the controller to continually keep track of where it is relative to the emitters 112 and previous controller positions. The distance between the illumination points of emitters 112 and CCD array 270 can be used to estimate relative distance from the emitters. Generally, game players can be assumed to be standing directly in front of the television set and perpendicular to the plane of display 106. However, scenarios in which controller 200 is aimed "off axis" such that its central axis P intersects the plane of emitters 112 at an angle other than perpendicular can also be detected by determining the decreased separation of the two maximum illumination points on the CCD array 270 relative to an earlier detected separation. Care must be taken however since changes in separation can be attributed to changed distance from the emitters 112 as opposed to off-axis. Simpler mathematics can be used for the motion and relative position detection if one assumes that the player is aiming the sensor axis P directly at the display 104 so the axis perpendicularly intersects the plane of the display.

Software algorithms of conventional design can ascertain position of controller 200 relative to emitters 112 and to each logical or actual edge of the display screen 104. If desired, controller 200 may further include an internal conventional 3-axis accelerometer that detects the earth's gravitational forces in three dimensions and may thus be used as an inclinometer. Such inclination (orientation) information in three axis can be used to provide further inputs to the relative position-detecting algorithm, to provide rough (x, y, z) position information in three dimensions. Such relative position information (or signals from which it can be derived) can be wirelessly communicated to main unit 102 and used to control the position of displayed objects on the screen.

Example Modular Control Interface Controller Expansion

FIGS. 8A-8D illustrate an additional feature of the exemplary illustrative non-limiting implementation of controller 200. In accordance with this additional feature, the controller 200 may be used as the "core" of a modular, larger handheld controller unit by connecting the controller 200 to an additional expansion unit 300. Core controller 200 may "ride piggyback" on an expansion unit 300 to easily and flexibly provide additional control interface functionality that can be changed by simply unplugging the controller from one expansion unit an plugging it in to another expansion unit.

FIG. 8A shows one exemplary illustrative non-limiting such additional expansion unit 300 including a housing 302 having a control surface 304 providing an array of additional controls including for example a joystick 306, a cross-switch 308 and various push-button controls 310. Expansion unit 300 includes a depression such that when the rear portion of controller 200 is inserted into the depression, the resulting combined unit provides an overall planar T-shaped control surface that combines the expansion unit 300 control surface with the controller 200 control surface in a flush and continuous manner. In such case, the user may grasp the expansion unit 300 with two hands and may operate the controls of controller 200 (see FIG. 8B-1) or controls on the expansion unit 300. Expansion unit 300 thus effectively converts the controller 200 designed to be held in a single hand into a two-handed controller while also supplying additional controls.

Figure 8C:
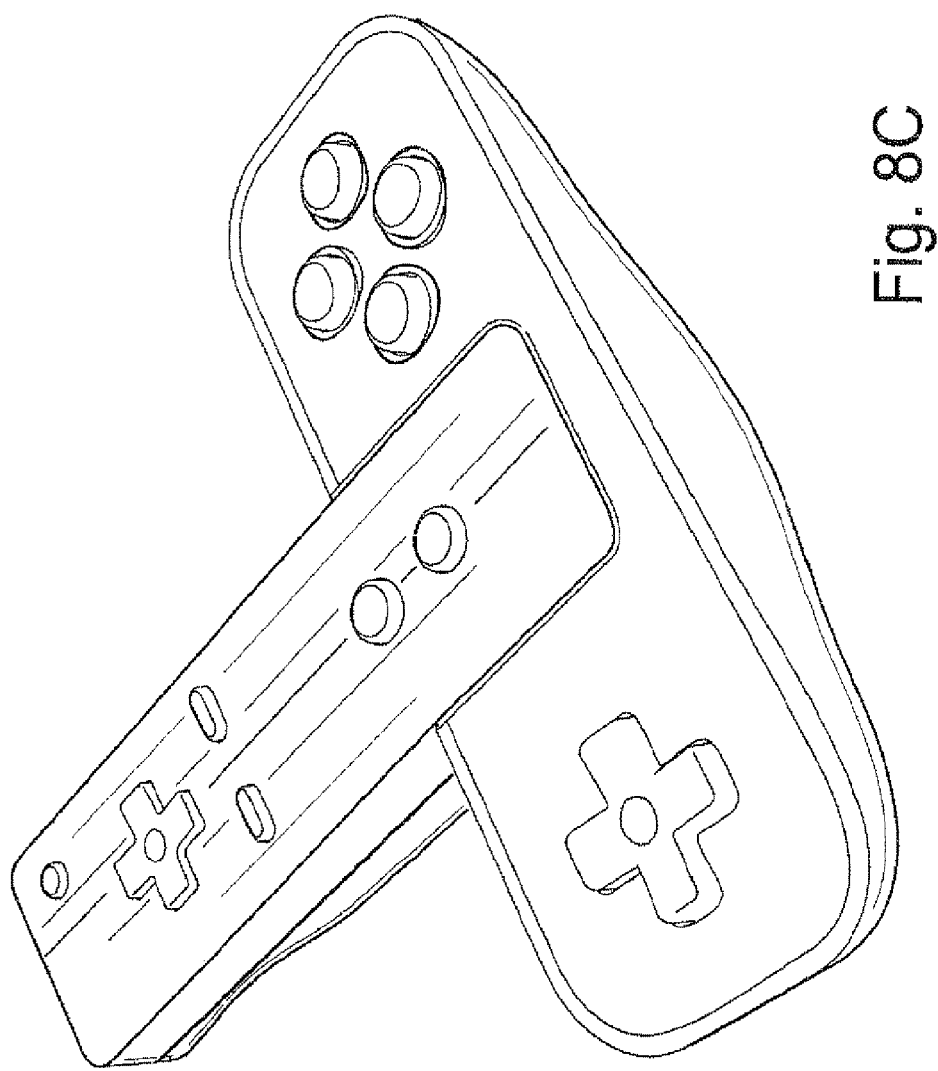
Figure 8D:
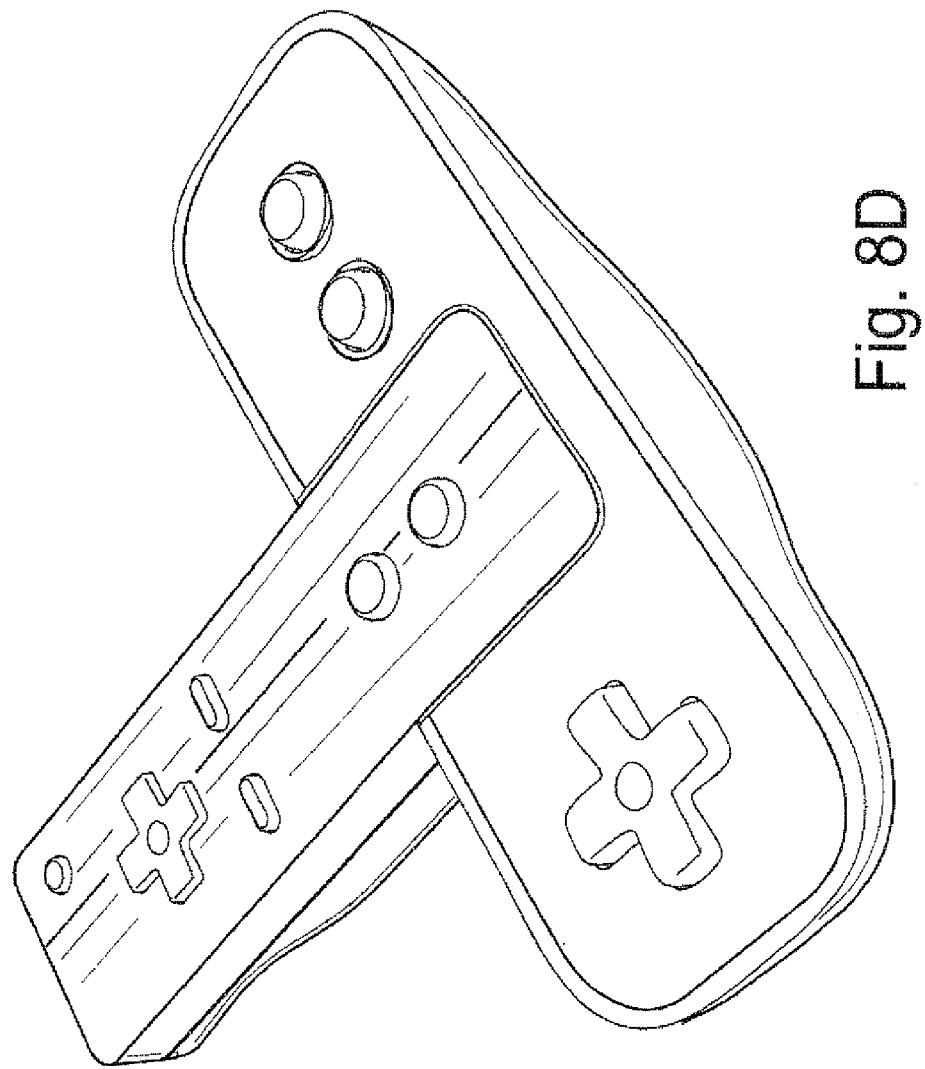

FIG. 8B shows a further expansion unit 300' having a somewhat different control configuration. FIGS. 8C and 8D show additional non-limiting illustrative example expansion units.

As shown in FIG. 8B-1, expansion units 300 may provide all of the controls that the user would operate to control a video game when controller 200 is plugged into the additional unit. This provides a high degree of flexibility, since any number of additional units 300 of any desired configuration can be provided. Such additional units 300 can be manufactured relatively inexpensively since they can rely on controller 200 for power, processing, wireless communications and all other core functions. In the exemplary illustrative non-limiting implementation, controller edge connector 224 exposes sufficient connections and a sufficiently flexible interface such that an expansion unit 300 of virtually any desirable description can be compatibly used.

One possible motivation for manufacturing expansion units 300 is to provide control interface compatibility with other video game platforms including for example legacy platforms such as the Nintendo Entertainment System, the Super Nintendo Entertainment System, the Nintendo 64, the Nintendo GameCube System, and the Nintendo Game Boy, Game Boy Advance and Nintendo DS systems. An expansion unit 300 providing a control interface similar or identical to for the example the Super Nintendo Entertainment System could be made available for playing Super Nintendo Entertainment System games on system 100. This would eliminate the desire to reprogram or rework Super Nintendo Entertainment System games for use with the newer or different interface provided by controller 200.

Another possible, more general motivation for additional expansion units 300 is to provide customized control interfaces for particular games or other applications. For example, it would be possible to develop a unit 300 with a steering wheel for driving games, a unit with a keyboard for text entry applications, a unit with one or multiple touch pads for touch screen style games, etc. Any desired control configuration is possible and can be flexibly accommodated.

Still another possible application would be to use expansion units 300 to give different players of a multi-player game different capabilities. For example, one game player might use controller 200 "as is" without any expansion, another game player might use the expansion configuration shown in FIG. 12A, yet another game player might use the expansion configuration shown in FIG. 12B, etc. One could imagine a military battle game for example in which game players playing the role of tank drivers use an expansion unit that resembles the controls of a tank, game players playing the role of artillerymen use an expansion unit that resembles controls of heavy artillery, and a game player playing the role of a commanding general uses an expansion unit that provides more general controls to locate infantry, artillery and tanks on the field.

Example Illustrative Non-Limiting Block Diagrams

Figure 9:
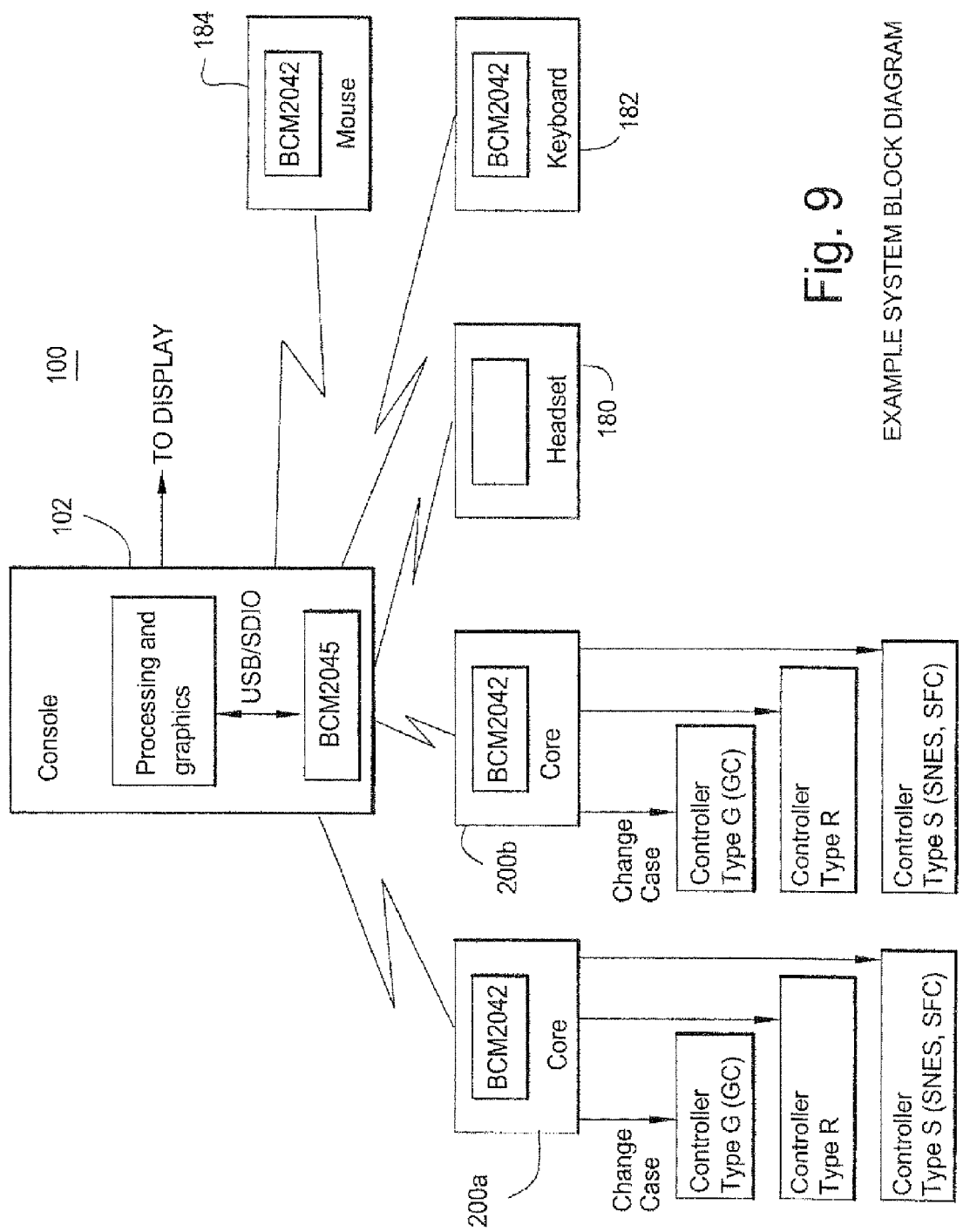
FIG. 9 shows an exemplary illustrative non-limiting block diagram implementation of the FIG. 1 system.

FIG. 9 shows a block diagram of an exemplary illustrative implementation of system 100. As described above, system 100 includes a main unit 102 and one or several controllers 200a, 200b, 200c, etc. Each controller 200 may be connected to any of additional expansion units 300 or may be used by itself, depending on the application. Additional wireless peripherals to system 100 may include a headset unit 180 for voice chat and other applications, a keyboard unit 182, a mouse or other pointing device 184, and other peripheral input and/or output units.

Figure 10:
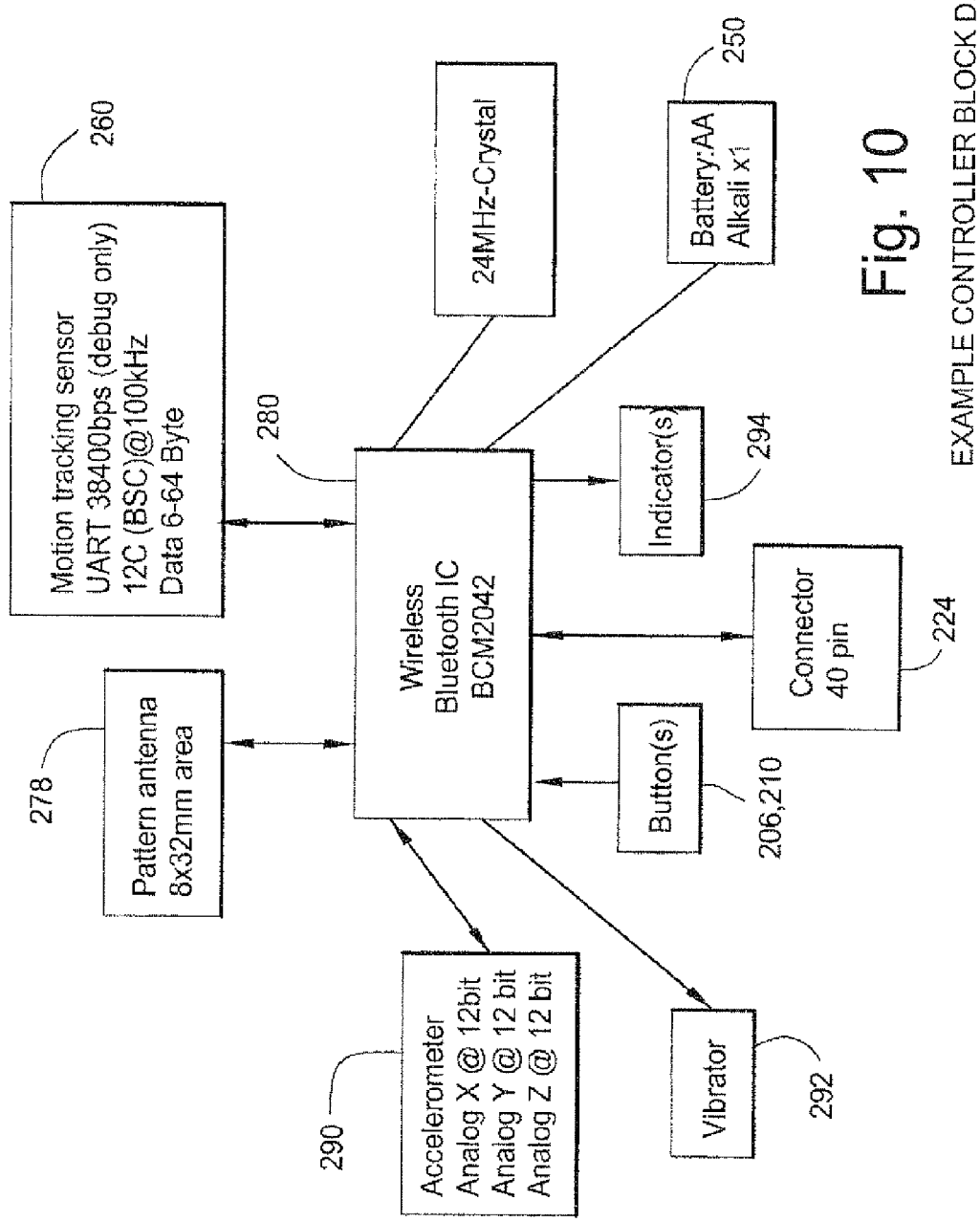
FIG. 10 shows an overall block diagram of the FIG. 2 controller.

FIG. 10 is a block diagram of an exemplary illustrative non-limiting implementation of controller 200. In the example shown, controller 200 may comprise a wireless connectivity chip 280 that communicates bidirectionally with main unit 102 via a pattern antenna 278. Wireless communications chip 280 may be based on the Bluetooth standard but customized to provide low latency. In the example shown here, most or all processing is performed by the main unit 102, and controller 200 acts more like a telemetry device to relay sensed information back to the main unit 102. Such sensed inputs may include a motion tracking sensor 260, an accelerometer 290, and various buttons 206, 210, etc. as described above. Output devices included with or within controller 200 may include a vibrational transducer 292 and various indicators 294.

Figure 11:
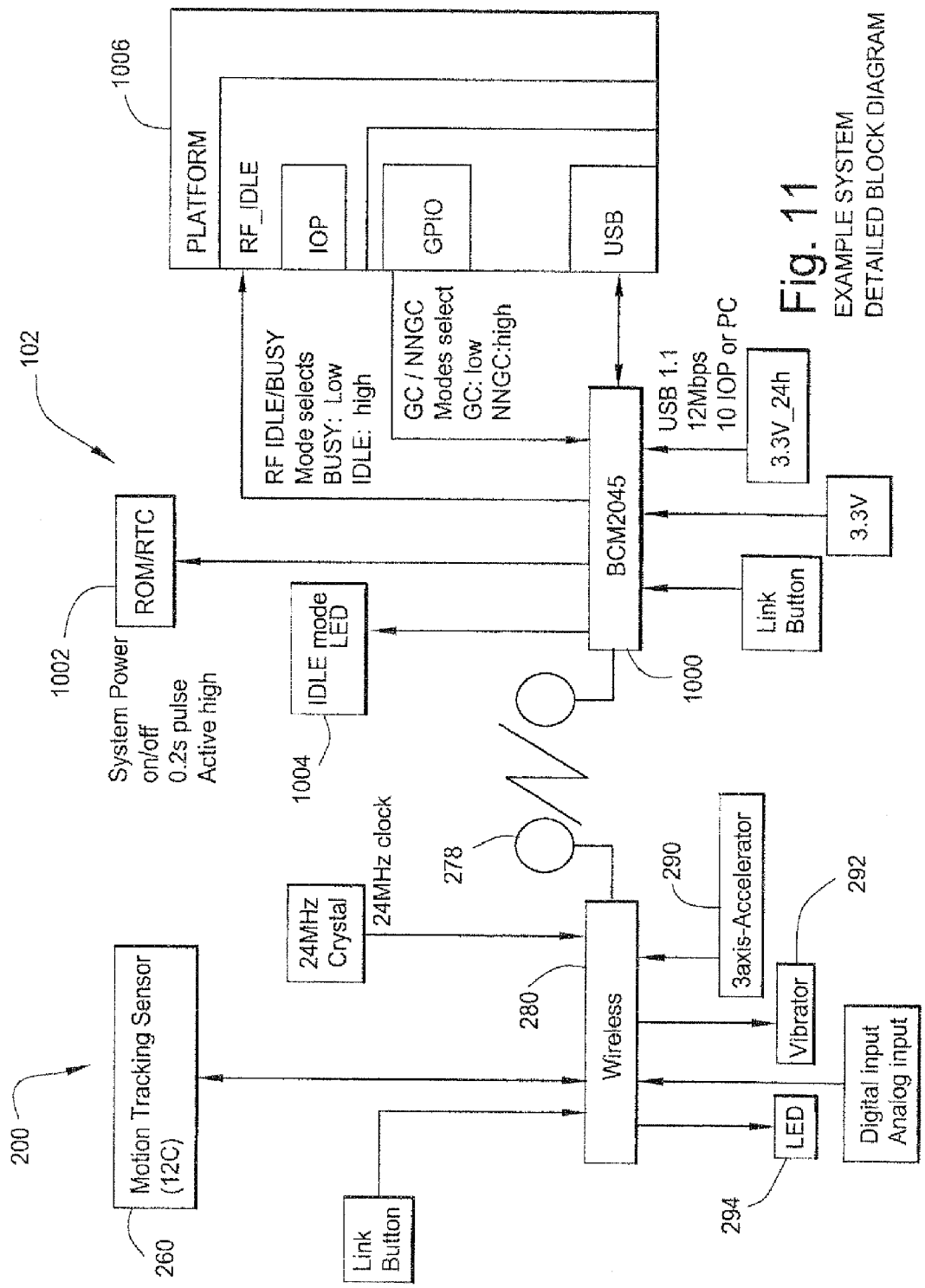
FIG. 11 is an exemplary illustrative non-limiting block diagram of an overall system.

FIG. 11 shows an overall exemplary illustrative non-limiting system block diagram showing a portion of main unit 102 that communicates with controller 200. Such exemplary illustrative non-limiting main unit 102 portion may include for example a wireless controller 1000, a ROM/Real Time Clock 1002, an idle mode indicator 1004, a processor 1006 and various power supplies. Link buttons may be provided on each side of the communications link to provide manual input for synchronization/training/searching.

Figure 12C:
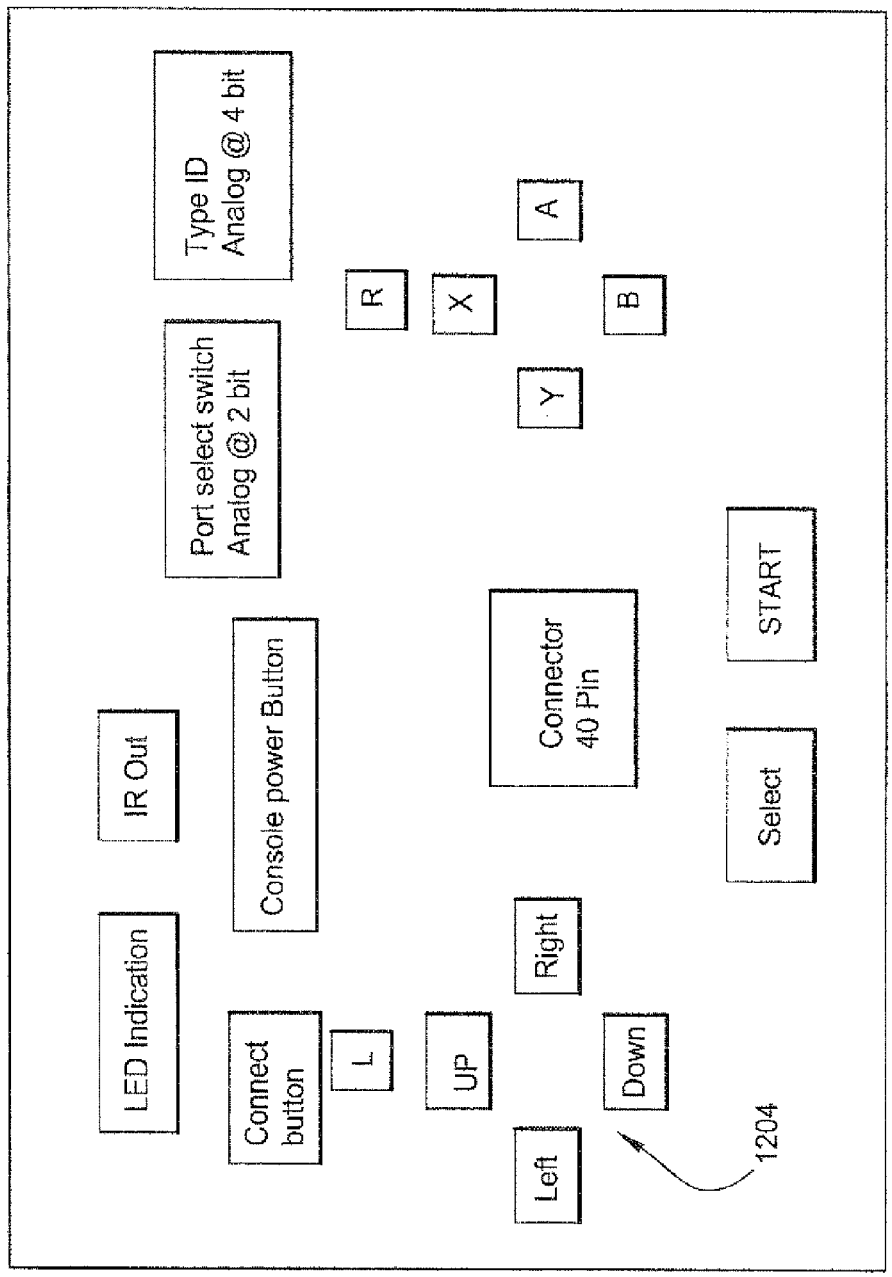

FIGS. 12A, 12B and 12C show different exemplary block diagram configurations for different expansion units 300. The FIG. 12A example includes dual touch pads 1200 and a joystick 1202 for touch screen compatible gaming; the FIG. 12B example includes two joysticks 1202 and other controls for games requiring two different joysticks (e.g., Nintendo GameCube legacy games); and the FIG. 12C example includes a cross-switch 1204 and other controls for more limited user interface type games (e.g., Nintendo Entertainment System legacy games).

Each expansion unit may be programmed with a 4-bit or other length "type" ID to permit controller 200 to detect which type of expansion unit is being used. Main unit 102 can adapt user interactivity based at least in part on the "type" ID.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A wireless handheld remote controller configured to be held in one hand, comprising:
   a housing including an upper surface and a lower surface;
   at least one digit operable detector disposed on the upper surface;
   at least one depressible trigger disposed on said lower surface;
   an inertial sensor mounted in the housing;
   a two dimensional radiation detector;
   a processor that processes an output of the radiation detector and determines an illumination pattern;

a wireless transceiver that transmits information based on signals generated by the inertial sensor and the processor; and an output device operatively coupled to the transceiver.

2. The controller of claim 1 wherein the radiation detector is disposed, at least in part, at a front portion of the housing.

3. The controller of claim 1, wherein the radiation detector comprises a two dimensional camera.

4. The controller of claim 1, wherein the radiation detector comprises:
- a two dimensional radiation sensor array; and
- an infrared filter that is mounted on the housing in front of the two dimensional radiation sensor array such that only infrared light passing through the filter is received by the radiation sensor array.

5. The controller of claim 1, wherein the radiation detector generates frames of two dimensional image data, and wherein the processor determines an illumination pattern for each frame of image data.

6. The controller of claim 5, wherein each illumination pattern comprises X and Y coordinates for illuminated objects appearing within a frame of image data.

7. The controller of claim 5, wherein each illumination pattern comprises X and Y coordinates for illuminated objects appearing within a frame of image data that have an intensity that rises above a predetermined threshold value.

8. The controller of claim 5, wherein each illumination pattern comprises X and Y coordinates for illuminated objects appearing within a frame of image data that emit infrared radiation having an intensity that rises above a predetermined threshold value.

9. The controller of claim 5, wherein the wireless transceiver transmits information regarding the illumination patterns for frames of image data.

10. The controller of claim 9, wherein the inertial sensor comprises an accelerometer.

11. The controller of claim 10, wherein the accelerometer is a three axis accelerometer that senses linear acceleration in each of three mutually perpendicular axes, and wherein the inertial sensor outputs three linear acceleration values corresponding to the three mutually perpendicular axes multiple times every second.

12. The controller of claim 11, wherein the wireless transceiver also transmits a set of the three acceleration values multiple times every second.

13. The controller of claim 1, wherein the inertial sensor comprises an accelerometer.

14. The controller of claim 13, wherein the accelerometer is a three axis accelerometer that senses linear acceleration in each of three mutually perpendicular axes, and wherein the inertial sensor outputs three linear acceleration values corresponding to the three mutually perpendicular axes multiple times every second.

15. The controller of claim 14, wherein the wireless transceiver transmits a set of the three acceleration values multiple times every second.

16. The controller of claim 1, wherein the output device comprises a speaker, and wherein the speaker outputs sounds based on a signal received by the wireless transceiver.

17. The controller of claim 1, wherein the output device comprises a vibration module that causes the housing to vibrate based on a signal received by the wireless transceiver.

18. The controller of claim 1, wherein the output device comprises at least one indicator light that is selectively illuminated based on a signal received by the wireless transceiver.

19. The controller of claim 1, wherein the output device comprises an array of indicator lights that are selectively illuminated based on a signal received by the wireless transceiver.

20. The controller of claim 1, wherein the at least one digit operable detector comprises at least one depressible button disposed on the upper surface of the housing.

* * * * *